(12) United States Patent
Pahlevan et al.

(10) Patent No.: US 12,494,288 B2
(45) Date of Patent: Dec. 9, 2025

(54) NONINVASIVE HEART FAILURE DETECTION

(71) Applicant: UNIVERSITY OF SOUTHERN CALIFORNIA, Los Angeles, CA (US)

(72) Inventors: Niema M. Pahlevan, Los Angeles, CA (US); Rashid Alavi Dehkordi, Los Angeles, CA (US); Ray V. Matthews, Los Angeles, CA (US)

(73) Assignee: UNIVERSITY OF SOUTHERN CALIFORNIA, Los Angeles, CA (US)

( * ) Notice: Subject to any disclaimer, the term of this patent is extended or adjusted under 35 U.S.C. 154(b) by 309 days.

(21) Appl. No.: 18/251,337

(22) PCT Filed: Nov. 10, 2021

(86) PCT No.: PCT/IB2021/060423
§ 371 (c)(1),
(2) Date: May 1, 2023

(87) PCT Pub. No.: WO2022/101809
PCT Pub. Date: May 19, 2022

(65) Prior Publication Data
US 2023/0420132 A1    Dec. 28, 2023

Related U.S. Application Data

(60) Provisional application No. 63/111,807, filed on Nov. 10, 2020.

(51) Int. Cl.
*G16H 50/20* (2018.01)
*A61B 5/00* (2006.01)
(Continued)

(52) U.S. Cl.
CPC ......... *G16H 50/20* (2018.01); *A61B 5/02108* (2013.01); *A61B 5/352* (2021.01);
(Continued)

(58) Field of Classification Search
CPC ...... A61B 5/7267; G16H 50/20; G16H 50/30; G16H 50/70
See application file for complete search history.

(56) References Cited

U.S. PATENT DOCUMENTS

2007/0191724 A1* 8/2007 Hirsh ................. A61B 5/352
600/513
2008/0228089 A1    9/2008 Cho et al.
(Continued)

FOREIGN PATENT DOCUMENTS

KR    1020060117546 A    11/2006
KR    20200071183 A    6/2020
WO    2019/144058 A1    7/2019

OTHER PUBLICATIONS

Patent Coooperation Treaty, Written Opinion and International Search Report issued in PCT/IB2021/060423, Feb. 18, 2022, pp. 1-7.
(Continued)

*Primary Examiner* — Eric D. Bertram
(74) *Attorney, Agent, or Firm* — Pillsbury Winthrop Shaw Pittman LLP

(57) ABSTRACT

Some embodiments relate to non-invasive techniques for determining whether a patient has experienced heart failure. In some embodiments, a machine learning model may be trained to determine whether the patient has experienced heart failure using blood pressure waveforms and ECGs taken concurrently. Using the intrinsic frequency methodology and the cardiac triangle mapping methodology, features about the patient's cardiac cycle can be extracted and provided to the trained model as input.

17 Claims, 33 Drawing Sheets

(51) Int. Cl.
　　　*A61B 5/021*　　　(2006.01)
　　　*A61B 5/352*　　　(2021.01)
　　　*G16H 50/30*　　　(2018.01)
　　　*G16H 50/70*　　　(2018.01)

(52) U.S. Cl.
　　　CPC ............ *A61B 5/7267* (2013.01); *G16H 50/30* (2018.01); *G16H 50/70* (2018.01)

(56) References Cited

U.S. PATENT DOCUMENTS

| | | | | |
|---|---|---|---|---|
| 2023/0148969 | A1* | 5/2023 | Pahlevan | A61B 5/0245 600/324 |
| 2023/0389850 | A1* | 12/2023 | Pahlevan | A61B 5/0205 |
| 2023/0420132 | A1* | 12/2023 | Pahlevan | A61B 5/7267 |
| 2024/0138773 | A1* | 5/2024 | Pahlevan | G16H 50/30 |

OTHER PUBLICATIONS

Pahlevan et al., "Intrinsic frequency for a systems approach to hemodynamic waveform analysis with clinical applications", Journal of the Royal Society, Interface, 2014, pp. 1-10, 11:20140617.

Pahlevan et al., "Cardiac Triangle Mapping: A New Systems Approach for Noninvasive Evaluation of Left Ventricular End Diastolic Pressure", Fluids, Jan. 22, 2019, pp. 1-13, vol. 4(16).

Pahlevan et al., "Noninvasive iPhone Measurement of Left Ventricular Ejection Fraction Using Intrinsic Frequency Methodology", Critical Care Medicine, Jul. 2017, pp. 115-1120, vol. 45(7).

Armenian et al., "Accuracy of a Novel Handheld Wireless Platform for Detection of Cardiac Dysfunction in Anthracycline-Exposed Survivors of Childhood Cancer", Clinical Cancer Research, Jul. 1, 2018, pp. 3119-3125, vol. 24(13).

Moraes et al., "Advances in Photopletysmography Signal Analysis for Biomedical Applications", Sensors, Jun. 9, 2018, pp. 1-26, Vo. 18(1894).

* cited by examiner

NONINVASIVE HEART FAILURE DETECTION

CROSS-REFERENCE TO RELATED APPLICATIONS

This application claims priority to U.S. Provisional Patent Application No. 63/111,807 titled "Hybrid artificial intelligence-based method and system for noninvasive instantaneous detection of elevated left ventricular end diastolic pressure," which was filed on 10 Nov. 2020. The disclosure of each afore-listed patent filing is incorporated herein by reference in its entirety.

BACKGROUND

Heart failure (HF) is one of the most common cardiovascular diseases (CVDs) worldwide, and is expected to become more prevalent as the population ages. HF is a condition in which the heart fails to pump enough blood to meet the body's metabolic demands. Current estimate shows that approximately 6.5M adults suffer from HF in the United States, and projections show that, by 2030, the prevalence of HF will increase by 46%. HF is a leading cause for hospitalization nationally and consequently a leading health care expense. Monitoring a HF status in outpatients have a main effort of the hospital systems to reduce the re-admission for decompensated heart failure. Recently, an implantable pulmonary artery pressure sensor was developed to implement home transcutaneous monitoring downloaded to an internet-based recording that could be reviewed online by physicians. This sensor was found to be superior to usual care in reducing hospitalizations for HF patients when compared in a randomized clinical trial. However, implanting the sensor is an invasive process and can also be costly.

Left ventricle end diastolic pressure (LVEDP) represents the pressure inside the left ventricle (LV) at the end of the diastolic phase of a patient's cardiac cycle. LVEDP is an important measure of LV function. An elevated LVEDP is generally indicative of poor LV function in both heart failure with preserved ejection fraction (HFpEF) and heart failure with reduced ejection fraction (HFrEF). Early detection of elevated LVEDP can reduce the rate of patient rehospitalization for HR. Furthermore, LVEDP is a useful index in evaluating the risk of cardiac complications after myocardial infarction (MI) and myocardial ischemia. Therefore, improving the ability to evaluate LVEDP accurately and quickly can significantly impact the diagnosis and management of HF by reducing the discharge of inadequately treated patients and maintaining discharged patients in a compensated state. However, similar to the technical issues set forth above, conventional techniques to evaluate LVEDP are invasive, expensive, and difficult to use by clinicians and patients in their home environment.

SUMMARY

The following is a non-exhaustive listing of some aspects of the present techniques. These and other aspects are described in the following disclosure.

Some aspects include a machine learning model configured to detect, from cardiac data measured via a client device, whether a patient has an elevated LVEDP indicative of HF.

Some aspects include a tangible, non-transitory, machine-readable medium storing instructions that when executed by a computing system cause the computing system to perform operations associated with the aforementioned machine learning models.

Some aspects include a system, including: one or more processors; and memory storing instructions that when executed by the processors cause the processors to effectuate operations associated with the aforementioned machine learning models.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
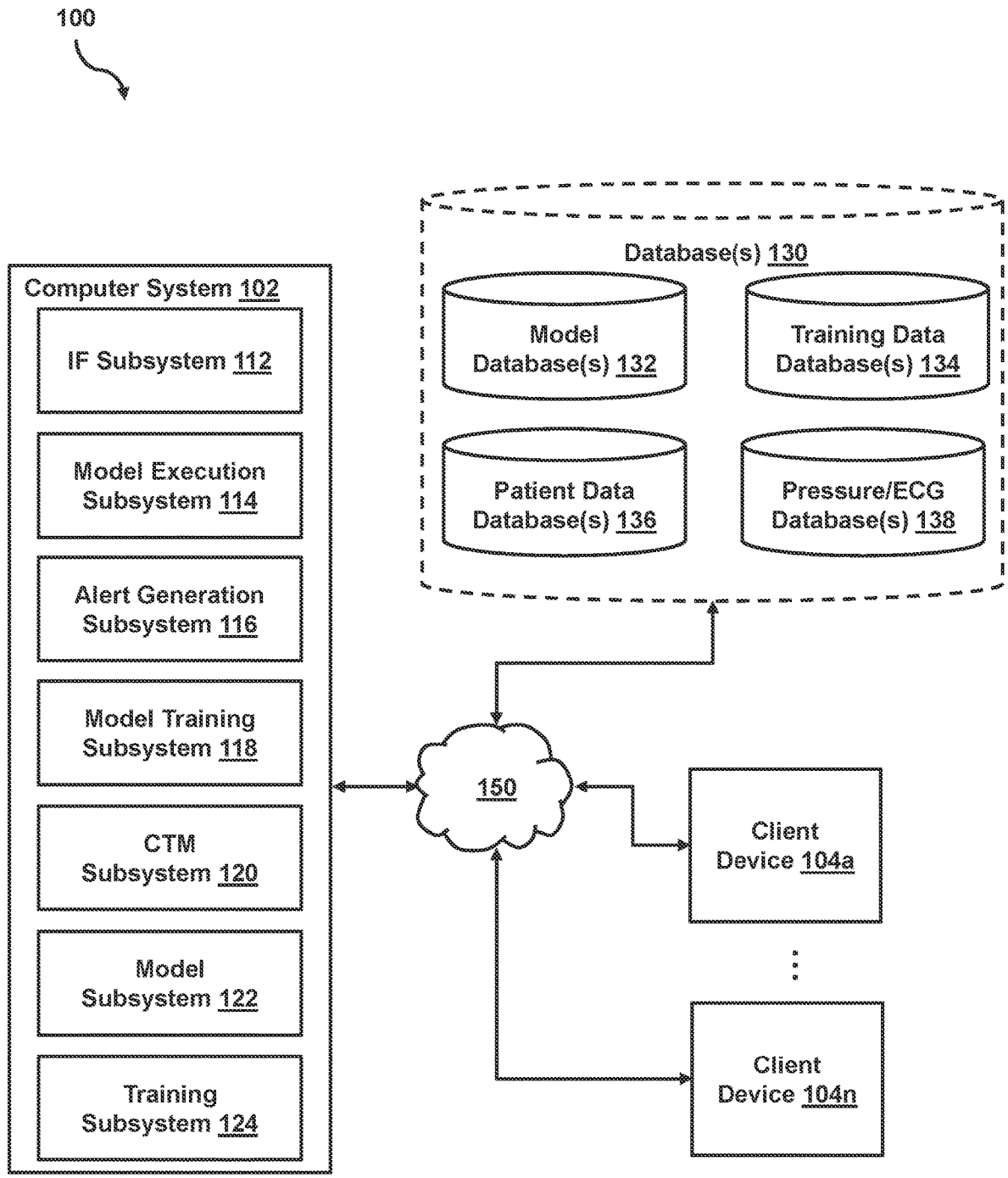
FIG. 1 illustrates an example system for detecting cardiac events, determining a severity of a cardiac event, and evaluating a likelihood of heart failure, in accordance with various embodiments.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION

To mitigate the problems described herein, the inventors had to both invent solutions and, in some cases just as importantly, recognize problems overlooked (or not yet foreseen) by others in the fields of medical-device engineering and machine learning. Indeed, the inventors wish to emphasize the difficulty of recognizing those problems that are nascent and will become much more apparent in the future should trends in the industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

Among cardiovascular diseases (CVDs), heart failure (HF) is common problem that is expected to become more prevalent as the population ages. Hospital systems have consequently expended major effort to monitor an outpatient's HF status. In particular, hospital systems have focused their efforts on reducing re-admission for decompensated HF. Despite advances in treatment and therapy optimization, the 30-day rehospitalization rate among HF patients remains high (greater than 25%). Elevated left ventricular end-diastolic pressure (LVEDP) is indicative of poor left ventricle (LV) function and/or volume overload in both patients with HF with preserved ejection fraction (HFpEF) and HF with reduced ejection fraction (HFrEF). The volume overload can lead to pulmonary congestion, symptomatic dyspnea, and eventual readmission.

HF is traditionally managed using relatively imprecise clinical assessments. As a result, LVEDP could be elevated at the time of discharge without the patient or the hospital system knowing. Elevated LVEDP (cardiopulmonary congestion) is a leading cause of readmission among HF patients. Therefore, if an elevated LVEDP can be detected early, the likelihood of HF readmission can be reduced.

Current outpatient monitoring programs that have been developed to reduce hospital (re)admissions have shown positive albeit inconsistent results. Therefore, monitoring HF by following symptoms and obvious signs leads to suboptimal results. One possible solution to the current outpatient monitoring programs is the use of an implantable pulmonary arterial sensors that allows pulmonary artery pressures to be measured remotely. While these techniques have reduced HF admissions, they are not without there detractions. For example, the implantable pulmonary arterial sensors use pulmonary artery diastolic pressure (PAD) as an estimate of LVEDP together with a reliance on such PAD trends in order to adjust medications at home. However, PAD may not be an accurate measurement of volume in co-existent pulmonary disease states, and LVEDP measurement provide more accurate assessments than PAD.

By continually monitoring HF patients and keeping patients' LVEDP below a targeted value, a compensated state could be maintained where HF readmissions (and patient deterioration) can be reduced. To obtain accurate LVEDP evaluations, left heart catheterization is required. To obtain pulmonary capillary wedge pressure, which can be used as an estimate of LVEDP, right heart catheterization is required. This, however, is limited to unstable patients or those with serious symptoms for whom cardiac catheterization is justifiable.

Physical models of the heart may be constructed to extract information about LV cardiac dynamics (e.g., LVEDP). For example, in an LV-arterial system, hemodynamics waveforms, such as arterial pressure waveforms or electrocardiograms (ECGs), may be obtained. Using trained machine learning models, such as a Random Forest model, taking inputs derived from the intrinsic frequency (IF) methodology and the cardiac triangle mapping (CTM) methodology, an LVEDP of the patient may be estimated. In particular, as the IF and CTM methodologies can be implemented using non-invasive devices (e.g., a smart watch, a smart phone, etc.), LVEDP can be monitored consistently, effectively, and inexpensively. Some embodiments include a machine learning model that is trained to identify elevated LVEDP using arterial pressure waveforms (e.g., a waveform representing changes in blood pressure over a period of time) and a single channel (e.g., three electrode) echocardiogram (ECG). By detecting an elevated LVEDP from pressure waveforms measured at distal sites (e.g., such as the femoral artery, which can be easily measured non-invasively) with a concurrently captured ECG, clinical monitoring of LVEDP for HF diagnosis can be significantly improved.

Diagnosing cardiac events is traditionally based on clinical (e.g., pain) and ECG (ST-segment change) criteria. While ECGs are clearly an important noninvasive and inexpensive test, ECGs are neither specific nor definitive. Additionally, ECGs require a trained professional for setup and operation. Other advanced diagnostic techniques/biomarkers such as myocardial perfusion testing, circulating BNP level, cardiac troponin level, and echocardiography have been introduced for the detection and assessment of cardiac events. All these techniques have limitations, such as invasiveness, radiation exposure, time to receive and analyze data, or cost. Thus, the use of alternative methodology can aid in the diagnosis of cardiac events independently or together with advanced techniques and/or traditional markers of ischemia.

Integrative systems approaches, such as the Intrinsic frequency (IF) method, that consider the Left Ventricle (LV) and arterial network as a coupled dynamical system (LV+ arterial tree) have shown to provide valuable clinical information about the underlying pathology. For instance, as discussed in "Noninvasive iPhone Measurement of Left Ventricular Ejection Fraction Using Intrinsic Frequency Methodology," Pahlevan et al., Critical Care Medicine, 2017; 45:1115-1120, the contents of which is hereby incorporated by reference in its entirety, during a blind clinical study of a heterogeneous adult cohort (n=72), it was demonstrated that the LV ejection fraction (LVEF) (systolic function of the heart) can be accurately evaluated using a smartphone by applying the IF method. As discussed in "Accuracy of a novel handled wireless platform for detection of cardiac dysfunction in anthracycline-exposed survivors of childhood cancer," Armenian et al., Clinical Cancer Research, 2018:In Press, the contents of which are hereby incorporated by reference in its entirety, it was demonstrated that LVEF derived from the IF-iPhone method is more accurate than 2D echocardiogram in childhood cancer survivals (n=191) compared to the costlier gold standard measures obtained from cardiac magnetic resonance (CMR).

FIG. 1 illustrates an example system for detecting cardiac events, determining a severity of a cardiac event, and evaluating a likelihood of heart failure, in accordance with various embodiments. In some embodiments, system 100 may include computing system 102, client devices 104a-104n (which may be referred to herein collectively as "client devices 104," and individually as "client device 104"), databases 130, or other components. Computing system 102 and client device 104 may communicate with one another via network 150 (or in some cases, some or all of computing system 102 may be integrated with the client device 104). Additionally, two or more client devices may communicate with one another via network 150. Furthermore, the connection between the various components of system 100 via network 150 may include wireless, wired, or wireless and wired connections. Although a single instance of computing system 102 is represented within system 100, multiple instances of computing system 102 may be included within system 100, and a single instance is illustrated to minimize obfuscation within FIG. 1. For example, system 100 may include multiple computing systems, or other components.

Network 150 may be a communications network including one or more Internet Service Providers (ISPs). Each ISP may be operable to provide Internet services, telephonic services, or other services, to one or more components of system 100. In some embodiments, network 150 may facilitate communications via one or more communication protocols, such as, TCP/IP, HTTP, WebRTC, SIP, WAP, Wi-Fi (e.g., 802.11 protocol), Bluetooth, radio frequency systems (e.g., 900 MHz, 1.4 GHz, and 5.6 GHz communication systems), cellular networks (e.g., GSM, AMPS, GPRS, CDMA, EV-DO, EDGE, 3GSM, DECT, IS 136/TDMA, iDen, LTE or any other suitable cellular network protocol), infrared, BitTorrent, FTP, RTP, RTSP, SSH, VOIP, or other mechanisms for facilitating communications between components of system 100.

Client device 104 may include one or more processors, memory, communications components, and/or additional components (e.g., display interfaces, input devices, etc.). Client device 104 may include any type of mobile terminal, fixed terminal, or other device. By way of example, client device 104 may include a desktop computer, a notebook computer, a tablet computer, a smartphone, a wearable device, or other client device. Users may, for instance, utilize client device 104 to interact with one another, one or more servers, or other components of system 100. In some embodiments, wearable devices may be physically or wirelessly connected to client device 104. Various examples of wearable devices (e.g., which client devices 104 may be or may be coupled to), include, but are not limited to, which is not to imply that other lists are limiting, smart watches, smart arm bands, smart patches, smart jewelry (e.g., smart earrings, smart necklaces, smart rings, etc.), smart glasses, smart clothing (e.g., shirts, pants, jackets, socks, shoes, braces), or other wearable items. In some embodiments, client devices 104 may be implantable, or coupled to an implantable device, for constant monitoring. In some embodiments, client devices 104 may include, or be in communication with, a wireless device capable of collecting arterial pulse waveforms, a pulse-ox data, phonocardiogram data, magnetic resonance images (MRIs), echocardiograms (ECGs), or other hematological tests. Data captured by a wearable device may be provided to client devices 104 for further processing/analysis and/or client devices 104 may provide the data to computing system 102. Some or all of the operations performed by computing system 102 and/or client devices 104 may, alternatively, be performed locally by the wearable device. Similarly, some or all of the operations may be performed by client devices 104.

Figure 2:
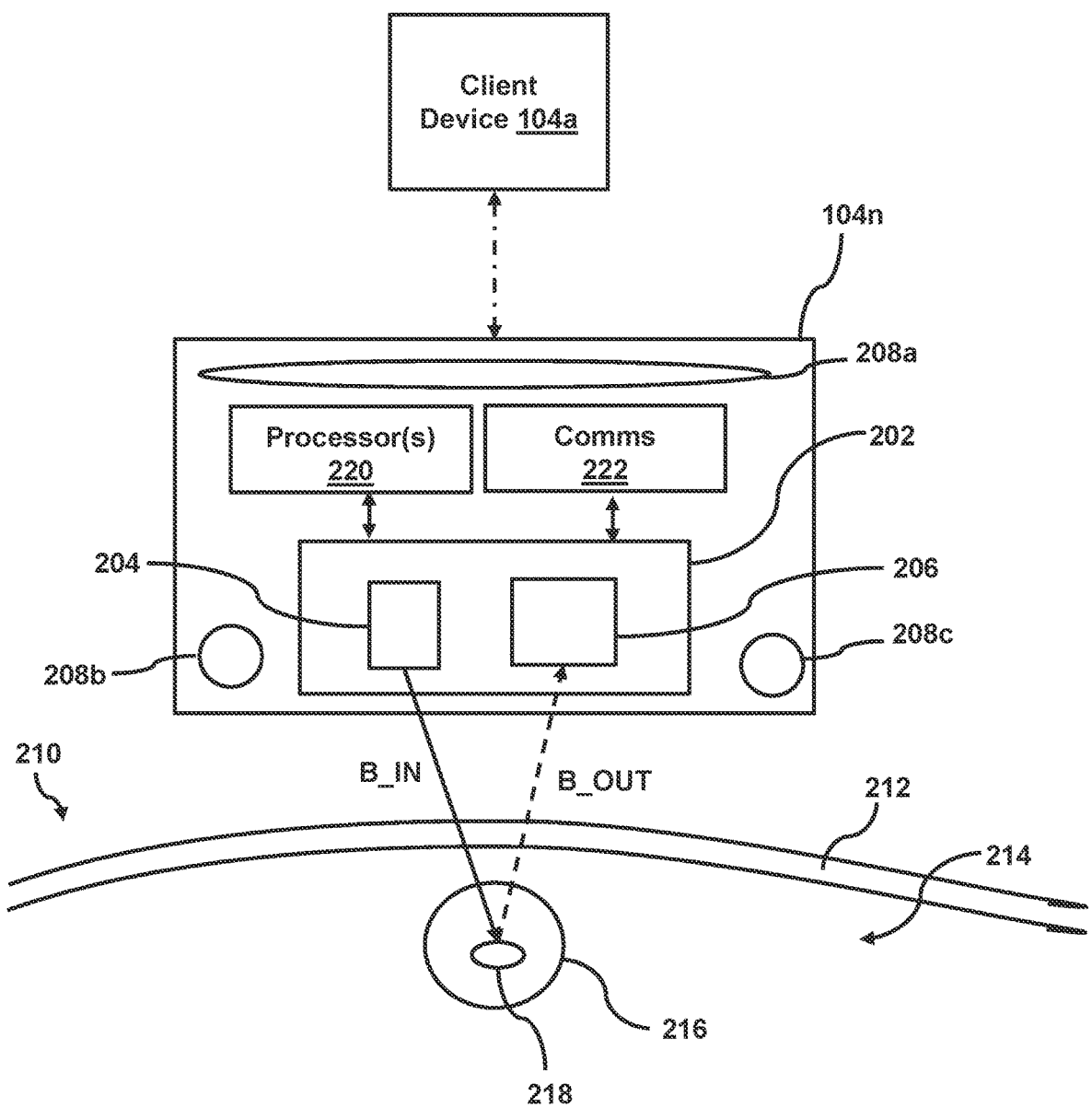
FIG. 2 illustrates an example system for measuring cardiac data of a patient, in accordance with various embodiments.

As an example, with reference to FIG. 2, client device 104a may be a non-wearable device (e.g., such as a smartphone, tablet, laptop, etc.) that is physically or wirelessly connected to client device 104n, which may be a wearable device, however, alternatively client device 104n may not a non-wearable device, such as a pulse measurement device, a smartphone camera, a microwave radar device, or an applanation tonometry device. Client device 104n may be configured to capture cardiac data related to a cardiac cycle of a patient. In particular, client device 104n may be a wearable device that obtains the cardiac data using non-invasive techniques. The cardiac data may then be transmitted (e.g., via Bluetooth) to client device 104a from client device 104n for additional analysis/processing. Client device 104a may transmit some or all of the cardiac data to computing system 102 for the additional analysis/processing. Persons of ordinary skill in the art will recognize that client device 104n need not be a wearable device (e.g., such as, for example, a smartphone), and may be configured to capture and analyze the cardiac data locally.

Client device 104n may include one or more instances of photoplethysmography (PPG) sensor 202 for measuring data related to a patient's cardiac activity. For instance, PPG sensor 202 may be configured to measure the patient's heart rate, heart rhythm, or other cardiac information of the patient. While only a single instance of PPG sensor 202 is shown, client device 104n may include multiple PPG sensors, or may be communicatively coupled to one or more additional PPG sensors (e.g., located in other client devices or other sensors placed about the patient's body), which may be used together to measure the data related to the patient's cardiac activity.

PPG sensor 202 may include a light source 204, a photodetector 206, or other components. Light source 204 may be an LED capable of emitting light of a particular wavelength/range of wavelengths. For example, light source 204 may be an LED that emits green light with a wavelength of 525 nm, however other wavelengths or ranges of wavelengths may be used. Photodetector 206 may be configured to detect light that reflects or transmits from a patient. PPG sensor 202 may be a transmissive sensor or a reflective sensor. For a reflective sensor, such as that depicted within FIG. 2, light source 204 may emit a beam of light BIN directed at a portion of a body part 210 of a patient. Beam of light B_IN may pass through one or more layers of skin, such as an upper layer 212 (e.g., stratum corneum, epidermis) and a lower layer 214 (e.g., dermis), into a blood vessel 216 carrying blood. In some cases, beam of light B_IN may reflect off of a red blood cell 218 within the blood carried by blood vessel 216, and the reflected beam of light BOUT may pass through upper and lower layers 212, 214, and be detected by photodetector 206.

Photodetector 206 may be configured to generate a PPG signal that depends on the flow of blood and the oxygen in each capillary vessel during a given cardiac cycle (e.g., systole and diastole). The PPG signal includes two components: a DC offset representing the constant absorption of light passing through the tissue, and an AC component generated by heartbeats affecting blood volume when light traverses the artery. When there is an increased amount of glucose in the blood, there is a decrease in the misalignment of beam of light BIN, which causes the refractive index of the tissue to reduce. This results in a smaller amount of light being absorbed, and the light intensity crossing the tissue is greater.

For a transmissive sensor, the light emitted by light source 204 may pass through a portion of a body part 210 of a patient and subsequently be detected by photodetector 206 located on an opposite side of body part 210. For example, light source 204 may be placed on one side of a patient's finger (e.g., on top of a nail), and photodetector 206 may be placed on the opposite side of the patient's finger. The light emitted by light source 204 may pass through the patient's skin pigment, bone, arteries, blood, or other venous features, and may be detected by photodetector 206.

In some embodiments, parameters may be extracted from the PPG signal to analyze heart rate variation (HRV) measurements. The analysis may be performed locally by client device 104n, such as by using one or more processors 220 included therein. For example processors 220 may execute computer program instructions to perform operations relating to the analysis of the PPG signal. The results of the analysis may be output, via communications component 222, to client device 104a, computing system 102, or other components of system 100. Alternatively, or additionally, the PPG signal may be output by communications component 222 to client device 104a, computing system 102, or other components of system 100, for analysis. As summarized below in Table 1, and the parameters may be extracted using linear and/or nonlinear techniques. Additional details related to the linear and nonlinear techniques that may be used to extract parameters for measuring cardiac activity of a patient is provided in "Advances in Photoplethysmography Signal Analysis for Biomedical Applications," Moraes et al., June 2018, DOI: 10.3390/s18061894, Sensors, 18(6), p. 1849, the contents of which are hereby incorporated by reference in their entirety.

TABLE 1

| Technique (Linear/Nonlinear) | Time Domain/ Frequency Domain | Evaluation Indices |
|---|---|---|
| Linear | Time | SDNN, SDANN, $SDNN_i$, rMSSD, pNN50 |
| Linear | Time | RRtri, TINN, Poincare Plot |
| Linear | Frequency | HF, LF, VLF |
| Nonlinear | — | Correlation function, hurst exponent, fractal dimension, Lyapunov exponent |

In some embodiments, PPG sensor 202 may be used to determine a Pulse Transit Time (PPT), which represents a time that a pulse propagates from the heart to a peripheral location. The PTT may also be derived from electrocardiograms (ECGs). PPT has an inverse correlation with blood pressure (BP) and pulse wave velocity (PWV). The PPT may be calculates based on a time interval between a peak of an R wave from the ECG and a peak of a derivative of PPG. For example, the time interval between the peak of the R wave of the ECG and a characteristic point of the PPG in the same cardiac cycle are used to compute the PPT. Thus, client device 104n may also include one or more ECG sensors 208a-c for capturing ECGs of a patient. ECGs may be captured by measuring changes in electrical signals at the skin's surface generated as the heart beats. In some cases, sensors 208a-c may be electrodes used to measure electrical activity at the skin, such as two bottom electrodes (e.g., sensors 208b, 208c) and one top electrode (e.g., sensor 208a), which can be used to obtain ECG signals by measuring a voltage difference between the bottom electrodes (e.g., contacting a left wrist of the patient) and the top electrode (e.g., contacting the right arm). It should also be noted that client device 104 may be configured to capture pulse-oxygen levels of the patient using the same or similar techniques as described above with respect to PPG.

In some embodiments, client device 104 (e.g., a wearable device, a non-wearable device, or a combination of both) may extract features from the ECG/PPG data. The extracted features may indicate a number of heart beats experienced during a given time interval, PPT, a spectrum of PPG, or other features. Additionally or alternatively, the extracted features may include features related to the amount of time between the beginning of the QRS complex and the opening of the aortic valve (PEP), the amount of time between the opening of the aortic value to the closure of the aortic valve (LVET), or other features. In some embodiments, the ECG data, the extracted features, or both may be captured by client device 104 for further analysis.

In some cases, the ECG data and the pressure measurements (e.g., arterial blood pressure measurements) may be captured contemporaneously using client device 104. For example, client device 104 may use provide instructions that have a patient perform an action or set of actions to begin the process of capturing both the ECG and BP data together. In some embodiments, the ECG and the BP may be captured at substantially the same time (e.g., within 1 second or less of one another, within 0.5 seconds or less of one another, within 0.01 seconds or less of one another, or other times). In some cases, the ECG and BP may be synched together post-capture.

Client device 104 may capture a set of arterial blood pressure measurements and may generate an arterial pressure waveform representing the blood pressure measurements. The arterial blood pressure measurements may be computed using measured heart rate (HR) data, pulse-ox data, or other data, as detailed above. The blood pressure measurements may reflect how a patient's blood pressure changes over a given cardiac cycle (e.g., systole and diastole). In some embodiments, multiple blood pressure waveforms over multiple cardiac cycles may be measured/computed by client device 104. The captured blood pressure waveforms may be used to compute an overall blood pressure waveform or may be used for multiple independent analyses.

Figure 3:
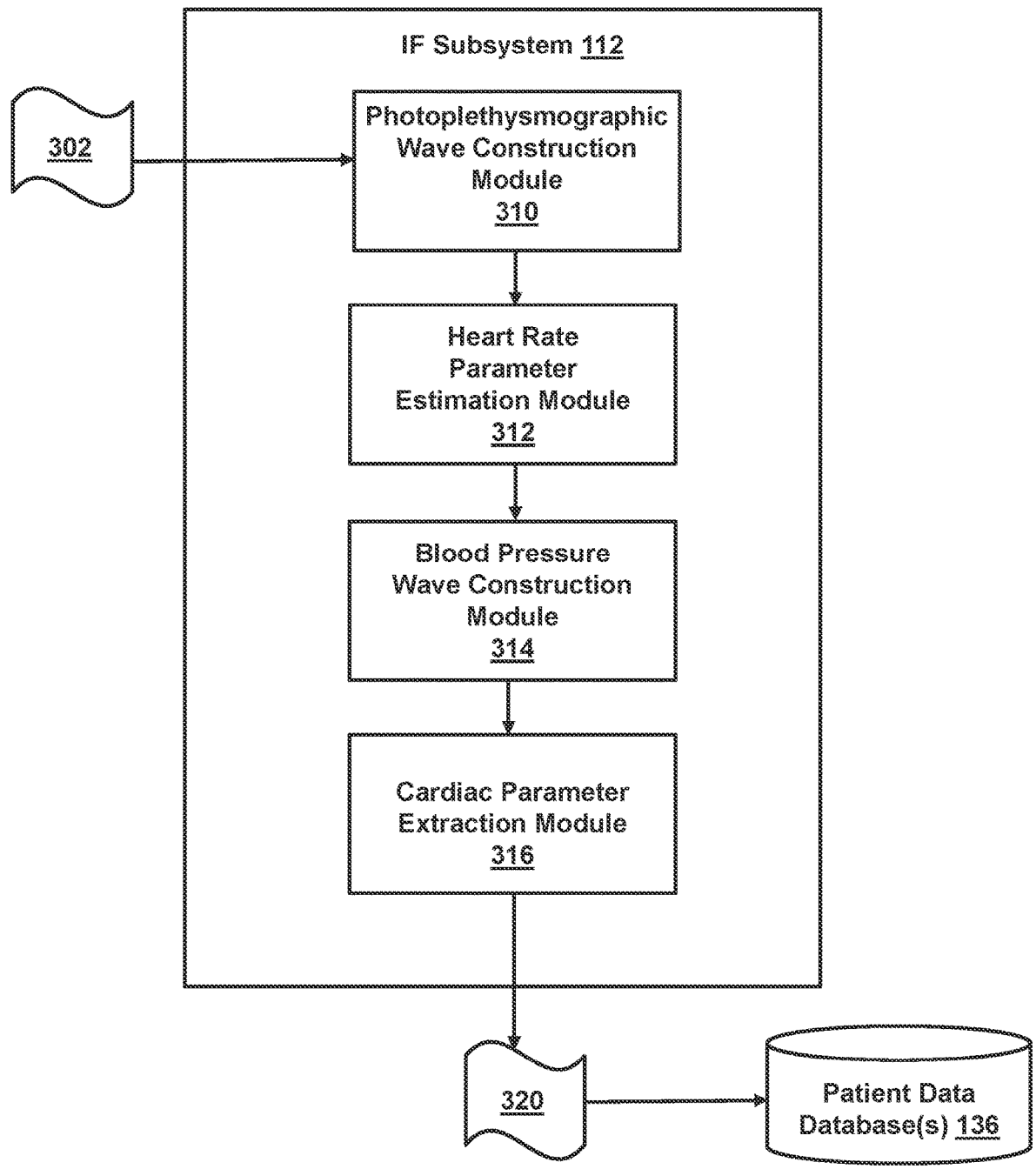
FIG. 3 illustrates an example of an intrinsic frequency (IF) subsystem for obtaining cardiac features of a patient, in accordance with various embodiments.

Returning to FIG. 1, IF subsystem 112 may be configured to extract one or more cardiac features from heart rate data. As an example, with reference to FIG. 3, IF subsystem 112 may be configured to obtain cardiac data 302 from client device 104, a wearable device coupled to client device 104, a data repository, or from other sources. Cardiac data 302 may include heart rate data, heart rate variation data, pulse-ox data, ECG data, PPG data, PTT data, BP data, a time when a rising portion of the systolic phase of the cardiac cycle begins, a time of the dicrotic notch of the cardiac cycle, a time when the pressure waveform ends, or other cardiac information related to a cardiac cycle of the patient.

IF subsystem 112 may include modules configured to execute tasks related to determining cardiovascular parameters, such as photoplethysmographic (PPG) wave construction module 310, heart rate parameter estimation module 312, blood pressure wave construction module 314, cardiac parameter extraction module 316, or other modules. Each of modules 310-316 may include software that executes certain tasks, and that software may be executed by one or more processors of the corresponding subsystem.

In some embodiments, PPG wave construction module 310 may obtain cardiac data 302 from client device 104, patient data database 136, or other sources. PPG wave construction module 310 may use cardiac data 302 to generate a PPG waveform. Cardiac data 302 may include measurements of changes to blood volume via AC modulations in reflected light (e.g., BOUT), pulse oxy. Samples of the blood volume captured during a cardiac cycle may include timestamp activity indicating when each measurement was performed. Plotting the PPG signal (e.g., B_OUT) as a function of time may produce a PPG waveform.

In some embodiments, heart rate parameter estimation module 312 may be configured to extract heart rate, PTT, or other aspects of the patient's cardiac cycle from the PPG waveform. The PPG waveform may form a distinct pattern of diastole and systole. An amount of time between consecutive portions of the cardiac cycle can be used to compute heart rate. For example, an amount of time between a beginning of consecutive systole phases can be used to measure a heart rate of the patient's cardiac cycle. In some embodiments, multiple time intervals (e.g., each associated with a measured amount of time between specific phases of the cardiac cycle) may be captured by the PPG waveform. Some cases include averaging, weighting, or performing other statistical combinatory techniques to determine the amount of time between consecutive portions of a cardiac cycle. The amount of time indicates a heart rate of the patient. Heart rate parameter estimation module 312 may generate and output heart rate data indicating the computed heart rate of the patient for a given cardiac cycle. Heart rate parameter estimation module 312 may also compute a pulse transit time (PTT), indicating an amount of time that it takes for a pulse wave to travel between two arterial sites. A speed of the arterial pressure wave, determined based on the distance between the two arterial sites and the PTT, is directly proportional to a patient's blood pressure. Thus, in addition to the heart rate data, heart rate parameter estimation module 312 may generate an output PTT data.

Blood pressure wave (BPW) construction module 314 may be configured to convert the heart rate data to pressure data, and based on the pressure data, may generate an arterial pressure waveform for a cardiac cycle of the patient. As mentioned before, the PTT data and the heart rate data are related to the blood pressure (BP). For example, the PTT is inversely proportional to BP. In some embodiments, BPW construction module 314 may compute a pulse wave velocity (PWV) based on the PTT data. Using the PWV, the blood pressure of the patient may be determined. As an example, the Frank/Bramwell-Hill equation indicates a relationship between PWV and arterial pressure, as indicated by Equation 1:

$$PWV = \sqrt{\frac{V\,dP}{\rho\,dV}}. \qquad \text{Equation 1a}$$

In Equation 1a, r represents a radius of the arterial vessel, V is the volume per unit length of the arterial vessel, ρ is the blood density, and P is the blood pressure. Alternatively, or additionally, the Moens-Korteweg equation can be used to compute blood pressure from PWV, as seen in Equation 1b:

$$PWV = \sqrt{\frac{E\,h}{2\,r\,\rho}}. \qquad \text{Equation 1b}$$

In Equation 1b, E is the Young's modulus, r is the radius, and h is the vessel thickness. It should be noted that other techniques may be used to compute the BP, such as changes in arterial wall size, pulse rate (e.g., via pulse-ox sensors), or other techniques. Thus, for the PWV determined for the cardiac cycle of the patient, the blood pressure waveform may be obtained. BPW construction module 314 may generate and output BP waveform data representing the BP waveform.

Figure 4:
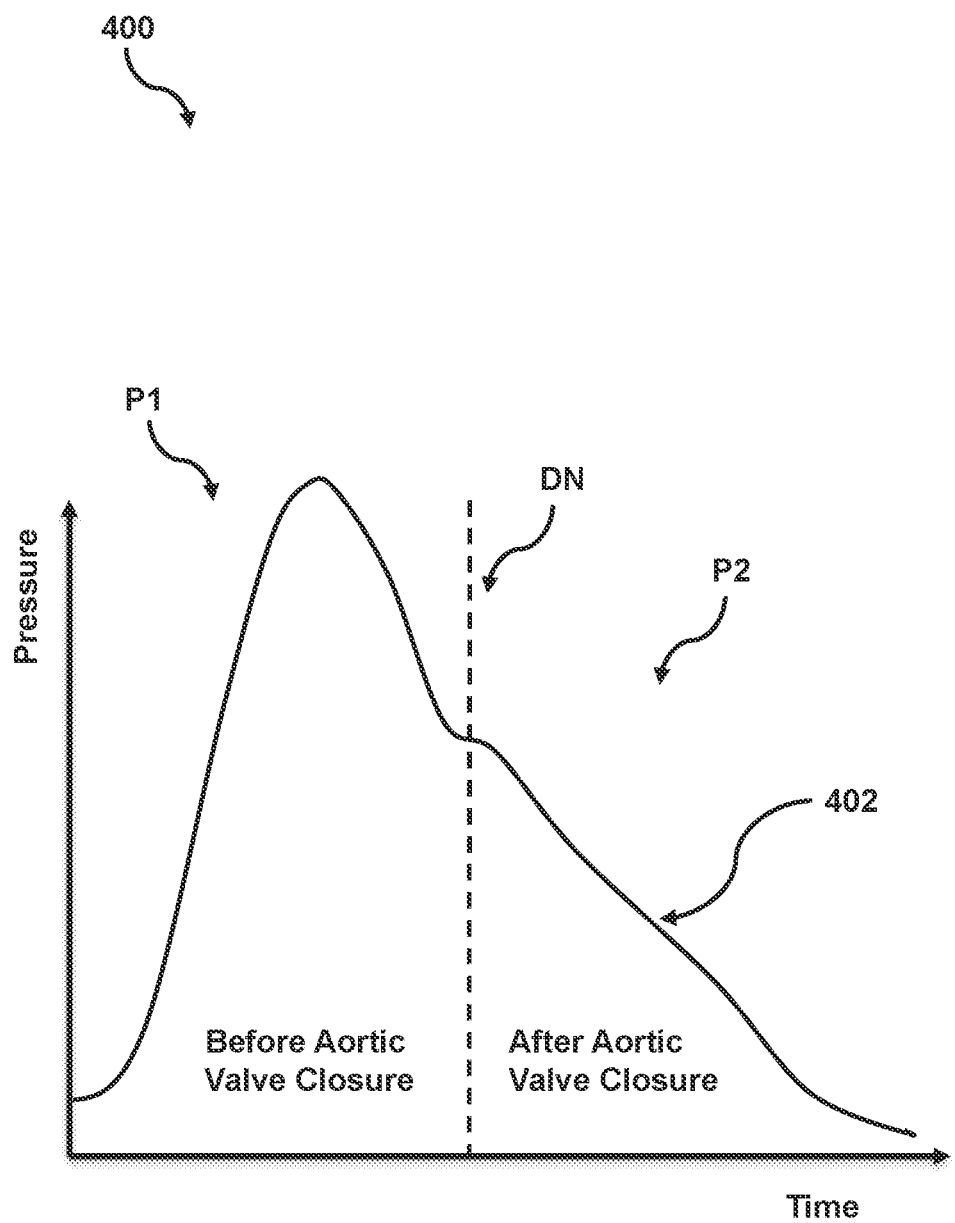
FIG. 4 illustrates an example arterial pressure waveform, in accordance with various embodiments.

In some embodiments, cardiac feature extraction module 316 may be configured to extract one or more cardiac features of the cardiac cycle of the patient based on the blood pressure waveform. The cardiac features may include, but are not limited to, which is not to imply that other lists are limiting, intrinsic frequencies, intrinsic phase angles, a relative height of dicrotic notch (RHDN), an envelope ratio (ER), an intrinsic envelope of systolic phase of the cardiac cycle, an intrinsic envelope of the diastolic phase of the cardiac cycle, or other cardiac features, or combinations thereof. In some cases, the left ventricle (LV) of the heart and aorta may be considered a coupled system before the aortic valve closes. The dicrotic notch indicates when the closure is beginning. The coupled system has a dominant frequency that the instantaneous frequency oscillates around. After the aortic valve closes, the heart and aorta are decoupled, and the dominate frequency is only based on the dynamics of the aorta and the arterial network. The dominate frequencies during systole and diastole, $\omega_1$ and $\omega_2$, are referred to as intrinsic frequencies. Additionally details regarding determining intrinsic frequencies are provided in "Intrinsic frequency for a systems approach to hemodynamic waveform analysis with clinical applications," Pahlevan et al., J. R. Soc. Interface 11: 20140617, the contents of which are incorporated herein by reference in their entireties. As seen in FIG. 4, for example, graph 400 includes a trace 402 of the blood pressure of a patient during a cardiac cycle. Trace 402 is segmented into two portions: P1 and P2. Portion P1 refers to the portion of the cardiac cycle before the aortic valve closes, and portion P2 refers to the portion of the cardiac cycle after the aortic valve closes. Portions P1 and P2 are separated by the dicrotic notch (DN).

The intrinsic frequencies $\omega_1$ and $\omega_2$ may be determined by modeling the aorta-heart coupled system as an object rotating around an origin. The angular velocity of the rotation is the intrinsic frequency. In the LV-arterial system, the average angular velocity during systole and diastole are the intrinsic frequencies (IFs) $\omega_1$ and $\omega_2$, respectively. The first IF, $\omega_1$, described the dynamics of the systolic phase of the cardiac cycle where the LV and the aorta form a coupled dynamic system. The second IF, $\omega_2$, is dominated by the dynamics of the vasculature of the decoupled system. To determine the IFs $\omega_1$ and $\omega_2$, Equation 2 may be solved:

Minimize: $\|p(t) -$ Equation 2

$\chi(0, T_0)[(a_1\cos(\omega_1 t) + b_1\sin(\omega_1 t)] - \chi(T_0, T)[(a_2\cos(\omega_2 t) +$ $b_2\sin(\omega_2 t)] - c\|_2^2.$ Equation 2 is an $L_2$ minimization subject to continuity at $T_0$ and periodicity of the waveform. In Equation 2, $\chi(a, b)$ is the indicator function (e.g., $\chi(a, b)=1$ if $a \leq t \leq b$ and $\chi(a, b)=0$ otherwise), and $p(t)$ is an arterial pressure waveform (e.g., ascending aorta, carotid, radial, etc.). Using trigonometric equations, the intrinsic frequency formulation can turn Equation 2 into Equation 3:

Minimize: Equation 3

Figure 5:
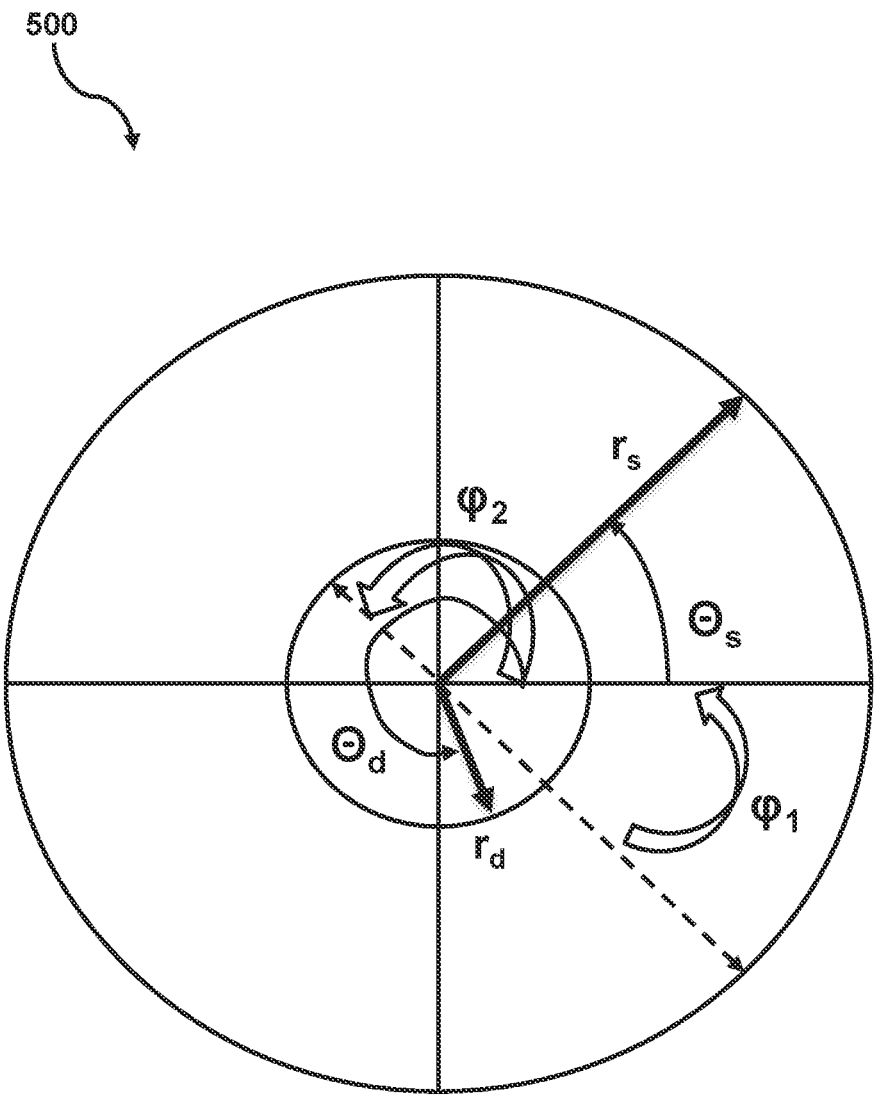
FIG. 5 illustrates an example visualization of intrinsic frequencies and intrinsic phase angles, in accordance with various embodiments.

$\|p(t) - \chi(0, T_0)[(r_s\sin(\omega_1 t + \varphi_1) - \chi(T_0, T)[(r_d\sin(\omega_2 t + \varphi_2)]$ $- c\|_2^2.$ In Equation 3, $\varphi_1$ and $\varphi_2$ are the systolic intrinsic phase angle and the diastolic intrinsic phase angle, respectively. A visual depiction of the relationship between the systolic intrinsic phase angle and the diastolic intrinsic phase angle to the intrinsic frequencies, $\omega_1$ and $\omega_2$ is seen in FIG. 5. In FIG. 5, visual depiction 500 describes the relationship between intrinsic frequencies $\omega_1$ and $\omega_2$, intrinsic phase angles, $\varphi_1$ and $\varphi_2$, the intrinsic envelope of systole, $r_s$, and the intrinsic envelope of diastole, $r_d$. The angles between the start of each cardiac phase (systolic or diastolic) and the reference angle line of zero (horizontal line toward right) are these intrinsic phase angles, $\varphi_1$ and $\varphi_2$. Equation 3 can be solved using brute-force method (similar to Equation 2), or using other optimization-based methods.

The intrinsic frequencies $\omega_1$ and $\omega_2$, initial intrinsic phases $\varphi_1$ and $\varphi_2$, and the envelopes $r_s$ and $r_d$ can be defined in terms of $a_1$, $a_2$, $b_1$, $b_2$, as $\varphi_1 = \tan^{-1}(a_1/b_1), \varphi_2 = \tan^{-1}(a_2/b_2), R_S = \sqrt{a_1^2 + b_1^2},$ and $R_d = \sqrt{a_2^2 + b_2^2},$ where $\varphi_1$ and $\varphi_2$ are the initial phase shifts (or intrinsic phases) of the IF components associated with $\omega_1$ and $\omega_2$, respectively. The parameters $r_s$ and $r_d$ represent the envelopes of the systolic and diastolic IFs, respectively. The non-dimensional ratio $r_s/r_d$ is known as the envelope ratio (ER).

When applied to an arterial pressure waveform, the IF methodology treats the LV-arterial system as a coupled dynamical system (heart+aortic tree), which eventually decouples when the aortic valve closes. The IF method models such dynamical systems as objects rotating around an origin. The angular velocity of the rotation is defined as the intrinsic frequency. Hence, in the LV-arterial system, the average angular velocity during systole and diastole are the two IFs $\omega_1$ and $\omega_2$, respectively. The systolic IF parameters ($\omega_1$, $\varphi_1$, $r_s$) describe the dynamics of the coupled LV-arterial system, while the diastolic IF parameters ($\omega_2$, $\varphi_2$, $r_d$) are dominated by the dynamics of the arterial network. A visual representation of the corresponding parameters of $\omega_1$, $\omega_2$, $\varphi_1$, $\varphi_2$, $r_s$, $r_d$ during both the systolic and diastolic phases is illustrated in FIG. 5, described below.

Returning to FIG. 3, cardiac parameter extraction module 316 may generate and output data 320 representing a set of cardiac features extracted from the cardiac pressure waveform. For example, output data 320 may include intrinsic frequencies $\omega_1$ and $\omega_2$, intrinsic phase angles, $\varphi_1$ and $\varphi_2$, the intrinsic envelope of systole, $r_s$, the intrinsic envelope of diastole, $r_d$, the RHDN, the ER, or other cardiac features. Output data 320 may be stored in patient data database 136. In some embodiments, output data 320 may be stored in association with a pressure waveform, patient identifier, or other information.

Figure 6:
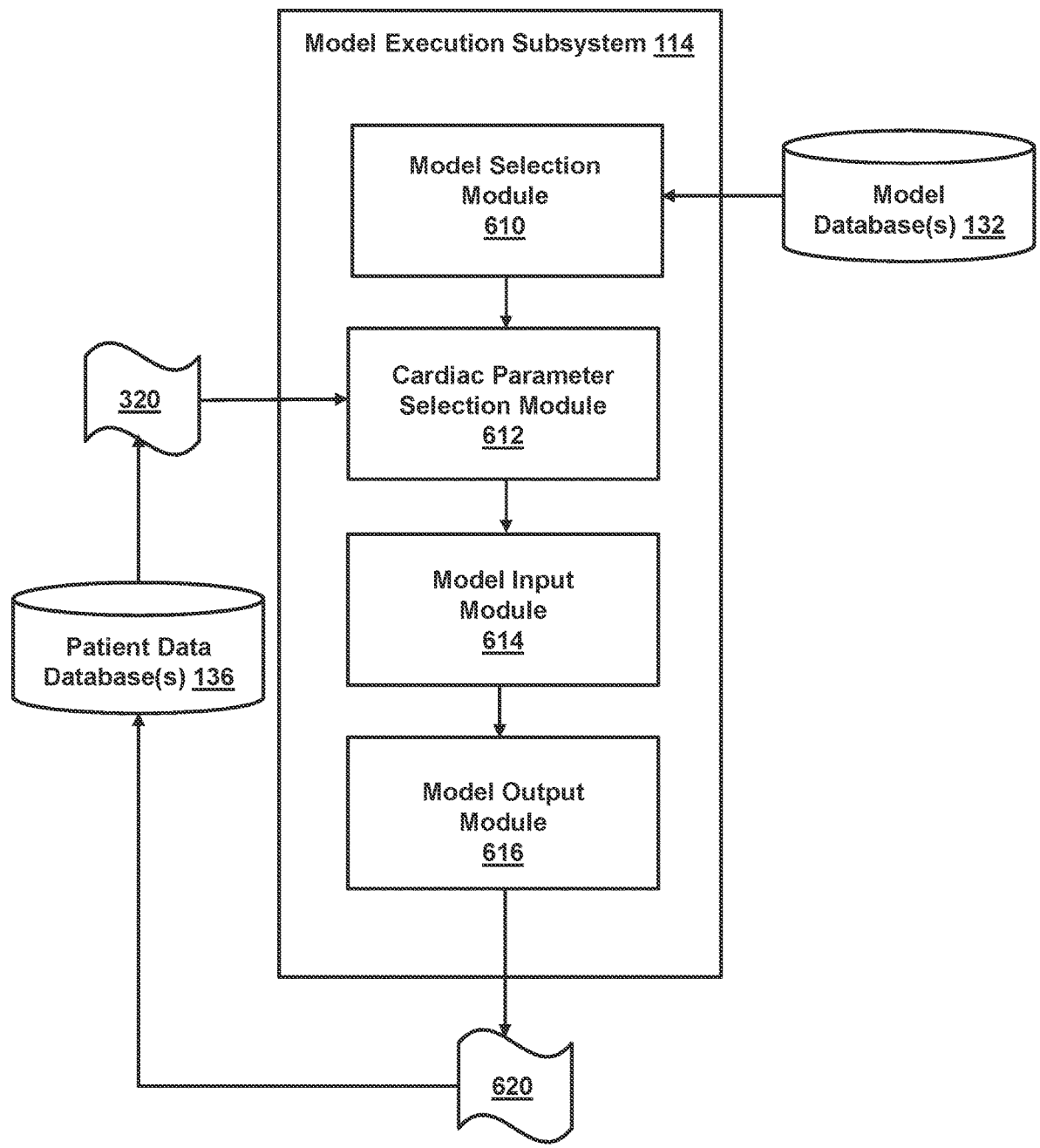
FIG. 6 illustrates an example model execution subsystem for executing a machine learning model for a given set of cardiac features, in accordance with various embodiments.

Returning to FIG. 1, model execution subsystem 114 may be configured to execute one or more machine learning models to determine various cardiac diagnoses. For instance, model execution subsystem 114 may execute a machine learning model trained to determine, based on an arterial pressure waveform, whether a patient has experienced one or more cardiac events (e.g., acute myocardial infarction, myocardial ischemia, etc.). Model execution subsystem 114 may also execute a machine learning model trained to determine, based on an arterial pressure waveform of a patient that experienced an MI, a size of that MI. As an example, with reference to FIG. 6, model execution subsystem 114 may include modules configured to execute tasks related to inputting output data 320 to a machine learning model and obtaining an output from the machine learning model, such as model selection module 610, cardiac parameter selection module 612, model input module 614, model output module 616, or other modules. Each of modules 610-616 may include software that executes certain tasks, and that software may be executed by one or more processors of the corresponding subsystem.

In some embodiments, model selection module 610 may select a machine learning model stored in model database 132 to be used to perform a particular task. Model selection module 610 may store various machine learning models, including trained machine learning models, which each may be trained to perform a particular analysis using output data 320. For example, model selection module 610 may select a trained machine learning model for determining whether a patient has experienced a cardiac event (e.g., an acute MI, myocardial ischemia, etc.). As another example, model selection module 610 may select a trained machine learning model for determining a size of a myocardial infarction experienced by a patient. In some embodiments, client device 104 may send a request to computing system 102 to perform a particular cardiac analysis for a patient, and the request may include an indication of a trained machine learning model to be selected, or criteria for selecting a trained machine learning model from the trained machine learning models stored within model database 132.

Cardiac parameter selection module 612 may obtain output data 320 including a set of cardiac features (e.g., computed from an arterial pressure waveform) of a patient's cardiac cycle. Depending on the type of analysis to be performed, and thus which trained machine learning model is to be executed, different input parameters may be needed. Cardiac parameter selection module 612 may select some or all of the set of cardiac features based on input requirements of the selected machine learning model. For instance, if the cardiac analysis to be performed is to determine whether a patient experienced one or more of a plurality of cardiac events (e.g., an acute MI, myocardial ischemia, etc.), cardiac parameter selection module 612 may be select, from the set of cardiac features, a first intrinsic frequency $\omega_1$, a systolic intrinsic phase angle $\varphi_1$, $r_d$, $r_d$, or other cardiac features. Persons of ordinary skill in the art will recognize that output data 320 may include the cardiac features needed for a given cardiac analysis, and in some cases, a selection from extracted set of cardiac features may not be needed.

Figure 7A:
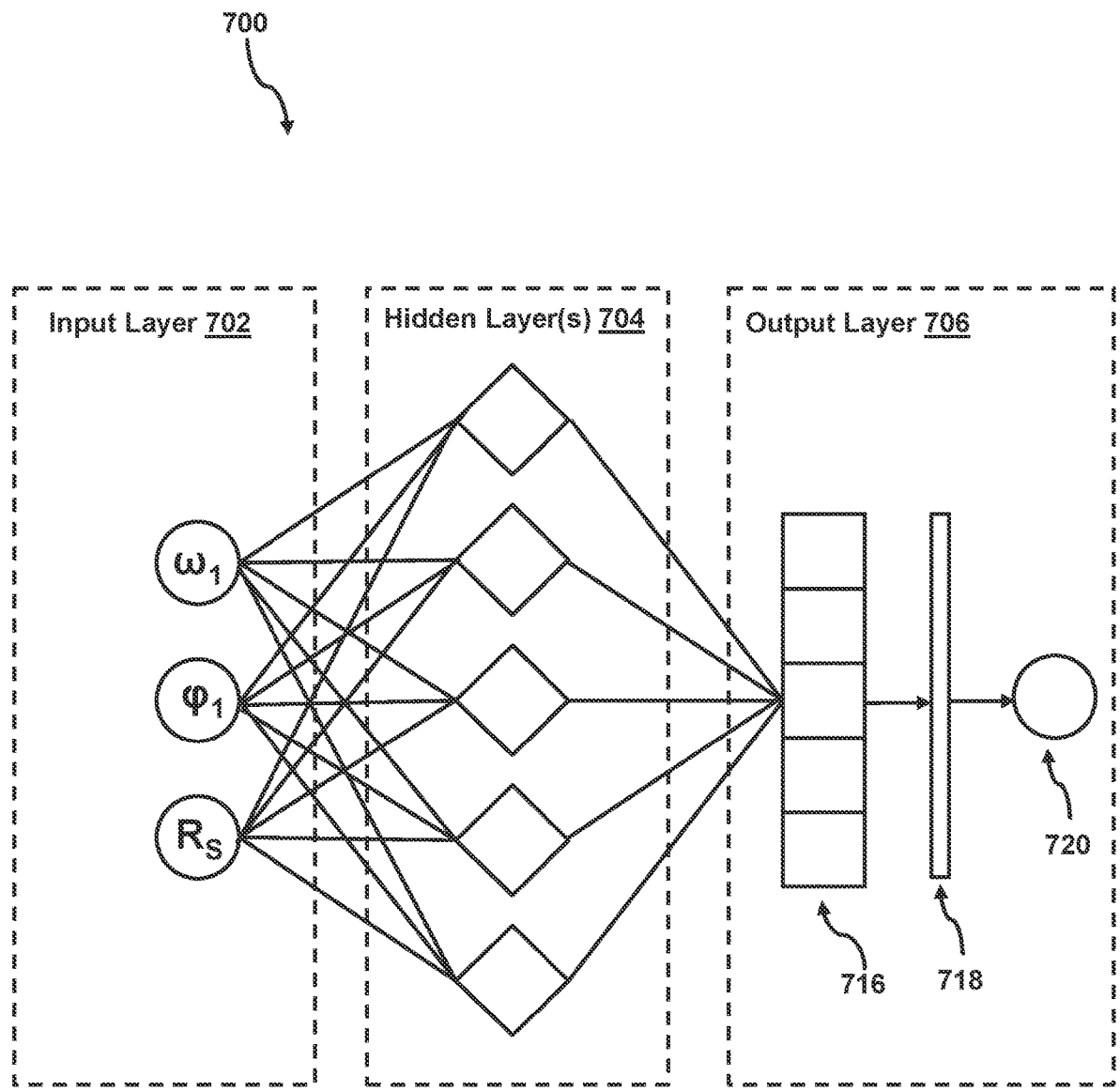
FIGS. 7A-7B are illustrative diagrams of example machine learning models for detecting cardiac events and determining a size of a myocardial infarction, respectively, in accordance with various embodiments.
Figure 7B:
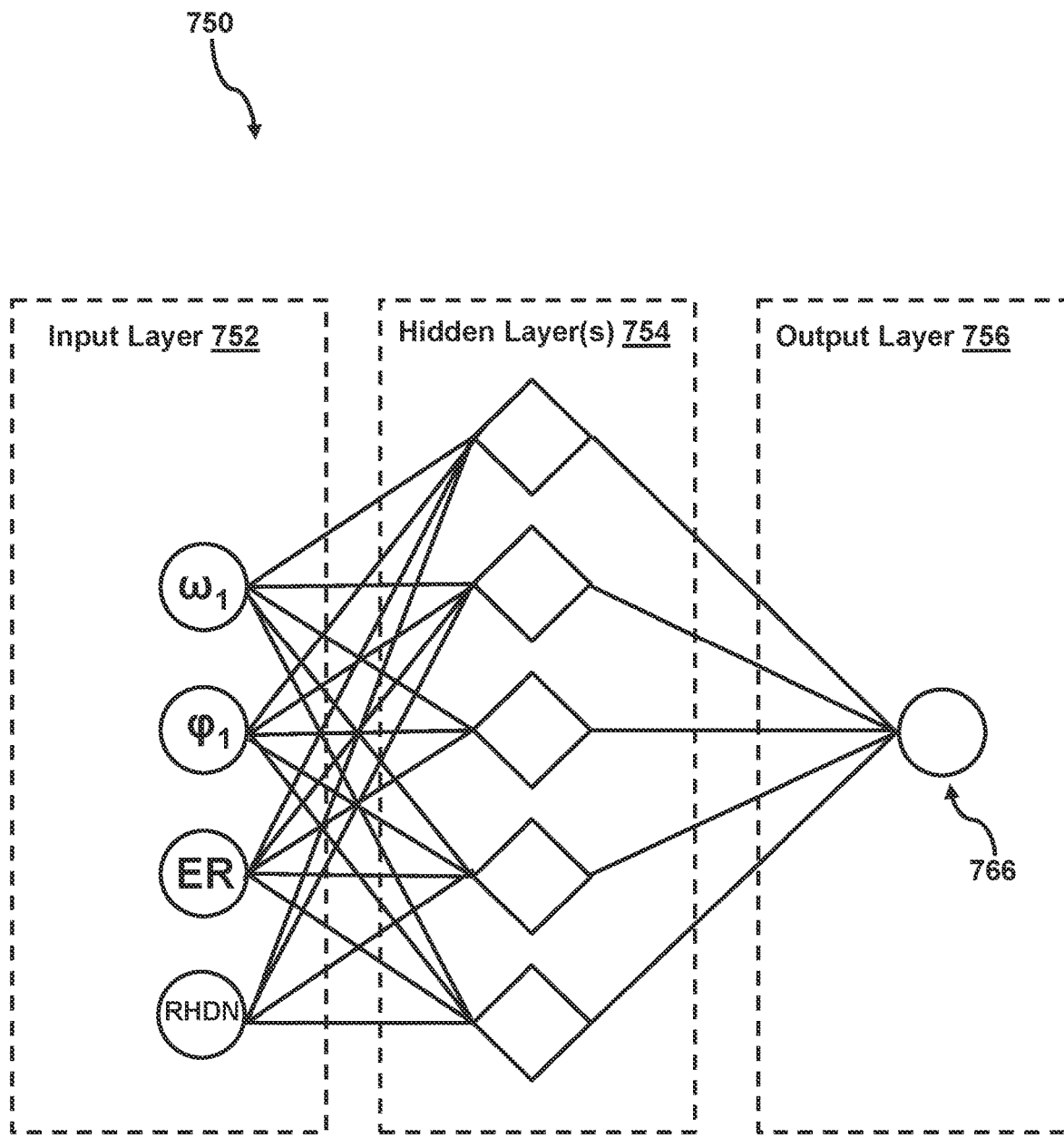

Model input module 614 may provide the selected cardiac features to the selected trained machine learning model, which may be configured to output a result 620 obtained by model output module 616. In some embodiments, the functionality of model input module 614 and model output module 616 may be combined into a single functional module. As an example, with reference to FIG. 7A, trained machine learning model 700 may be trained to determine whether a patient has experienced a cardiac event within a specified amount of time of the cardiac data being captured. As another example, with reference to FIG. 7B, trained machine learning model 750 may be trained to determine a size of a myocardial infarction experienced by a patient within a specified amount of time of the cardiac data being captured. The specified amount of time may differ between models 700 and 750, however they may also be the same or similar. Example amounts of times include within 24 hours of the MI, within 12 hours of the MI, within 2 hours of the MI, within 1 hour of the MI, or other amounts of time.

Trained machine learning models 700 and 750 may be any of the following types of machine learning models: Ordinary Least Squares Regression (OLSR), Linear Regression, Logistic Regression, Stepwise Regression, Multivariate Adaptive Regression Splines (MARS), Locally Estimated Scatterplot Smoothing (LOESS), Instance-based Algorithms, k-Nearest Neighbor (KNN), Learning Vector Quantization (LVQ), Self-Organizing Map (SOM), Locally Weighted Learning (LWL), Regularization Algorithms, Ridge Regression, Least Absolute Shrinkage and Selection Operator (LASSO), Elastic Net, Least-Angle Regression (LARS), Decision Tree Algorithms, Classification and Regression Tree (CART), Iterative Dichotomizer 3 (ID3), C4.5 and C5.0 (different versions of a powerful approach), Chi-squared Automatic Interaction Detection (CHAID), Decision Stump, M5, Conditional Decision Trees, Naive Bayes, Gaussian Naive Bayes, Causality Networks (CN), Multinomial Naive Bayes, Averaged One-Dependence Estimators (AODE), Bayesian Belief Network (BBN), Bayesian Network (BN), k-Means, k-Medians, K-cluster, Expectation Maximization (EM), Hierarchical Clustering, Association Rule Learning Algorithms, A-priori algorithm, Eclat algorithm, Artificial Neural Network Algorithms, Perceptron, Back-Propagation, Hopfield Network, Radial Basis Function Network (RBFN), Deep Learning Algorithms, Deep Boltzmann Machine (DBM), Deep Belief Networks (DBN), Convolutional Neural Network (CNN), Deep Metric Learning, Stacked Auto-Encoders, Dimensionality Reduction Algorithms, Principal Component Analysis (PCA), Principal Component Regression (PCR), Partial Least Squares Regression (PLSR), Collaborative Filtering (CF), Latent Affinity Matching (LAM), Cerebri Value Computation (CVC), Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA), Ensemble Algorithms, Boosting, Bootstrapped Aggregation (Bagging), AdaBoost, Stacked Generalization (blending), Gradient Boosting Machines (GBM), Gradient Boosted Regression Trees (GBRT), Random Forest, Computational intelligence (evolutionary algorithms, etc.), Computer Vision (CV), Natural Language Processing (NLP), Recommender Systems, Reinforcement Learning, Graphical Models, or separable convolutions (e.g., depth-separable convolutions, spatial separable convolutions, etc.).

Trained machine learning model 700 may include an input layer 702, one or more hidden layers 704, and an output layer 706. In some embodiments, input layer 702 includes three nodes, however additional or fewer nodes may be included. Each input node may receive one of a set of cardiac features capable if being used to determine whether a patient has recently experienced a cardiac event (e.g., such as an acute MI or myocardial ischemia). In some embodiments, trained machine learning model 700 may take, as input, a first intrinsic frequency $\omega_1$ associated with a systolic phase of a cardiac cycle, a systolic intrinsic phase angle $\varphi_1$, and an intrinsic envelope of systolic phase of the cardiac cycle. In some cases, an intrinsic envelope of the diastolic phase of the cardiac cycle may be used instead of the intrinsic envelope of systolic phase of the cardiac cycle. Furthermore, some cases may have a ratio of the intrinsic envelope of systolic phase of the cardiac cycle to the intrinsic envelope of the diastolic phase of the cardiac cycle.

Each node in input layer 702 may be fully connected to each node in hidden layer 704. However, for multiple hidden layers 704, some or all of the layers may be fully connected. Each node may include an activation function, such as a binary step function, a ReLU function, a Sigmoid function, a Softmax function, or other activation functions. In some cases, one or more of the nodes may include different activation functions. The outputs of hidden layers 704 may be provided to output layer 706.

In some embodiments, a classification vector 716 may be output from hidden layer 704. Classification vector 716 may be an n-dimensional classification vector, where each element includes a classification score representing a likelihood that the patient experienced one of n cardiac events. In some cases, trained machine learning model 700 may be trained such that it serves to detect whether a single type of cardiac event has occurred (e.g., whether the patient experienced an acute MI). In such cases, classification vector 716 may be a 1-dimensional vector, storing a classification score indicating how likely it is that the patient experienced an acute MI.

In some embodiments, output layer 706 may include a softmax layer 718 configured to take the outputs from the hidden layer(s) 704 and convert those classification scores to probabilities. Based on those probabilities, a determination may be made as to whether a given classification score satisfies a threshold condition. If so, then this indicates that the patient likely experienced a corresponding cardiac event. If not, then this may indicate that the patient did not experience from a corresponding cardiac event. In some embodiments, the threshold condition may be satisfied if the probability, or classification score, is greater than or equal to a threshold value. For example, if the probability that the patient experienced a certain cardiac event is greater than or equal to a threshold probability, then this indicates that the patient likely experienced the cardiac event, and thus may output result 720 indicating that the patient experienced the cardiac event, as well as, in some cases, the classification score, the probability, or both.

Trained machine learning model 750 may include an input layer 752, one or more hidden layers 754, and an output layer 756. In some embodiments, input layer 752 includes four nodes, however additional or fewer nodes may be included. Each input node may receive one of a set of cardiac features capable of being used to determine a size of an acute MI of a patient. In some embodiments, trained machine learning model 750 may take, as input, a first intrinsic frequency $\omega_1$ associated with a systolic phase of a cardiac cycle, a systolic intrinsic phase angle $\varphi_1$, an envelope ratio (ER) of the intrinsic envelope of the systolic phase to the diastolic phase, and a relative height of the dicrotic notch (RHDN).

Each node in input layer 752 may be fully connected to each node in hidden layer 754. However, for multiple hidden layers 754, some or all of the layers may be fully connected. Each node may include an activation function, such as a binary step function, a ReLU function, a Sigmoid function, a Softmax function, or other activation functions. In some cases, one or more of the nodes may include different activation functions. The outputs of hidden layers 754 may be provided to output layer 756.

In some embodiments, output layer 756 may output a result 766, which indicates an estimated size of the acute MI experienced by the patient. The estimated size may indicate an amount of carotid tissue that has become necrotic. In some embodiments, result 766 may be a numerical value between 0 and 1.0, a percentage, or other values.

Returning to FIG. 6, model output module 616 may obtain result 720 or result 766, depending on the model selected (e.g., trained machine learning model 700 or 750). Model output module 616 may generate output data including result 620, which may store result 720, 766 with the corresponding pressure waveform data, cardiac features, or other data for a particular patient. In some embodiments, patient data including result 720, 766, the pressure waveform data, cardiac features, and the like, for a patient may be stored in patient data database 136.

Figure 8:
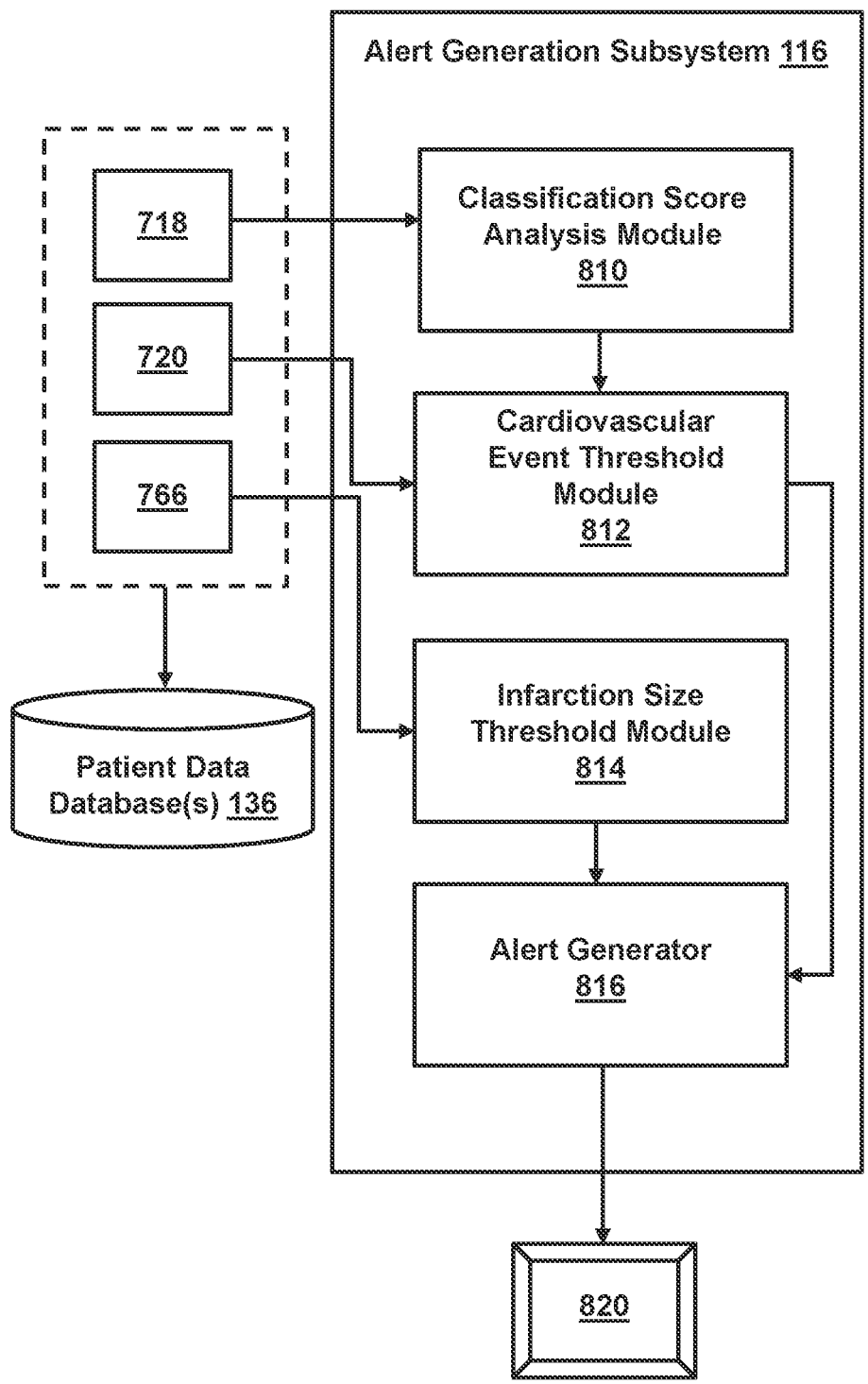
FIG. 8 illustrates an example alert generation subsystem for determining whether an alert should be generated regarding a patient's cardiac health, in accordance with various embodiments.

Returning to FIG. 1, alert generation subsystem 116 may be configured to determine whether an alert should be generated indicating result 720, 766, and other information about the patient's cardiac health. The alert may be provided to the patient, the patient's medical provider, or other entities. As an example, with reference to FIG. 8, alert generation subsystem 116 may include modules configured to execute tasks related to generating alerts regarding a patients cardiac health, as well as, or alternatively, determining whether the alert should be provided to the patient, the patient medical providers, other sources, or combinations thereof. The modules may include, for example, classification score analysis module 810, cardiovascular event threshold module 812, infarction size threshold module 814, alert generator 816, or other modules. Each of modules 810-816 may include software that executes certain tasks, and that software may be executed by one or more processors of the corresponding subsystem.

In some embodiments, classification score analysis module 810 may obtain classification vector 716 and determine a top N classification scores. The top N classification scores may be some or all of the classification scores determined by trained machine learning model 700. For example, a top classification score (e.g., for N=1), a top five classification scores (e.g., N=5), or other quantities of classification scores may be identified. In some embodiments, classification score analysis module 810 may apply a Softmax function to the classification scores to obtain a probability that the patient experienced one of the n possible cardiac events.

Cardiovascular event threshold module 812 may receive the top N classification scores, and may determine, for each classification score, whether that classification score satisfies a threshold condition. In some embodiments, the threshold condition may be satisfied when a given classification score is greater than or equal to a threshold classification score. For example, the threshold classification score may be 0.75, 0.80, 0.90, or other values. If the classification score satisfies the threshold condition, then that indicates that the patient experienced a corresponding cardiovascular event. For example, if the classification score associated with whether the patient experienced an acute MI is greater than a threshold classification score, specific to detection of acute MI or generalized for two or more cardiovascular events, then this indicates that trained machine learning model 700 determined that the patient likely experienced an acute MI (e.g., based on the cardiac features extracted from the patient's arterial pressure waveform). In some embodiments, cardiovascular event threshold module 812 may obtain result 720, indicating one or more cardiac events that the patient likely experienced. For instance, trained machine learning model 700 may determine, at output layer 706, a result indicating any cardiac events that the patient experienced based on the patient's arterial pressure waveform.

Alert generator 816 may obtain indications of which cardiac events the patients experienced, and may determine whether to generate an alert 820 to notify the patient, the patient's medical providers, or others, about the cardiac events experienced by the patient. In some embodiments, alert 820 may be generated whenever it has been determined that the patient experienced a cardiac event. Alert 820 may include a message, which may be textual, graphical, audible, or of another format, that is provided to the patient. Alert 820 may be provided to client devices 104 associated with the patient, the patient's medical providers, or others. In some embodiments, the message included by alert 820 may indicate that the patient experienced a particular cardiac event (or events). The message may also indicate that emergency assistance is needed for the patient, one or more therapies to be provided to the patient, or other information. Some cases include alert generator 816 contacting emergency services (e.g., automatically contacting police, emergency medical services, fire department, etc.).

Infarction size threshold module 814 may be configured to determine whether an infarct size, determined by trained machine learning model 750, satisfies a threshold infarction size condition. The threshold infarction size condition may be satisfied when an infarction size, indicated by result 766, is greater than or equal to a threshold infarction size. For example, if result 766 indicates that the infarction size is 20% (e.g., as a function of total heart tissue), and the threshold infarction size is 10%, then the infarction size can be said to satisfy the threshold infarction size condition. In some embodiments, alert generator 816 may be configured to generate and provide alert 820 to the patient, the patient's medical providers, or others, if the infarction size estimated by trained machine learning model 750 satisfies the threshold infarction size condition.

Returning to FIG. 1, model training subsystem 118 may be configured to train, re-train, update, reset, or perform other functions to obtain a trained machine learning model capable of being used as described herein. For instance, trained machine learning models 700 and 750 may be trained to determine whether a patient experienced a cardiovascular event and a size of a myocardial infarction experienced by a patient, respectively.

Figure 9:
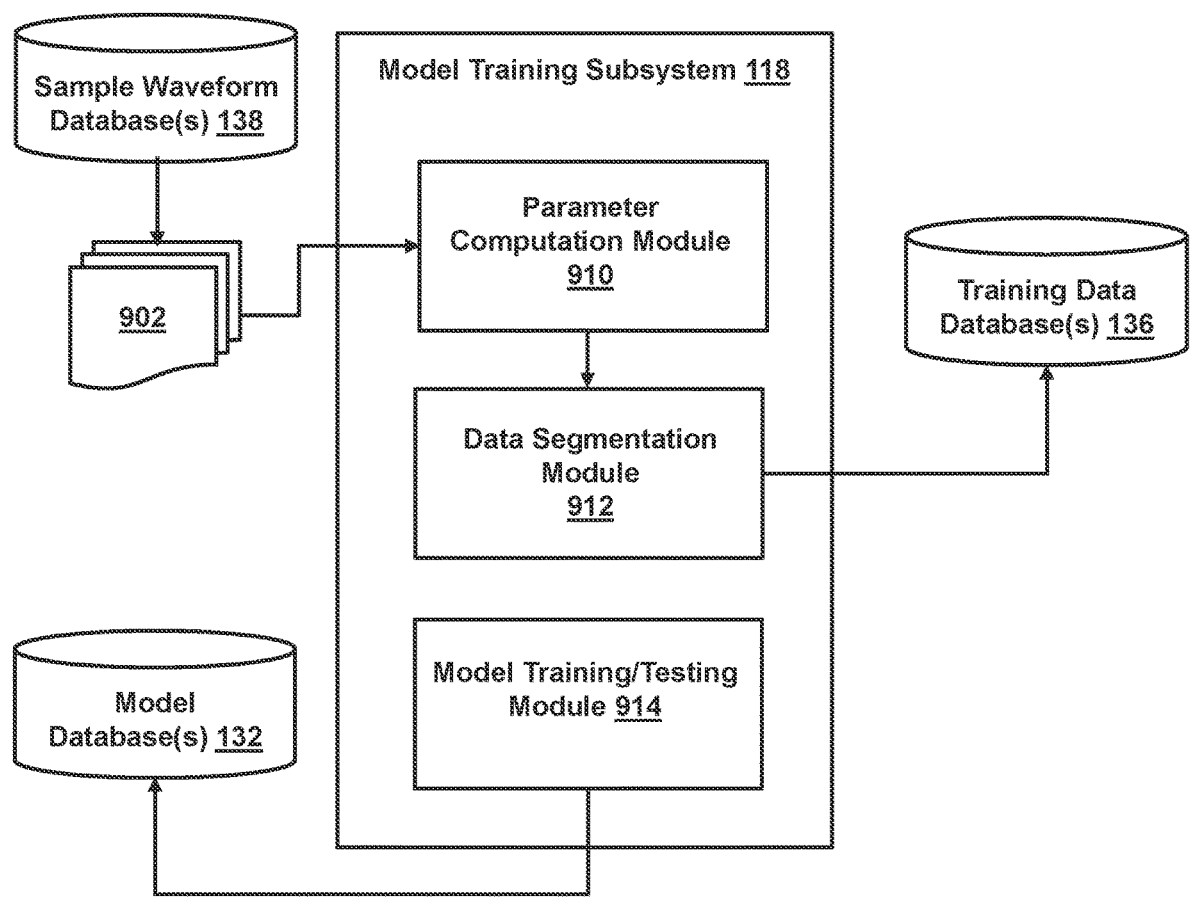
FIG. 9 illustrates an example model training subsystem for training and testing a machine learning model, in accordance with various embodiments.

With reference to FIG. 9, model training subsystem 118 may include a parameter computation module 910, a data segmentation module 912, a model training/testing module 914, or other modules. Each of modules 910-914 may include software that executes certain tasks, and that software may be executed by one or more processors of the corresponding subsystem.

Parameter computation module 910 may be configured to obtain datasets 902 from pressure/ECG database 138. Depending on the model to be trained (e.g., the function to be provided by the trained model), different datasets may be retrieved from pressure/ECG database 138. For example, if the model is to be trained to determine whether a patient experienced from one or more of a plurality of cardiovascular events, then datasets 902 may include a first set of waveforms (e.g., arterial pressure waveforms, pulse/heart rate waveforms, PTT waveforms, PPG waveforms, etc.) of patients who have experienced from one (or more) of the plurality of cardiovascular events, and a second set of waveforms of patients who have not experienced from the plurality of cardiovascular events. In some cases, each waveform included in datasets 902 may include metadata indicating a type of cardiac event experienced by a corresponding patient or metadata indicating that the patient has not experienced any cardiovascular events. Although the aforementioned example has datasets 902 including waveforms of a patient's arterial pressure/pulse-oxygen level, datasets 902 may, alternatively, include cardiac features extracted from each patient's waveform.

Parameter computation module 910 may be configured to compute one or more cardiac features from the waveforms included in datasets 902. For example, for each waveform (e.g., arterial pressure waveform, pulse-ox waveform, etc.), intrinsic frequencies $\omega_1$ and $\omega_2$, a systolic intrinsic phase angles $\varphi_1$ and $\varphi_2$, intrinsic envelopes $r_d$ and $r_s$, envelope ratio (ER), and a relative height of the dicrotic notch (RHDN), or other cardiac features. As detailed above, for a given arterial pressure waveform, an estimate of the cardiac features may be extracted using the intrinsic frequency (IF) method. In general, the IF method applies an adaptive sparse time-frequency representation (STFR) to an arterial pressure wave to extract the instantaneous frequency $$\left(\dot{\theta}_1(t) = \frac{d\theta_1}{dt}\right)$$

of the first intrinsic mode function (IMF; where $\theta_1$ is the phase angle of the first IMF) to determine a dominant instantaneous frequency on either side of the pressure waveform's dicrotic notch. To extract the intrinsic frequencies $\omega_1$ and $\omega_2$, the instantaneous frequency of the heart-aorta and decoupled aorta are taken to be piecewise constant in time. Doing so enables the intrinsic frequencies to be extracted from an arterial blood pressure waveform. The intrinsic frequencies are that carry the maximum power for Equation 4:

$$s(t) = \sum_{i=1}^{M} a_i(t)\cos\theta_i(t). \qquad \text{Equation 4}$$

To extract the intrinsic frequencies (IFs), a norm-2 ($L_2$) minimization technique. The envelopes of the IMF may also be piecewise constant in time. The $L_2$ minimization problem may then be represented by Equation 5:

$$\min: \|f(t) - \chi(0, T_0)s_1(t) - \chi(T_0, T)s_2(t) - c\|_2^2. \qquad \text{Equation 5}$$

Equation 5 is subject to the following constraints:

$$a_1 \cos(\omega_1 T_0) + b_1 \sin(\omega_1 T) = a_2 \cos(\omega_2 T_0) + b_2 \sin(\omega_2 T_0); \quad \text{Equation 6}$$

$$a_1 = a_2 \cos(\omega_2 T) + b_1 \sin(\omega_2 T); \qquad \text{Equation 7}$$

$$s_1(t) = a_1 \cos(\omega_1 t) + b_1 \sin(\omega_1 t); \qquad \text{Equation 8}$$

$$s_2(t) = a_2 \cos(\omega_2 t) + b_2 \sin(\omega_2 t); \qquad \text{Equation 9}$$

$$\chi(a, b) = \begin{cases} 1 & a \le t \le b \\ 0 & \text{otherwise} \end{cases}. \qquad \text{Equation 10}$$

Additionally, in Equation 5, c is a constant. Thus, based on Equations 6-10, Equation 5 may be transformed into solving for $a_1$, $a_2$, c, $b_1$, $b_2$, $\omega_1$, and $\omega_2$. Time $T_0$ refers to the time of the dicrotic notch in the pressure wave. The minimization states that the aortic input pressure wave can be approximated by two incomplete sinusoids with different frequencies, the intrinsic frequencies $\omega_1$, and $\omega_2$, where $\omega_1$ is the intrinsic frequency for the heart+aorta system (e.g., before aortic valve closure=before the dicrotic notch), and $\omega_2$ is the intrinsic frequency for the decoupled aorta (e.g., after aortic valve closure=after dicrotic notch). Using trigonometric identifies, Equation 5 can be transformed into Equation 11:

$$\min: \|p(t) - \chi(0, T_0)[r_S\sin(\omega_1 t + \varphi_1)] - \qquad \text{Equation 11}$$
$$\chi(T_0, T)[r_d\sin(\omega_2 t + \varphi_2)] - c\|_2^2.$$

From Equation 11, the cardiac features $\omega_1$, $\omega_2$, $\varphi_1$, $\varphi_2$, $r_d$, $r_s$, ER, RHDN, or other parameters, may be extracted.

Data segmentation module 912 may obtain a set of cardiac features for each waveform of a first plurality of waveforms respectively corresponding to a first plurality of patients that have experienced from one or more of a plurality of cardiac events (e.g., acute MI, myocardial ischemia, etc.) and may obtain a set of cardiac features for each waveform of a second plurality of waveform, respectively corresponding to a second plurality of patients that have not experienced from any of the plurality of cardiac events (e.g., patients that have not experienced an acute MI). In some embodiments, waveform data may be updated to include the cardiac features, such that, for each waveform of the first and second pluralities of waveforms, the waveform data indicates each of the cardiac features computed for a given waveform and, if available, a label indicating a type of cardiac event that was experienced for a given patient. The waveform data may be provided to training data database 134 as training data, which will be used to train a machine learning model (e.g., trained machine learning model 700). In some embodiments, waveforms of the first plurality of waveforms that correspond to acute MIs may be selected for training of a machine learning model (e.g., trained machine learning model 750) to estimate an infarct size of the acute MI. Thus, for some or all of the selected waveforms (e.g., waveforms of patients that have experienced acute MI), a value indicating an infarct size determined using traditional techniques (e.g., ECGs, MRIs, computed tomography (CT) scans, single photon emission computed tomography (SPECT) scans, or other techniques.

In some embodiments, data segmentation module 812 may segment the cardiac data (e.g., waveforms, cardiac features, labels, values, etc.) into training data and testing data. The training data may be used to train machine learning model 700, machine learning model 750, or both, however, different training data may be generated for each machine learning model. In some embodiments, one or more cardiac features, labels, values, or other data may be masked when stored. For example, a label indicating a type of cardiac event that a patient experienced may be masked in the training data, and may be unmasked for the testing data. As another example, a size of the infarct may be masked in the training data and may be unmasked in the testing data.

Figure 10:
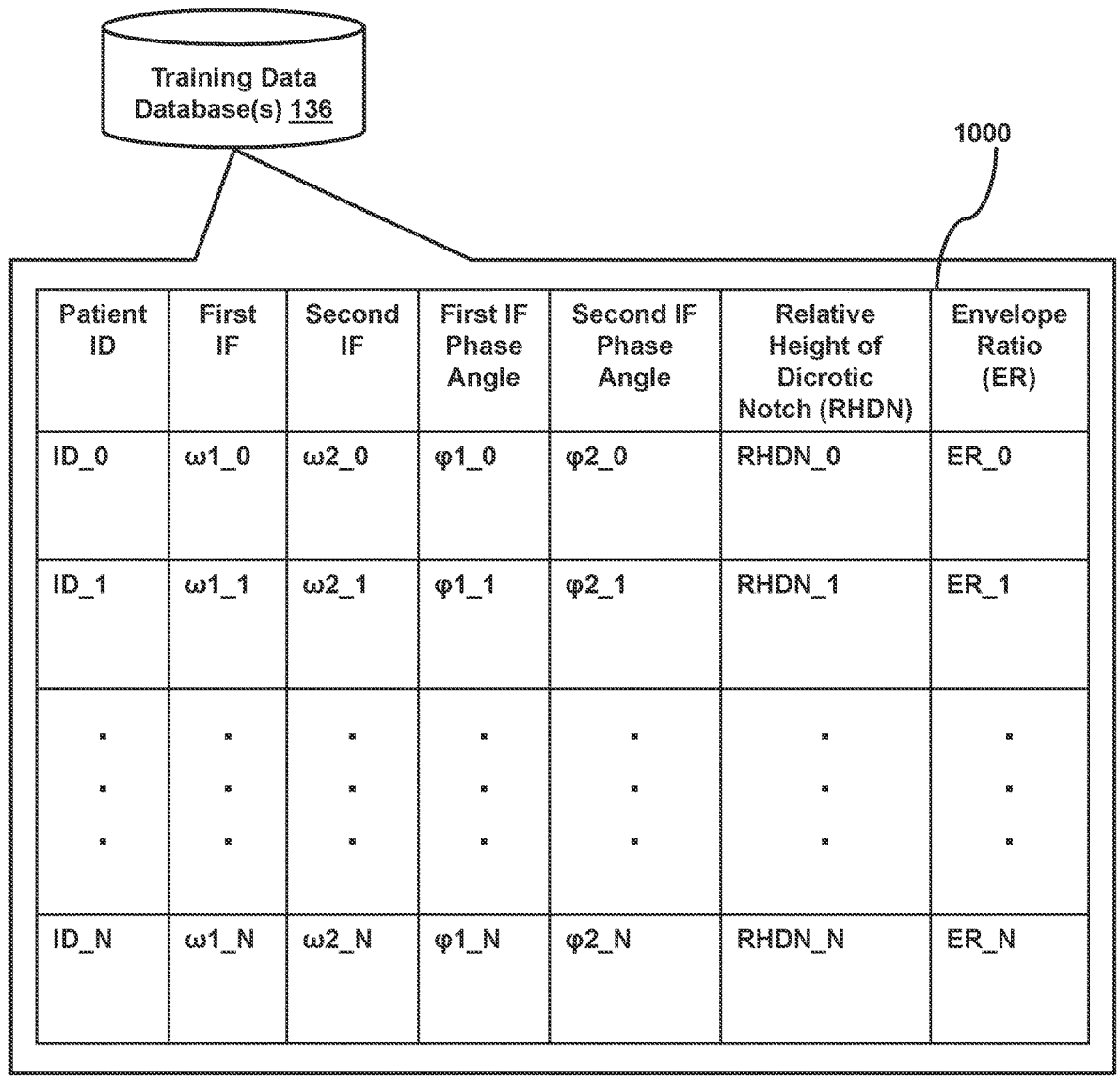
FIG. 10 is an example of a data structure used to store cardiac features included within training data for training a machine learning model, in accordance with various embodiments.

FIG. 10 is an example of a data structure 1000 used to store cardiac features included within training data for training a machine learning model, in accordance with various embodiments. Data structure 1000 includes N entries, each corresponding to a particular patient, indicating by patient identifiers ID_0-ID_N. In some cases, a given patient may have multiple entries, and so N may correspond to a number of different pressure waveforms of the patient IDs_0-ID_N. However, for simplicity, data structure 1000 includes N entries corresponding to N patients, where each patient has a single pressure waveform computed. In some embodiments, various cardiac features may be extracted/computed from that patient's pressure waveform based on the IF method, detailed above. (Alternatively different approaches may be used to compute certain cardiac features, and the concepts described herein are not limited to only those techniques.) For example, for each entry, and thus each patient (e.g., ID_0-ID_N), data structure 1000 may store intrinsic frequencies $\omega_1$ and $\omega_2$, systolic intrinsic phase angles $\varphi_1$ and diastolic intrinsic phase angle $\varphi_2$, intrinsic envelopes $r_d$ and $r_s$, envelope ratio (ER), and a relative height of the dicrotic notch (RHDN), or other cardiac features.

Returning to FIG. 9, model training/testing module 914 may be configured to train and test a given machine learning model using the training data and testing data stored within training data database 134. In some embodiments, model training/testing module 914 may execute one or more optimization techniques, such as gradient descent, to minimize an error of each machine learning model until the model's accuracy is determined to reach some threshold criteria (e.g., 75% or greater accuracy, 80% or greater accuracy, 90% or greater accuracy, or other accuracy values). After the threshold criteria is met, the trained machine learning model (e.g., trained machine learning models 700, 750) may be stored in model database 132. In some cases, some or all machine learning models, training data, or both, may be retrained, updated, or both. The updating and/or the retraining may occur periodically, such as daily, weekly, monthly, etc. In some cases, the updating/retraining may be performed in response to a request to have the training data updated or a model be retrained. In some embodiments, the updating/retraining may occur in response to determining that a model fails to produce accurate results (e.g., its accuracy falls below a threshold accuracy).

The various machine learning models stored by model database 132, trained and/or untrained, include, but are not limited to (which is not to suggest that any other list is limiting), any of the following: Ordinary Least Squares Regression (OLSR), Linear Regression, Logistic Regression, Stepwise Regression, Multivariate Adaptive Regression Splines (MARS), Locally Estimated Scatterplot Smoothing (LOESS), Instance-based Algorithms, k-Nearest Neighbor (KNN), Learning Vector Quantization (LVQ), Self-Organizing Map (SOM), Locally Weighted Learning (LWL), Regularization Algorithms, Ridge Regression, Least Absolute Shrinkage and Selection Operator (LASSO), Elastic Net, Least-Angle Regression (LARS), Decision Tree Algorithms, Classification and Regression Tree (CART), Iterative Dichotomizer 3 (ID3), C4.5 and C5.0 (different versions of a powerful approach), Chi-squared Automatic Interaction Detection (CHAID), Decision Stump, M5, Conditional Decision Trees, Naive Bayes, Gaussian Naive Bayes, Causality Networks (CN), Multinomial Naive Bayes, Averaged One-Dependence Estimators (AODE), Bayesian Belief Network (BBN), Bayesian Network (BN), k-Means, k-Medians, K-cluster, Expectation Maximization (EM), Hierarchical Clustering, Association Rule Learning Algorithms, A-priori algorithm, Eclat algorithm, Artificial Neural Network Algorithms, Perceptron, Back-Propagation, Hopfield Network, Radial Basis Function Network (RBFN), Deep Learning Algorithms, Deep Boltzmann Machine (DBM), Deep Belief Networks (DBN), Convolutional Neural Network (CNN), Deep Metric Learning, Stacked Auto-Encoders, Dimensionality Reduction Algorithms, Principal Component Analysis (PCA), Principal Component Regression (PCR), Partial Least Squares Regression (PLSR), Collaborative Filtering (CF), Latent Affinity Matching (LAM), Cerebri Value Computation (CVC), Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA), Ensemble Algorithms, Boosting, Bootstrapped Aggregation (Bagging), AdaBoost, Stacked Generalization (blending), Gradient Boosting Machines (GBM), Gradient Boosted Regression Trees (GBRT), Random Forest, Computational intelligence (evolutionary algorithms, etc.), Computer Vision (CV), Natural Language Processing (NLP), Recommender Systems, Reinforcement Learning, Graphical Models, or separable convolutions (e.g., depth-separable convolutions, spatial separable convolutions, etc.).

Figure 11:
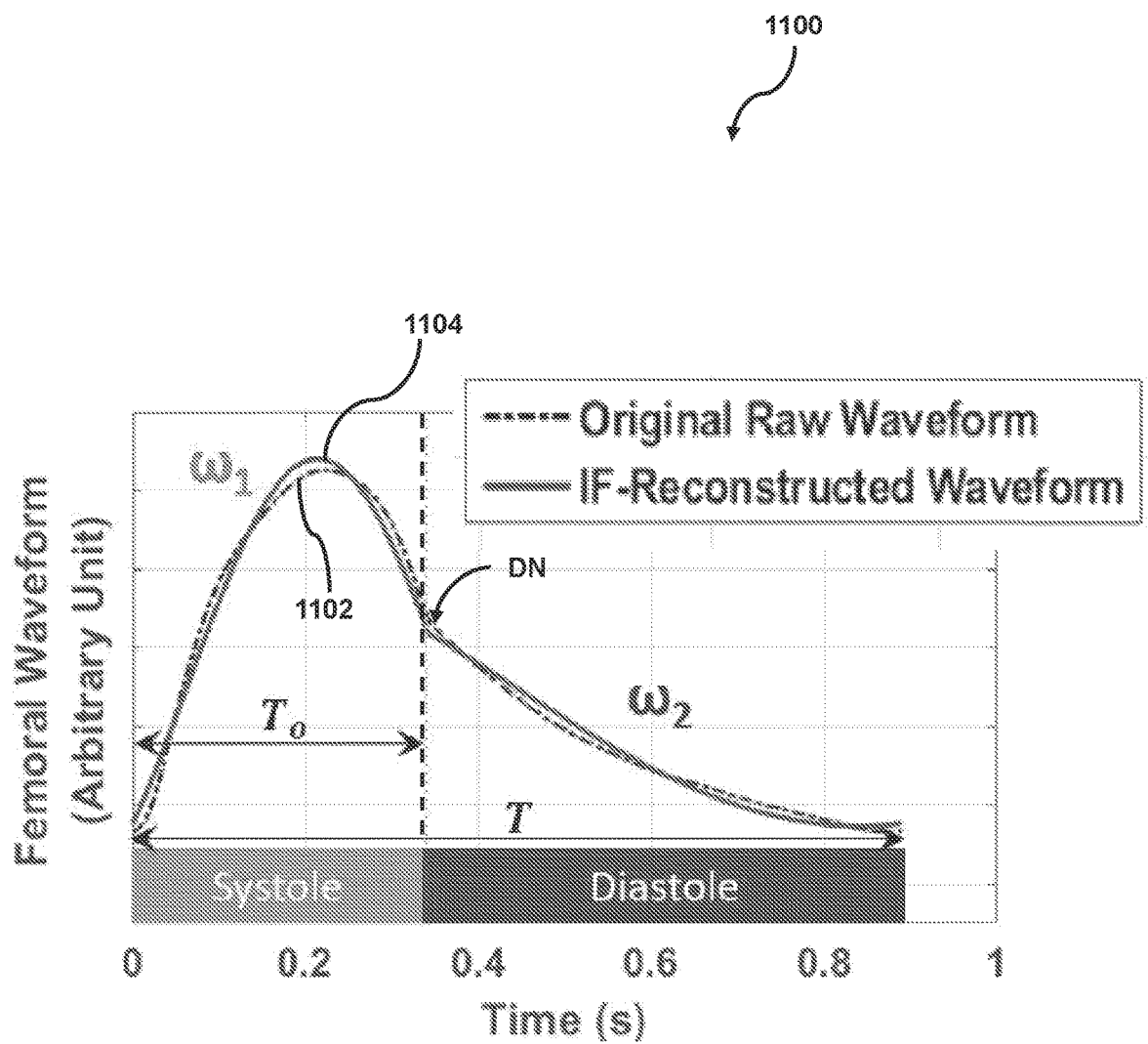
FIG. 11 is another example arterial pressure waveform including an IF-reconstruction of the waveform, in accordance with various embodiments.

Returning to FIG. 1, IF subsystem 112 may extract, from the pressure waveform of the patient (e.g., graph 400), various cardiac parameters, such as intrinsic frequencies $\omega_1$, $\omega_2$, intrinsic phase angles $\varphi_1$, $\varphi_2$, intrinsic envelopes $r_s$, $r_d$, ER (e.g., $r_s/r_d$), To (e.g., a time of the systolic phase of the cardiac cycle), T (e.g., a time of the cardiac cycle). The extracted cardiac parameters may then be used to model the pressure waveform and, subsequently, used to perform additional analysis to determine whether a patient is experiencing HF. As an example, with reference to FIG. 11, graph 1100 includes a first trace 1102 and a second trace 1104. First trace 1102 represents the original raw pressure waveform (e.g., femoral blood pressure waveform), while second trace 1104 represents the reconstructed pressure waveform generated using the IF parameters extracted using the IF methodology.

Figure 12:
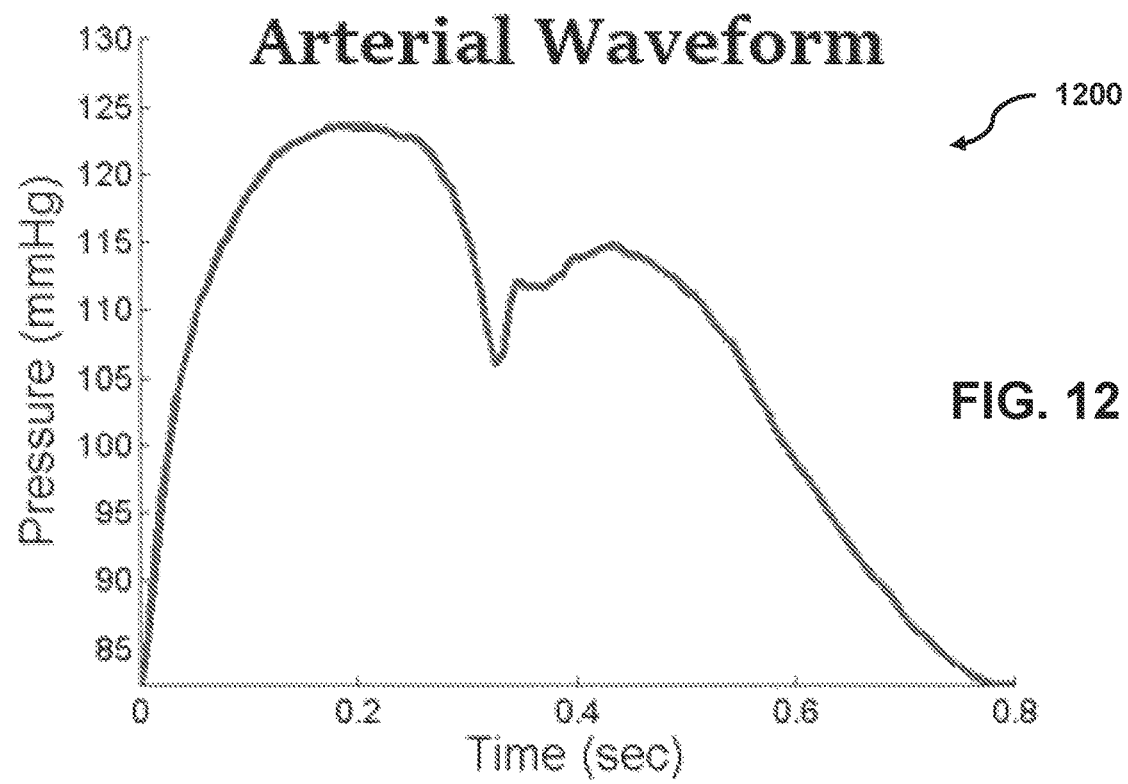
FIG. 12 is yet another example of an arterial pressure waveform, in accordance with various embodiments.

FIG. 12 is yet another example of an arterial pressure waveform 1200, in accordance with various embodiments. In particular, and as detailed below, the arterial pressure waveform may be a femoral blood pressure waveform captured using a non-invasive technique (e.g., via a wearable device).

As mentioned above, the IF methodology models the LV aorta system as an object rotating around an origin. A first intrinsic frequency $\omega_1$ represents the average angular velocity during a systolic phase of a cardiac cycle of a patient, and a second intrinsic frequency $\omega_2$ represents the average angular velocity during a diastolic phase of the cardiac cycle. The $L_2$ minimization of Equation 2 has a discontinuity at time $T_0$ (e.g., the dicrotic notch). The parameters $a_1$, $a_2$, $b_1$, $b_2$, c, $\omega_1$, $\omega_2$ are unknowns determined by solving Equation 2. The initial intrinsic phases ($\varphi_1$ and $\varphi_2$) and the envelopes ($R_s$ and $R_d$) are defined in terms of the parameters $a_1$, $b_1$, $a_2$, $b_2$ as $$\varphi_1 = \tan^{-1}(a_1/b_1), \varphi_2 = \tan^{-1}(a_2/b_2), R_S = \sqrt{a_1^2 + b_1^2}, \text{ and } R_d = \sqrt{a_2^2 + b_2^2},$$

where $\varphi_1$, and $\varphi_2$ are the initial phase shifts (or intrinsic phases) of the IF components associated with $\omega_1$ and $\omega_2$, respectively. The parameters $R_s$ and $R_d$ represent the envelopes of the systolic and diastolic IFs, respectively. The non-dimensional ratio $R_s/R_d$ is known as the envelope ratio (ER).

When applied to an arterial pressure waveform, the IF method treats the LV-arterial system as a coupled dynamical system (heart+aortic tree) which eventually decouples upon closure of the aortic valve. The systolic IF parameters ($\omega_1$, $\varphi_1$, $R_s$) describe the dynamics of the coupled LV-arterial system, and the diastolic IF parameters ($\omega_2$, $\varphi_2$, $R_d$) are dominated by the dynamics of the arterial network. Using the intrinsic frequencies and the dicrotic notch, the blood pressure waveform can be reconstructed. The LVEF, LV-arterial coupling, and central pulse wave velocity can be determined using the IF parameters. The LV contractility, Ctr, and afterload, AL, can be represented using functions of $\omega_1$ and $\omega_2$, (e.g., Ctr≈$f_1(\omega_1, \omega_2)$, AL≈$f_2(\omega_1, \omega_2)$).

Figure 14A:
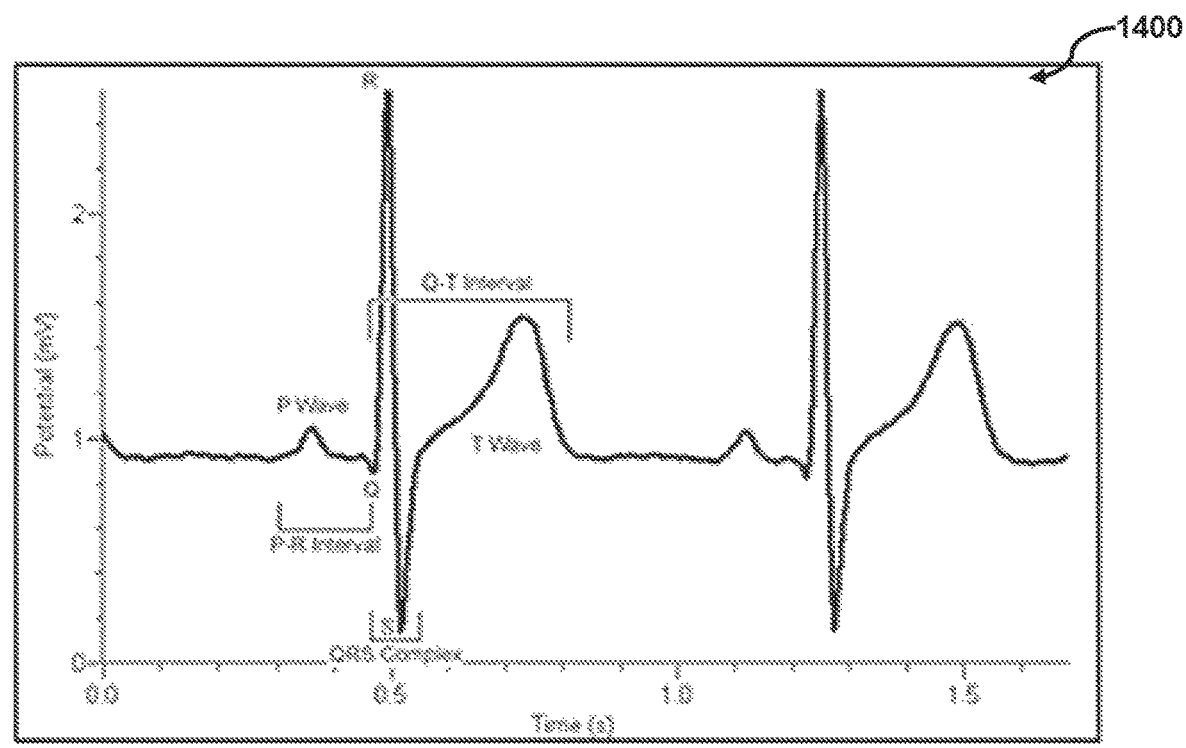
FIGS. 14A-14B illustrate an example electrocardiogram (ECG) and a pressure waveform mapped to an example ECG, respectively, in accordance with various embodiments.
Figure 14B:
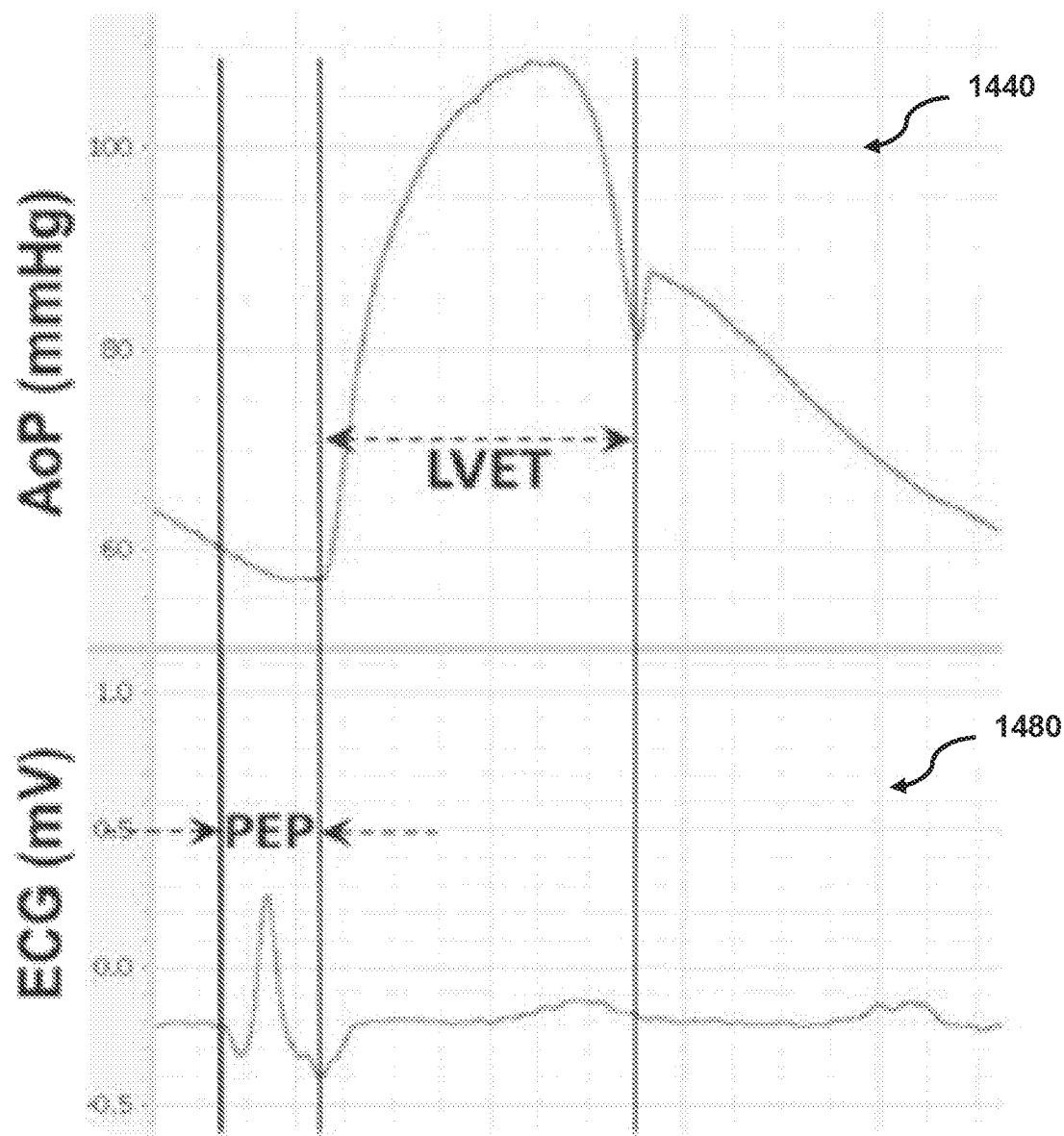

The LV ejection time (LVET) is the amount of time between the aortic valve opening and the aortic valve closing (e.g., marked by the dicrotic notch). The pre-ejection period (PEP) is the amount of time between the beginning of the QRS complex and the opening of the aortic valve. As seen from ECG 1400 of FIG. 14A, the QRS complex is a combination of the Q, R, and S wave of the ECG. The LV preload is inversely proportional to the PEP at a given LV contractility and afterload. As seen from FIG. 14B, the cardiac pressure waveform 1440 and the ECG 1480 may be measured simultaneously (e.g., within 1 millisecond of one another, within 0.1 milliseconds of one another, within 0.01 milliseconds of one another, etc.).

Figure 13:
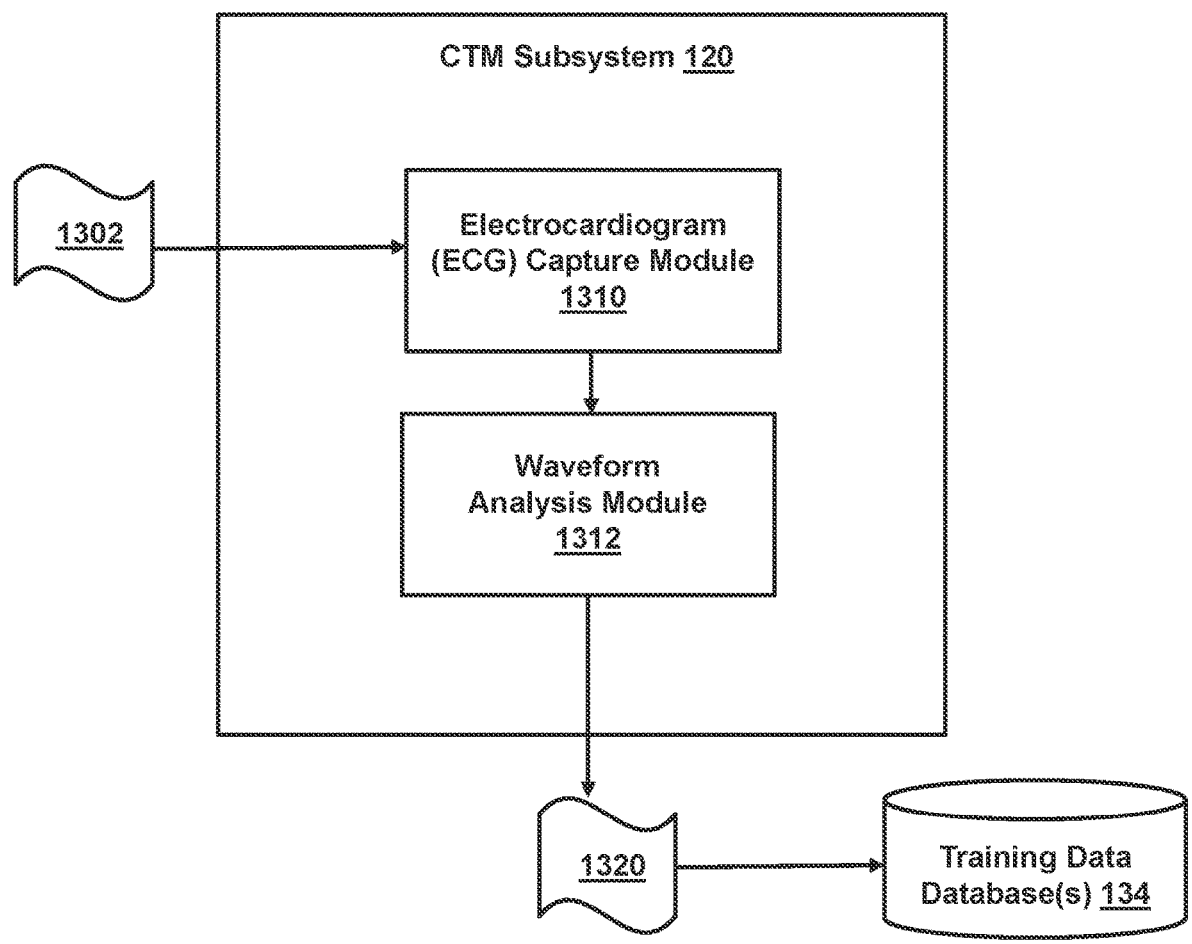
FIG. 13 illustrates an example cardiac triangle mapping (CTM) subsystem for computing CTM features, in accordance with various embodiments.

FIG. 13 illustrates an example cardiac triangle mapping (CTM) subsystem for computing CTM features, in accordance with various embodiments. In some embodiments, CTM subsystem 120 may include an electrocardiogram capture module 1310, a waveform analysis module 1312, or other modules. Each of modules 1310-1312 may include software that executes certain tasks, and that software may be executed by one or more processors of the corresponding subsystem.

Cardiac Triangle Mapping (CTM) is a systems-based approach for determining LVEDP by extracting information stored between arterial pressure waveforms (i.e., IF parameters) and ECGs (i.e., the onset of the Q-wave up to the opening of the aortic valve). Ventricular function can be modulated by three factors: (i) the contractile state of the myocardium (contractility); (ii) the afterload (which is related to vascular function and LV-arterial coupling); and (iii) the preload (which can be quantified by LVEDP). The scientific rationale of CTM is based on the ability of IFs to quantify contractility, LV-arterial coupling, and afterload from pressure waveforms together with the observation that the pre-ejection period (PEP) changes proportionally with LVEDP at a fixed contractility and afterload. Additional details regarding the CTM methodology, including clinical efficacy of the technique, is included within "Cardiac Triangle Mapping: A New Systems Approach for Noninvasive Evaluation of Left Ventricular End Diastolic Pressure," Pahlevan et al., *Fluids* 2019, 4, 16, the contents of which are incorporated herein by reference in their entireties.

The intrinsic frequencies $\omega_1$ and $\omega_2$ may be extracted from the arterial pressure waveform, and do not provide information regarding the state of the LV preload. However, PEP is related to LV preload, and since $\omega_1$ and $\omega_2$ are not, PEP is non-parallel (e.g., orthogonal) to the IF parameters (e.g., $\omega_1$, $\omega_2$). Therefore, the IFs and PEP form a complete set of variables that can map the LV dynamics and provide information about the hemodynamics of the LV. The CTM methodology relates the Ifs $\omega_1$, $\omega_2$ and PEP to the global ventricle function via Equation 12:

$$F(\text{Ctr,AL,preload})=G(\omega_1,\omega_2,\text{PEP}) \quad \text{Equation 12.}$$

Thus, similarly to the Ctr and AL functional relationship mentioned above, the LVEDP can be represented as a function of the intrinsic frequencies $\omega_1$ and $\omega_2$ (e.g., LVEDP=$\lambda f_3$ (IFs, PEP)). Geometrically, the LV performance can be represented as a triangle, referred to as the cardiac triangle, with sides PEP and afterload minus LVEDP, and a hypotenuse Ctr. Therefore, Ctr can be approximated by Equation 13:

$$Ctr = \frac{AL - LVEDP}{PEP}. \quad \text{Equation 13}$$

Figure 15A:
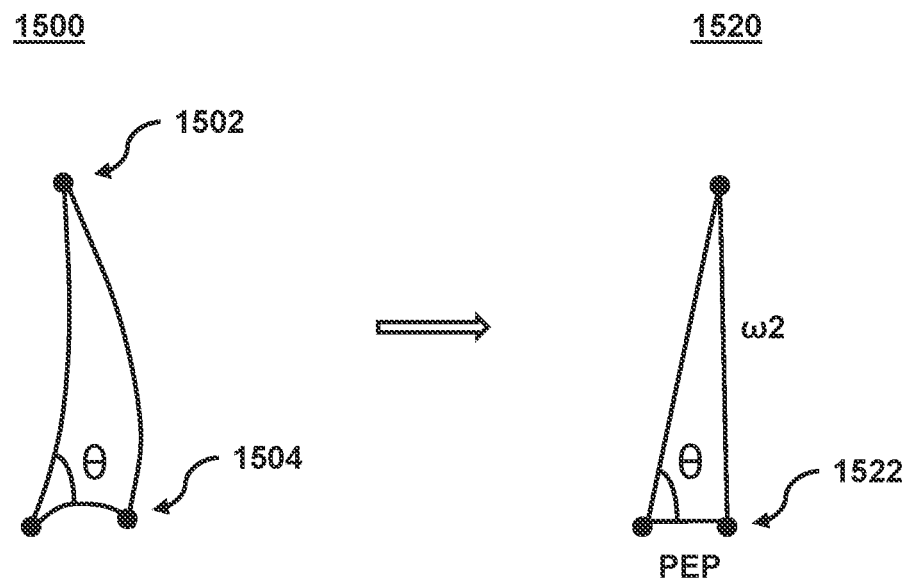
FIGS. 15A-15B illustrate an example of a maximum rate of change of a rising portion of a systolic phase of a cardiac cycle and a systolic and diastolic pressure, respectively, in accordance with various embodiments.

The cardiac parameters can then form the edges and angles of the cardiac triangle, as seen from triangle 1500 of FIG. 15A, where point 1502 represents the afterload and point 1504 represents preload LVEDP. As seen from triangle 1500, the edges maybe curvilinear. From Equation 13, the full state of the LV performance may be formed from a triangle of $\omega_1$, $\omega_2$, and PEP, referred to as cardiac triangle 1520 of FIG. 15A. Thus, point 1522 represents the LVEDP, and can be computed using Equation 14:

$$\text{LVEDP=AL−Ctr×PEP} \quad \text{Equation 14.}$$

Equation 14 can then be represented using Equation 15:

$$\text{LVEDP}=f_2(\omega_1,\omega_2)-f_1(\omega_1,\omega_2)\times\text{PEP} \quad \text{Equation 15.}$$

Figure 15B:
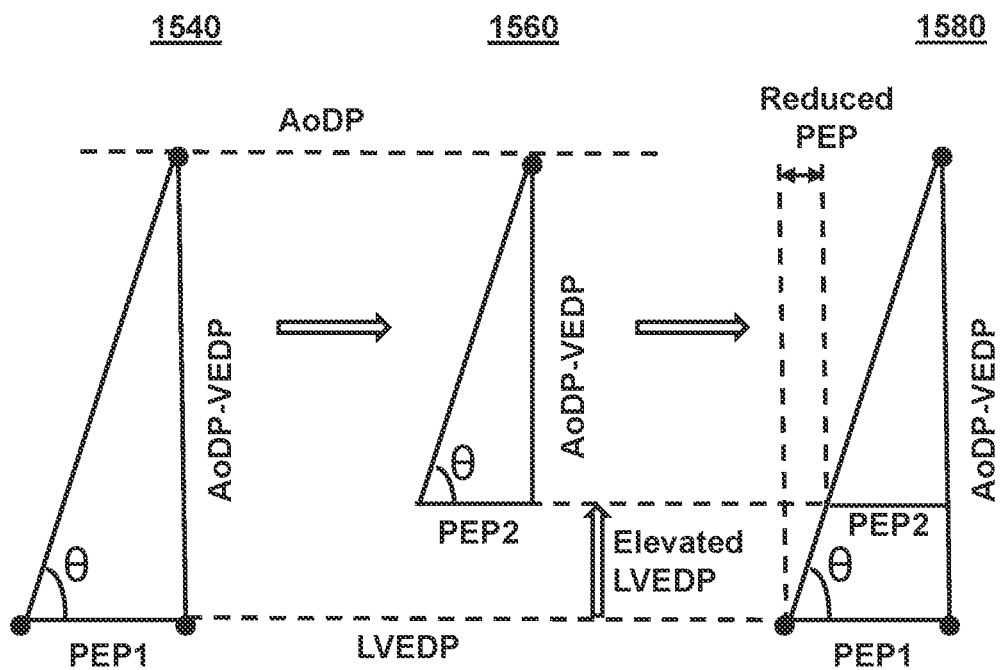

As seen from triangles 1540, 1560, 1580 of FIG. 15B, an elevated LVEDP can cause a reduced PEP at fixed LV contractility (e.g., angle θ) and aortic diastolic pressure (AoDP).

Returning to FIG. 13, ECG capture module 1310 may be configured to capture ECG data 1302 from client device 104, patient data database 136, or other components of system 100. In some embodiments, the ECG data may be captured contemporaneously with pressure data 302. ECG data 1302 may include an ECG waveform, as seen by ECGs 1400 and 1480 of FIGS. 14A and 14B. In some embodiments, multiple ECGs may be captured (in parallel with capture of the pressure waveforms), and one or more of the captured ECGs may be selected based on a signal quality of the ECGs. In some embodiments, additional signal processing steps may be performed to the ECG by ECG capture module 1310. For example, noise may be reduced, a factor may be applied to the ECG to align/match units with the pressure waveform, or other processing steps.

Figure 16:
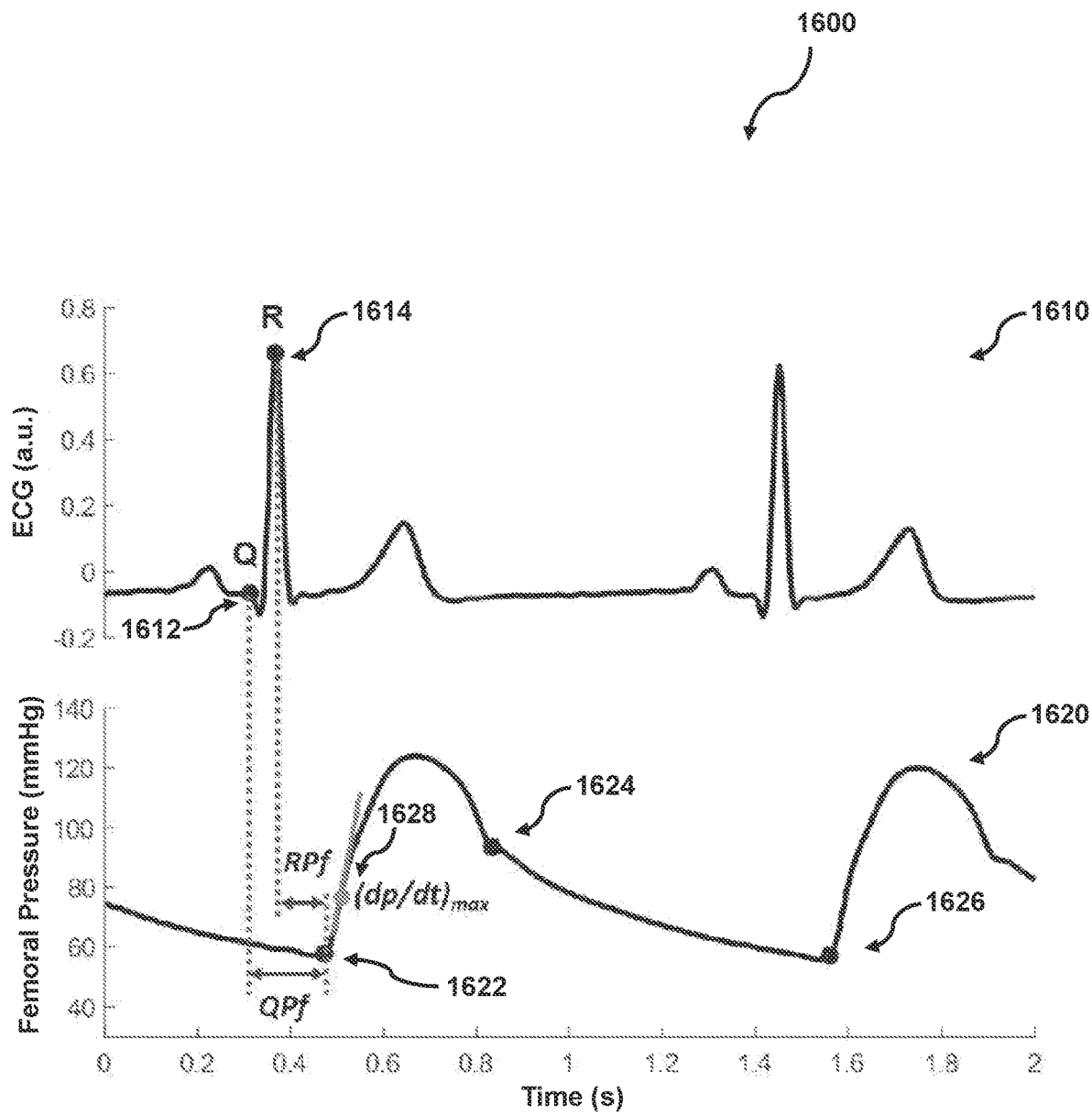
FIG. 16 illustrates an example ECG mapped to an example pressure waveform, in accordance with various embodiments.
Figure 17A:
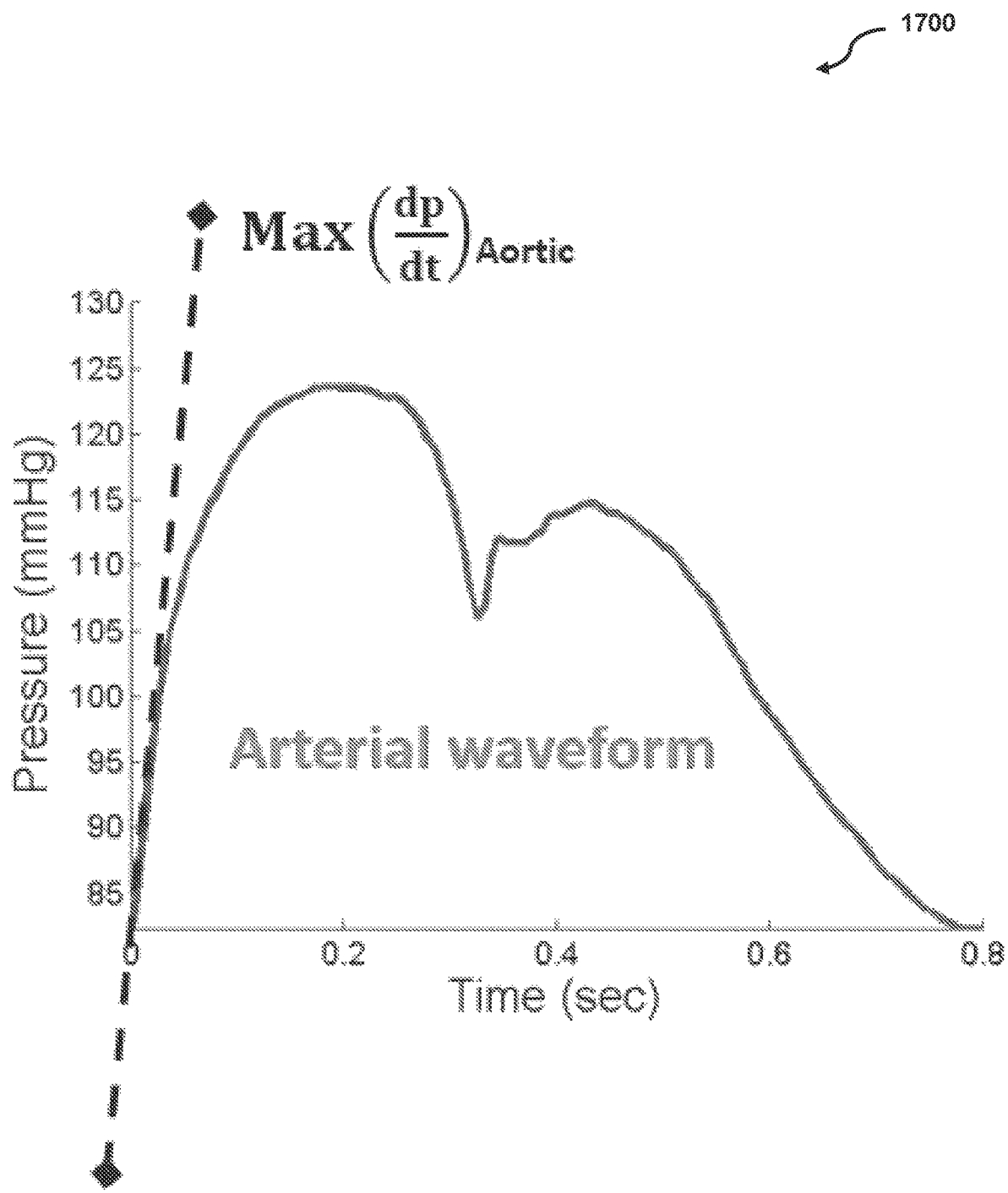
FIGS. 17A-17B illustrate example schematic of CTM used to determine an LVEDP of a patient, in accordance with various embodiments.

As seen, with reference to FIG. 16, waveform analysis module 1312 may be generate graph 1600 including ECG 1610 and blood pressure waveform 1620. In some embodiments, an ECG and blood pressure may be adjusted so that they may be plotted together within graph 1600 (e.g., such as by multiplying the data of one by a factor to balance out units). In some embodiments, waveform analysis module 1312 may be further configured to identify, from ECG 1610, a beginning of a QRS complex 1612 and a 1614 representing an apex of an R-wave of the ECG. Waveform analysis module 1312 may also be configured to identify, from a femoral (or other arterial site) blood pressure waveform 1620, a point 1622 representing a beginning of the waveform, a point 1624 representing a dicrotic notch of the waveform, and a point 1626 representing an end of the waveform. In some embodiments, waveform analysis module 1312 may determine a QP$f$ representing an amount of time between the femoral pressure wave's onset (e.g., point 1622) and Q-wave's onset (e.g., point 1612). Waveform analysis module 1312 may also determine an RP$f$ representing the femoral pressure wave's onset (e.g., point 1622) and the R-wave's apex (e.g., point 1614). Furthermore, a maximum slope 1628 of the arterial pressure wave during a rising portion of the femoral pressure wave may be calculated. An example of the maximum slope of the rising portion of an arterial pressure waveform may be seen by waveform 1700 of FIG. 17A. In some embodiments, a slope (e.g., dp/dt) along each point of the rising portion of the arterial pressure wave may be computed, and a maximum slope may be identified. In some cases, a Lagrange polynomial approximation using a high-order (e.g., 19-point) stencil may be used to calculate the maximum slope (e.g., Max (dp/dt)).

Figure 17B:
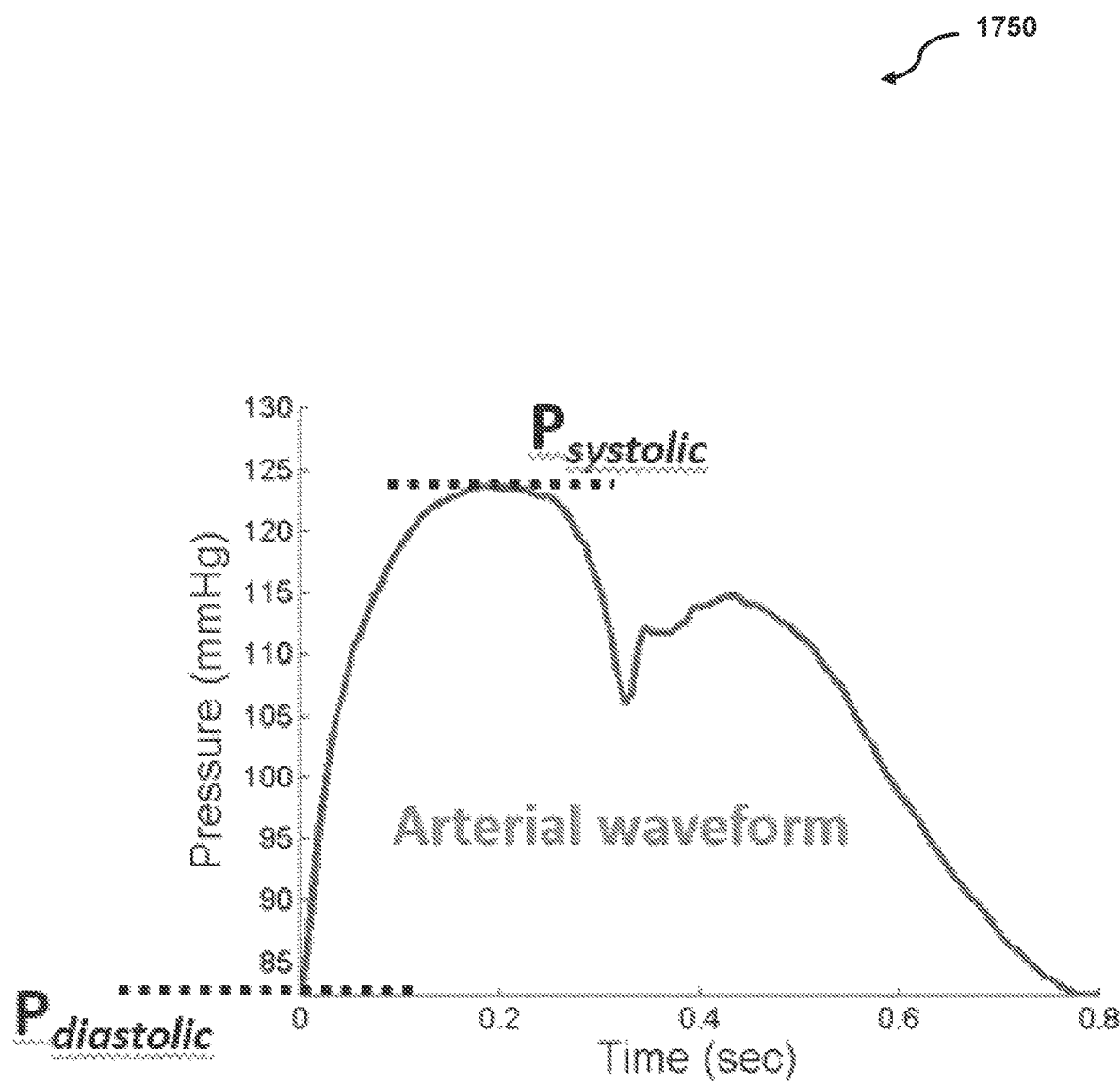

In some embodiments, waveform analysis module 1312 may be further configured to determine, from the pressure waveform, a minimum and maximum pressure of the cardiac cycle. For example, the minimum pressure, as seen from waveform 1750 of FIG. 17B, during diastole may be referred to as $P_{diastolic}$ and the maximum pressure during systole may be referred to as $P_{systolic}$.

From the ECG and the pressure waveform, the CTM and IF methodologies can extract features 1320: $\omega_1$, $\omega_2$, $\varphi_1$, $\varphi_2$, $R_s$, $R_d$, ER, QP$f$, RP$f$, and dp/dt$_{max}$. In some embodiments, features 1320 may be stored in training data database 134, patient data database 136, or other databases. Of these cardiac features, $\omega_1$, $\varphi_1$, and dp/dt$_{max}$ depend on the LV contractility, and $\omega_2$, ER, and dp/dt$_{max}$ are influenced by the afterload and dynamics of the arterial network (e.g., pulse wave velocity, peripheral resistance, etc.). The value of QP$f$ is defined as the sum of the PEP and wave travel time (TTT) from the LV to the femoral site (e.g., where the femoral blood pressure measurement is taken to obtain the blood pressure waveform). The value of RP$f$ is approximately equal to the sum of the isovolumetric contraction time and TT. As explained in greater detail below, three different sets of features may be selected. In some cases, the features may be selected randomly or pseudo-randomly, different numbers of sets may be selected, or different features may be considered. As an example, the selected sets of features may be (i) Set 1: {$\omega_1$, $\omega_2$, ER, QP$f$, RP$f$, dp/dt$_{max}$}, (ii) Set 2: {$\omega_1$, $\omega_2$, $\varphi_1$, QP$f$, RP$f$, dp/dt$_{max}$}, and (iii) Set 3: {$\omega_1$, $\varphi_1$, ER, QP$f$, RP$f$, and dp/dt$_{max}$}.

Figure 18:
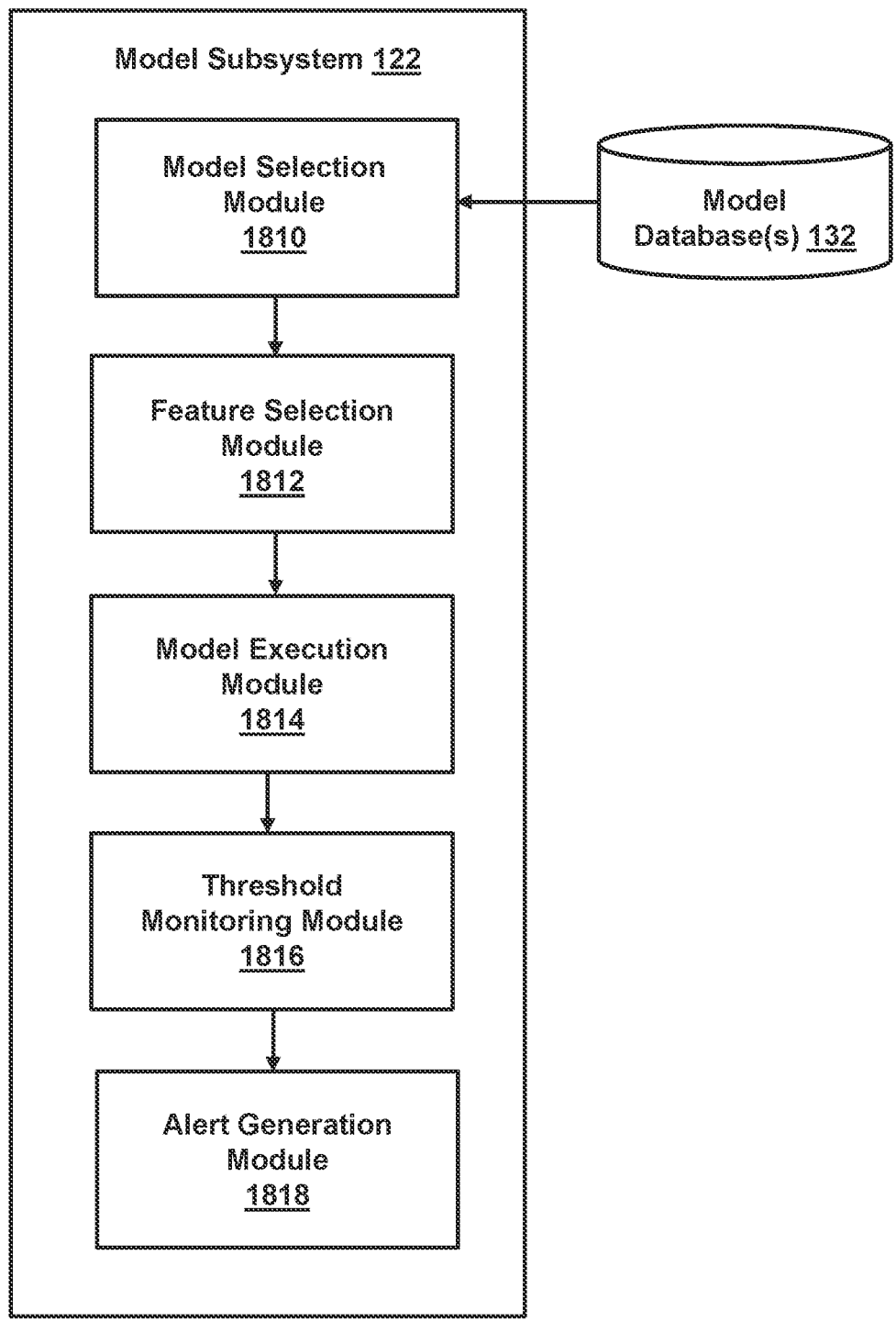
FIG. 18 illustrates an example model subsystem for determining, using a machine learning model, whether a patient has an elevated or normal LVEDP indicative of HF, in accordance with various embodiments.

FIG. 18 illustrates an example model subsystem for determining, using a machine learning model, whether a patient has an elevated or normal LVEDP indicative of HF, in accordance with various embodiments. In some embodiments, model subsystem 122 may include a model selection module 1810, a feature selection module 1812, a model execution module 1814, a threshold monitoring module 1816, an alert generation module 1818, or other modules. Each of modules 1810-1818 may include software that executes certain tasks, and that software may be executed by one or more processors of the corresponding subsystem. In some cases, model subsystem 122 may be implemented instead of or in addition to model execution subsystem 114 described above.

Model subsystem 122 may execute a machine learning model configured to determine whether a patient has experienced/is experiencing heart failure (HF). For example, model subsystem 122 may execute one or more machine learning models trained to classify a determined LVEDP into one class for elevated LVEDPs or another class for normal (non-elevated) LVEDPs. Model subsystem 122 may further be configured to determine whether an alert should be generated and provided to the patient, the patient's medical provider, or another entity, to indicate the results of the LVEDP classification.

In some embodiments, model selection module 1810 may select a trained machine learning model from model database 132. In some cases, the model may be a classifier model of random forests. Model selection module 1810 may select the trained machine learning model based on an input received from a client device 104 (e.g., the opening of a software application resident on client device 104), a time period's expiry (e.g., every 10 minutes, every hour, etc.), or at other temporal intervals. As an example, in response to an ECG and BP being captured (e.g., via a wearable device, client device 104, etc.), model subsystem 122 may select a trained machine learning model (e.g., an RF model) to obtain an LVEDP of the patient in order to determine whether the patient is experiencing HF. Additional details regarding the training of the model for determining whether a patient is experiencing HF are provided below with respect to FIG. 20.

In some embodiments, feature selection module 1812 may be configured to select one or more features computed using the contemporaneously captured BP waveform and ECG of the patient. As mentioned previously, the CTM methodology indicates that the PEP changes proportionally with LVEDP at a fixed contractility and afterload. Afterload is defined by the LV-arterial coupling and vascular characteristics, and the LVEF (a surrogate of contractility), LV-arterial coupling, and central arterial stiffness (as measured by the PWV) may be calculated from the intrinsic frequencies of the pressure waveform. The rate of change of the arterial waveform during systole, in absence of aortic valve dieses and aortic abnormalities, can also be defined by the LV contractility and afterload, indicating that there is a mathematical relationship based on combinations of the IF features, the dp/dt$_{max}$, and the QP$f$/RP$f$, and the mathematical relationship can be mapped to the CTM methodology (e.g., a function $f$ can approximate LVEDP as LVEDP=$f$ (IFs, QP$f$ RP$f$ dp/dt$_{max}$)). In some cases, as discussed below, of the three different feature sets (e.g., Set 1, Set 2, Set 3) considered during training (e.g., to determine which features are to be selected for estimating LVEDP), the third set, including features $\omega_1$, $\varphi_i$, ER, QP$f$, RP$f$, and dp/dt$_{max}$, may be selected as the features to be extracted and provided, as input, to the trained machine learning model.

Figure 19:
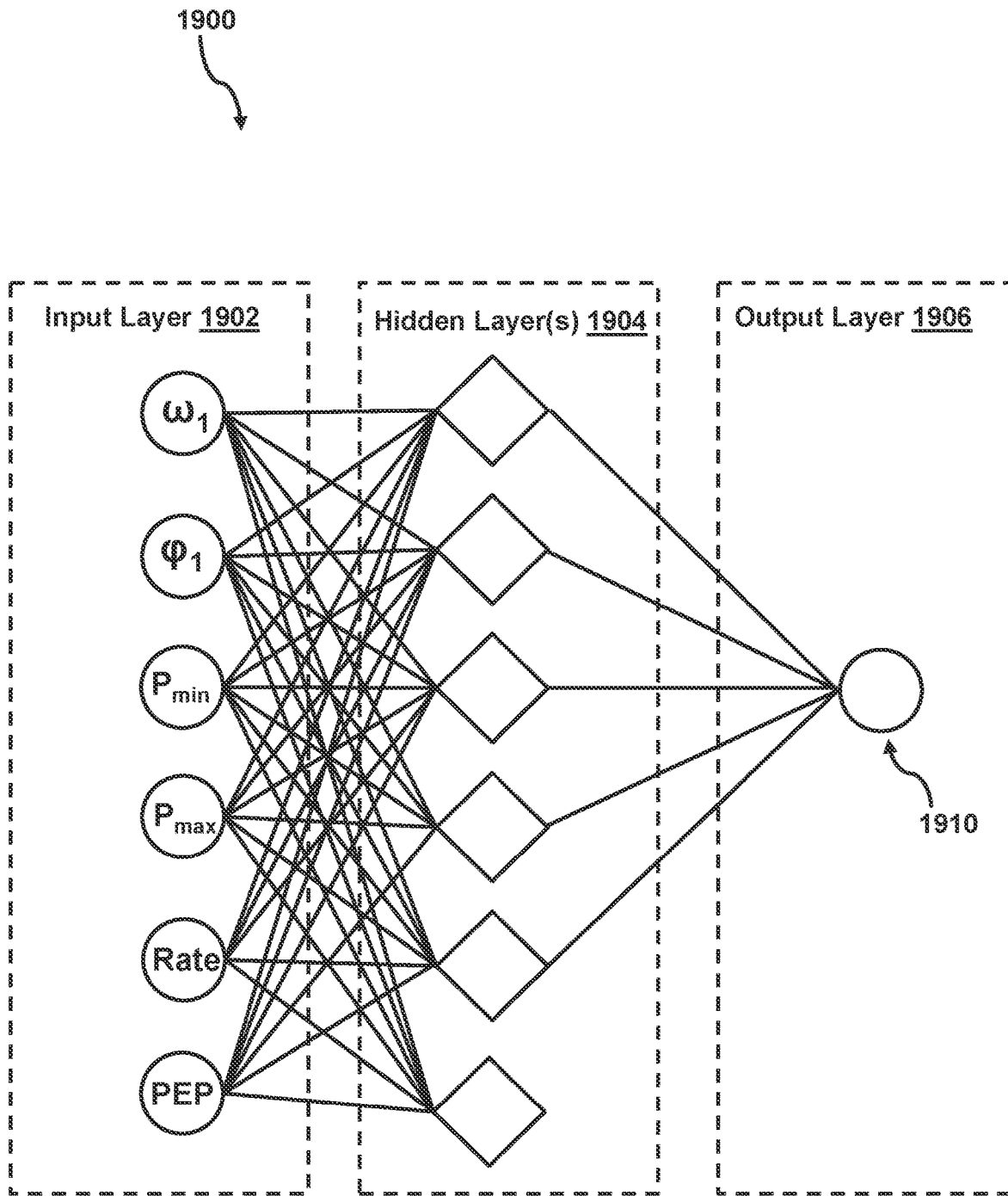
FIG. 19 illustrates an example machine learning model used to determine whether a patient has an elevated or normal LVEDP, in accordance with various embodiments.

In some embodiments, as seen in FIG. 19, trained machine learning model 1900 may include an input layer 1902, one or more hidden layers 1904, and an output layer 1906. Trained machine learning model 1900 may be any of the following types of machine learning models: Ordinary Least Squares Regression (OLSR), Linear Regression, Logistic Regression, Stepwise Regression, Multivariate Adaptive Regression Splines (MARS), Locally Estimated Scatterplot Smoothing (LOESS), Instance-based Algorithms, k-Nearest Neighbor (KNN), Learning Vector Quantization (LVQ), Self-Organizing Map (SOM), Locally Weighted Learning (LWL), Regularization Algorithms, Ridge Regression, Least Absolute Shrinkage and Selection Operator (LASSO), Elastic Net, Least-Angle Regression (LARS), Decision Tree Algorithms, Classification and Regression Tree (CART), Iterative Dichotomizer 3 (ID3), C4.5 and C5.0 (different versions of a powerful approach), Chi-squared Automatic Interaction Detection (CHAID), Decision Stump, M5, Conditional Decision Trees, Naive Bayes, Gaussian Naive Bayes, Causality Networks (CN), Multinomial Naive Bayes, Averaged One-Dependence Estimators (AODE), Bayesian Belief Network (BBN), Bayesian Network (BN), k-Means, k-Medians, K-cluster, Expectation Maximization (EM), Hierarchical Clustering, Association Rule Learning Algorithms, A-priori algorithm, Eclat algorithm, Artificial Neural Network Algorithms, Perceptron, Back-Propagation, Hopfield Network, Radial Basis Function Network (RBFN), Deep Learning Algorithms, Deep Boltzmann Machine (DBM), Deep Belief Networks (DBN), Convolutional Neural Network (CNN), Deep Metric Learning, Stacked Auto-Encoders, Dimensionality Reduction Algorithms, Principal Component Analysis (PCA), Principal Component Regression (PCR), Partial Least Squares Regression (PLSR), Collaborative Filtering (CF), Latent Affinity Matching (LAM), Cerebri Value Computation (CVC), Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA), Ensemble Algorithms, Boosting, Bootstrapped Aggregation (Bagging), AdaBoost, Stacked Generalization (blending), Gradient Boosting Machines (GBM), Gradient Boosted Regression Trees (GBRT), Random Forest, Computational intelligence (evolutionary algorithms, etc.), Computer Vision (CV), Natural Language Processing (NLP), Recommender Systems, Reinforcement Learning, Graphical Models, or separable convolutions (e.g., depth-separable convolutions, spatial separable convolutions, etc.).

In some embodiments, model execution module 1814 may be configured to provide the selected set of input features to trained machine learning model 1900 to compute an estimated LVEDP (or other cardiac metric). Each input node may receive one of a set of cardiac features capable of being used to determine whether a patient is experiencing (or has recently experienced) HF. In some embodiments, trained machine learning model 1900 may take, as input, a first intrinsic frequency $\omega_1$ associated with a systolic phase of a cardiac cycle, a systolic intrinsic phase angle $\varphi_1$, a minimum pressure (e.g., P$_{diastolic}$), a maximum pressure (e.g., P$_{systolic}$), a maximum rate of change of the rising portion of the pressure wave dp/dt$_{max}$, a PEP, or other features.

Each node in input layer 1902 may be fully connected to each node in hidden layer 1904. However, for multiple hidden layers 1904, some or all of the layers may be fully connected. Each node may include an activation function, such as a binary step function, a ReLU function, a Sigmoid function, a Softmax function, or other activation functions. In some cases, one or more of the nodes may include different activation functions. The outputs of hidden layers 1904 may be provided to output layer 1906.

In some embodiments, a classification vector may be output from hidden layer 1904. The classification vector may be an n-dimensional classification vector, where each element includes a value associated with each decision tree of the RF model. In some cases, trained machine learning model 1900 may be trained such that it determines an estimated LVEDP. In such cases, the classification vector may be a 1-dimensional vector, determined based on a combination of values output by each decision tree (e.g., each estimated LVEDP).

In some embodiments, output layer 1906 may include a softmax layer configured to take the outputs from the hidden layer(s) 1904 and convert those scores to probabilities. Based on those probabilities, a determination may be made, using threshold monitoring module 1816, as to whether a given classification score satisfies a threshold condition. If so, then this indicates that the patient likely experienced HF. If not, then this may indicate that the patient did not experience from a corresponding cardiac event. In some embodiments, the threshold condition may be satisfied if the probability, or score, is greater than or equal to a threshold value. For example, if the probability that the patient experienced HF is greater than or equal to a threshold probability, then this indicates that the patient likely experienced the cardiac event, and thus may output result 1910 indicating that the patient experienced the cardiac event, as well as, in some cases, the classification score, the probability, or both. In some cases, the threshold condition may be satisfied if an estimated LVEDP is greater than or equal to a threshold LVEDP, such as LVEDP$_{threshold}$=18 mmHg. Estimated LVEDPs that equal or exceed 18 mmHg indicate that the patient likely experienced, or is experiencing, HF, whereas estimated LVEDPs that are less than 18 mmHg indicate that the patient likely did not experience HF. Alterative threshold LVEDP values may be used such as, for example, 5 mmHg or more, 10 mmHg or more, 50 mmHg or more, or other values.

In some embodiments, alert generation module 1818 may be configured to generate an alert based on the threshold monitoring module determining that the threshold condition has been satisfied. For instance, in response to determining that the estimated LVEDP is greater than the threshold LVEDP, alert generation module 1818 may generate an alert (e.g., a textual message, a link, an audible sound, a haptic feedback, etc.) to be provided to the patient, the patient's medical provider(s), or both, or other entities. The alert may indicate that the patient has experienced HF, and provide instructions/information as to what the patient should do (e.g., call an ambulance, go to an emergency medical facility, consult a physician, take a medication/therapy, etc.). In some cases, the alert may also be stored in memory, such as, for example, in patient data database 136.

Figure 20:
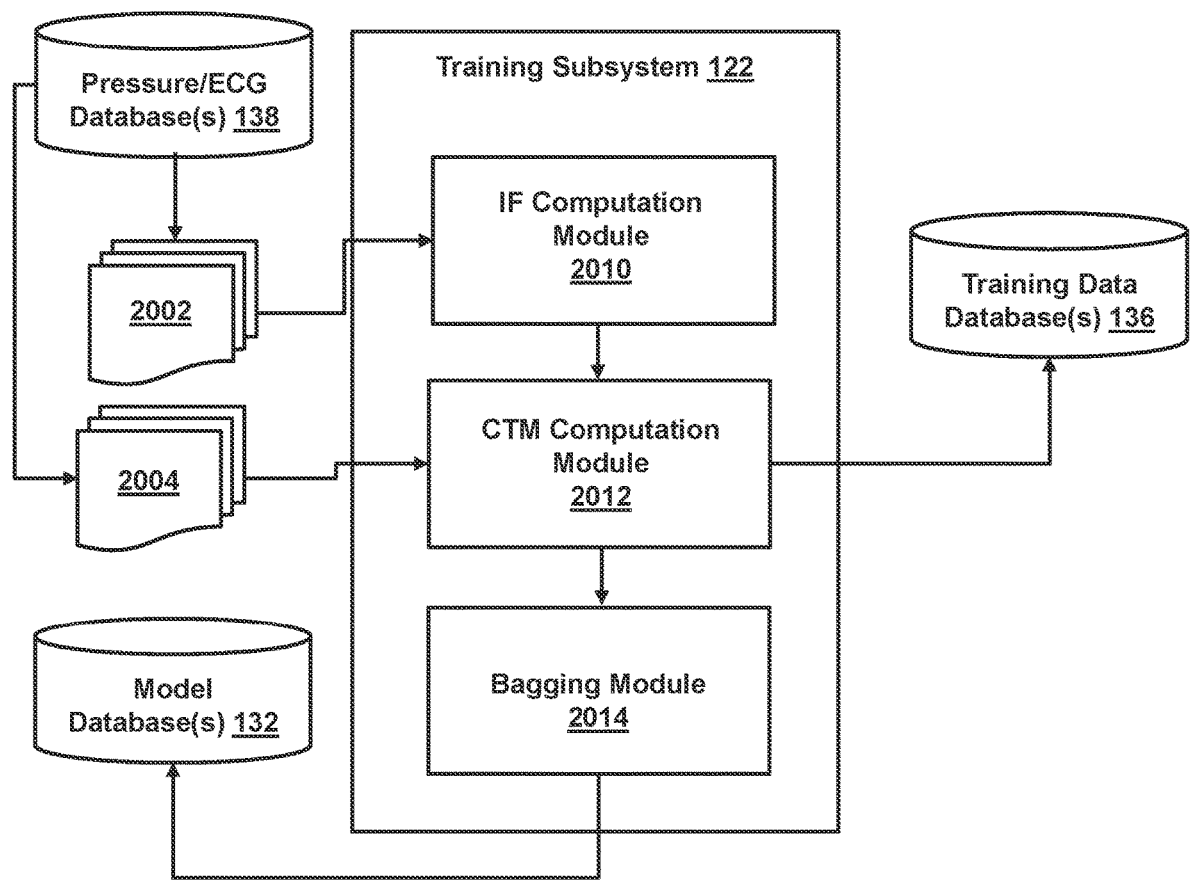
FIG. 20 illustrates an example training subsystem for training a machine learning model used to determine whether a patient has an elevated or normal LVEDP, in accordance with various embodiments.

FIG. 20 illustrates an example training subsystem for training a machine learning model used to determine whether a patient has an elevated or normal LVEDP, in accordance with various embodiments. In some embodiments, training subsystem 124 may include an IF computation module 2010, a CTM computation module 2012 oper, a bagging module 2014, or other modules. Each of modules 2010-2014 may include software that executes certain tasks, and that software may be executed by one or more processors of the corresponding subsystem. In some cases, training subsystem 124 may be implemented instead of or in addition to model training subsystem 118 described above.

In some embodiments, IF computation module 2010 may be configured to obtain arterial blood pressure data 2002 (e.g., blood pressure measurements captured via client device 104). Pressure data 2002 may be retrieved from pressure/ECG database 138, client device 104, or another component of system 100. IF computation module 2010 may, upon receipt of pressure data 2002, may be configured to compute one or more intrinsic features based on the pressure waveform (e.g., $\omega_1$, $\omega_2$, $\varphi_1$, $\varphi_2$, $R_s$, $R_d$, ER, dp/dt$_{max}$) for each pressure waveform. In some embodiments, pressure data 2002 may include blood pressure waveforms of a first plurality of patients that have experienced heart failure recently (e.g., within the last 24 hours) and blood pressure waveforms of a second plurality of patients that have not experienced heart failure recently. In some embodiments, blood pressure data 2002 may include, for each of the first and second plurality of patients, a known LVEDP value for the respective patient.

In some embodiments, CTM computation module 2012 may be configured to obtain ECG data 2004 (e.g., ECG data captured via client device 104). ECG data 2004 may be retrieved from pressure/ECG database 138, client device 104, or another component of system 100. CTM features, such as QP$f$, RP$f$, may be computed from ECG data 2004. In some embodiments, ECG data 2004 may include ECGs of the first plurality of patients that have experienced heart failure recently (e.g., within the last 24 hours) and ECGs of the second plurality of patients that have not experienced heart failure recently. For each patient (e.g., of the first and second pluralities), there may be a respect blood pressure waveform and ECG included in pressure data 2002 and ECG data 2004. The blood pressure measurements and the ECG, for a given patient, may be captured in parallel. In some embodiments, ECG data 2004 may include, for each of the first and second plurality of patients, a known LVEDP value for the respective patient.

For each patient, features can be extracted from the simultaneously-recorded ECG and femoral pressure waveforms. For example, a beginning of the QRS complex and an apex of the R-wave of the ECG may be identified, a beginning, dicrotic notch, and end of the femoral pressure waveforms may be determined, a time between the femoral pressure onset and the ECG Q-wave or the ECG peak R-wave may be calculated, a maximum rate (slope) of the rising portion of the arterial pressure signal may be computed, or other features may be determined.

The parameters $\omega_1$, $\varphi_1$, and (dp/dt)$_{max}$ depend on the LV contractility, and the parameters $\omega_2$, ER, and (dp dt)$_{max}$ are influenced by the afterload and dynamics of the arterial network (e.g., pulse wave velocity, peripheral resistance, etc.). QP$f$ is defined as the sum of PEP and the wave travel time (TT) from the LV to the femoral site (which is directly related to pulse wave velocity) and RP$f$ is approximately equal to the sum of the isovolumetric contraction time and TT. Three sets of six parameters each may be selected, including, for example, Set 1: {$\omega_1$, $\omega_2$, ER, QP$f$, RP$f$, (dp/dt)$_{max}$}, Set 2: {$\omega_1$, $\omega_2$, $\varphi_1$, QP$f$, RP$f$, (dp/dt)$_{max}$}, and Set 3: {$\omega_1$, $\varphi_1$, ER, QP$f$, RP$f$, (dp/dt)$_{max}$}.

In some embodiments, features included in sets 1, 2 and 3 may be used for training the classifiers. For example, the machine learning model output may be a binary classification of LVEDP by Model Output=[Normal LVEDP; Elevated LVEDP]. Hyperparameters that were optimized in the training/validation can include the maximum number of splits of each decision tree of the random forest; the number of decision trees in the random forest; the learning rate; and an ensemble method (i.e., AdaBoost, RUSBoost, LogitBoost, GentleBoost, and Bag). In some cases, a Bayesian optimization may be employed as the optimizer. In some embodiments, evaluation metrics included sensitivity, specificity, accuracy, and the area under the curve (AUC) defined by receiver-operating characteristic (ROC) analysis. Feature (predictor) importance analysis may also be employed to assess how useful feature in given input set is when assigning a score to different input features. Importance measures may be computed by summing changes in the node risk due to splits on every predictor, followed by a division of the sum by the total number of branch nodes. In some cases, a node risk was defined as a node error weighted by the node probability. Alternatively or additionally, a PCA analysis or other importance metric may be performed to determine how sensitive the model is to a given feature.

In some embodiments, Equations 16-18 represent a mathematical definition of the metrics sensitivity, specificity, and accuracy:

$$\text{Sensitivity} = \frac{\text{True Positive}}{\text{True Positive} + \text{False Negative}}, \quad \text{Equation 16}$$

$$\text{Specificity} = \frac{\text{True Negative}}{\text{True Negative} + \text{False Positive}}, \quad \text{Equation 17}$$

$$\text{Accuracy} = \frac{\text{True Positive} + \text{True Negative}}{\text{All Positive} + \text{All Negative}}. \quad \text{Equation 18}$$

The trained machine learning model (e.g., a trained RF model) can detect an elevated LVEDP using femoral pressure waveforms and ECG from data 2002 and 2004, respectively.

Figure 21:
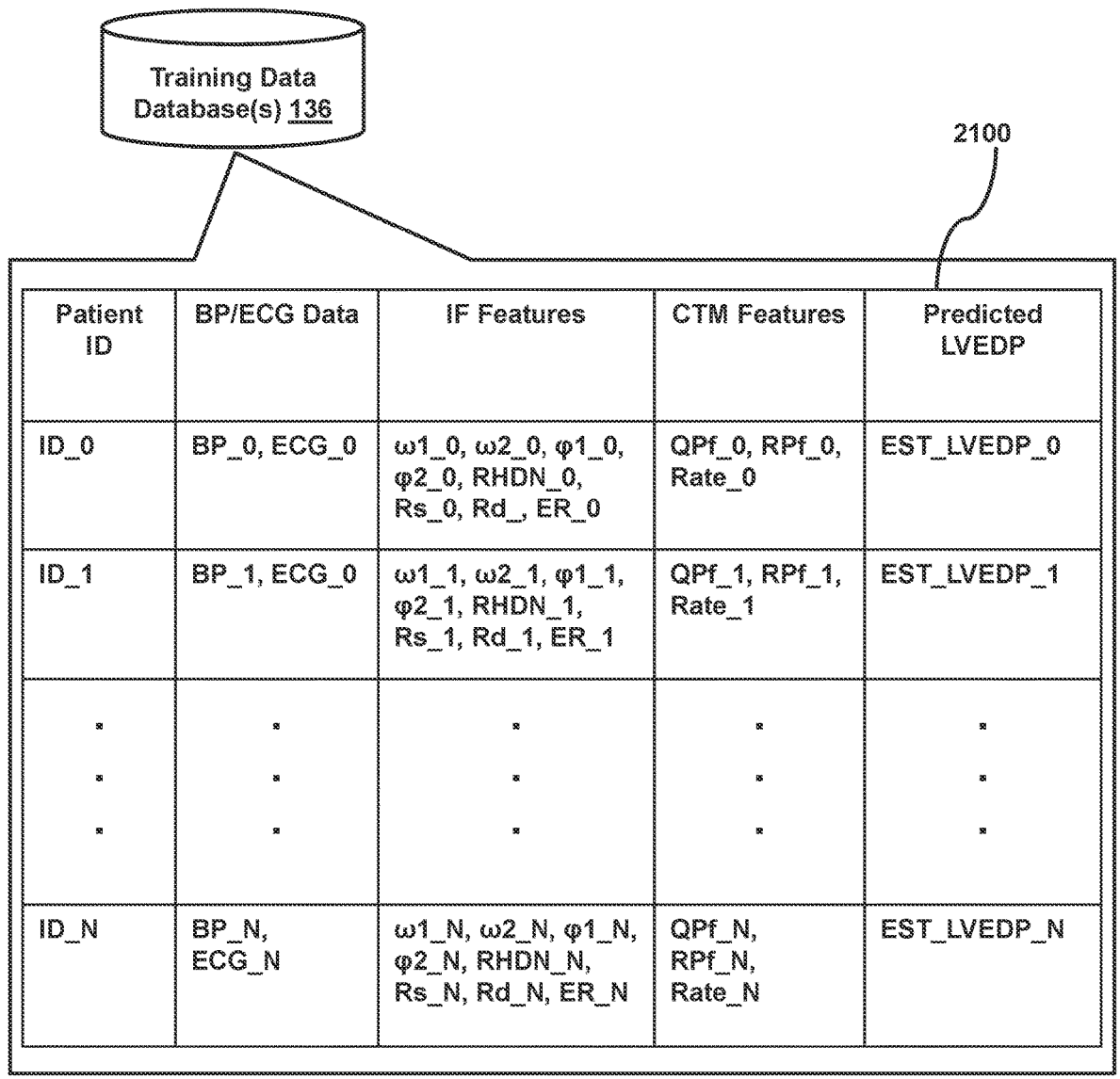
FIG. 21 is an example of a data structure used to store cardiac features included within training data for training a machine learning model to determine whether a patient has an elevated or normal LVEDP, in accordance with various embodiments.

Conventional methods for LVEDP evaluation have certain technical problems, such as being invasive procedures. For example, left heart catheterization can measure LVEDP directly, and pulmonary capillary wedge pressure (PCWP) can measure LVEDP indirectly. Therefore, these techniques are limited to patients with serious symptoms, are dangerous (requiring surgery), and costly. While wireless implantable system for monitoring pulmonary artery pressures in outpatients can also be used, this technique still requires an expensive invasive procedure to implant the device, and has unknown long-term outcomes and safety issues The trained machine learning model leverages the IF and CTM methodologies to train a random forest model to classify an abnormal LVEDP ($\geq$18 mmHg in this study) using parameters derived from ECG and femoral pressure tracing. In some embodiments, training data comprising some or all of the cardiac parameters $\omega_1$, $\omega_2$, $\varphi_1$, $\varphi_2$, $R_s$, $R_d$, ER, QP$f$, RP$f$, and dp/dt$_{max}$ may be stored in training data database 134. As an example, with reference to FIG. 21, training data database 134 may store training data 2100 as a data structure. Training data 2100 may include an entry (e.g., a row in the data structure) for each patient. The patients may include patients that have experienced HF and patients that have not experienced HF. In some cases, patients with ventricular paced rhythm, QRS conduction abnormalities, atrial fibrillation, or other conditions may be excluded from the training data. For instance, for a first patient, ID_0, training data 2100 may include BP/ECG data, IF features, CTM features, and a predicted LVEDP. In some cases, for some or all of the rows, a measured LVEDP value, using a known invasive test, may also be stored with a given patient. A difference between the measured LVEDP and the estimated LVEDP may then be used to optimize the trained machine learning model's hyperparameters. BP/ECG data may include the generated BP waveforms, the generated ECG waveform, data representing each, a pointer to a location of where the waveforms/data are stored, or other information regarding the BP/ECG of the patient. The IF features may include IF features extracted from the BP waveform of the patient based on the IF methodology. These IF features may include $\omega_1$, $\omega_2$, $\varphi_1$, $\varphi_2$, $R_s$, $R_d$, ER, and RHDN. The CTM features include CTM features extracted from the ECG waveform alone or in combination with the BP waveform, such as QP$f$, RP$f$. Still further, the CTM features may include dp/dt$_{max}$, which may alternatively be included in the IF features. Using some or all of the IF features and CTM features, a predicted LVEDP may be estimated using the machine learning model during training.

Returning to FIG. 20, bagging module 2014 may include steps for training the machine learning model, which may, in some embodiments, be a random forest (RF) model. In some embodiments, training the machine learning model may include taking the original datasets, such as training data 2100, and randomly selecting rows/columns from the original data to build one or more new datasets. The newly created datasets may include a same number of rows as the original dataset. For example, training data 2100 includes N rows, corresponding to N patients. Thus, each newly created dataset may include N rows randomly or pseudo-randomly selected from the original datasets. This process, referred to as bootstrapping, may involve a same row or rows being selected multiple times. After the new datasets are created, a decision tree may be trained on each of the bootstrapped datasets independently. In some cases, not every feature may be used to train each decision tree. Subsets of the stored features may be randomly selected for each bootstrapped dataset and those features may be used for training that decision tree. For example, if the original datasets include the features $\omega_1$, $\omega_2$, $\varphi_1$, $\varphi_2$, $R_s$, $R_d$, ER, QP$f$, RP$f$, and dp/dt$_{max}$, then sets of these features (e.g., Set 1: $\{\omega_1, \omega_2$, ER, QP$f$, RP$f$, dp/dt$_{max}\}$, (ii) Set 2: $\{\omega_1, \omega_2, \varphi_1$, QP$f$, RP$f$, dp/dt$_{max}\}$, and (iii) Set 3: $\{\omega_1, \varphi_1$, ER, QP$f$, RP$f$, and dp/dt$_{max}\}$) may be randomly selected for training each decision tree using a respective one of the newly created datasets.

After the features have been selected for each of the new datasets, the respective decision tree may be built and trained to estimate the decision node and leaf node values. The candidate trained model may then be tested using testing data to ensure that the model performs accurately. For example, a new dataset may be obtained and a value for each decision tree may be determined using the new dataset. The combined predictions may be used to generate a predicted result for the trained machine learning model. This process may be repeated a number of times until an accuracy of the model satisfies a threshold condition (e.g., greater than 75% accuracy, greater than 85% accuracy, greater than 95% accuracy, etc.). The trained machine learning model may then be stored in model database 132 for use when determining whether a patient has experienced HF, particularly based on pressure waveform/ECG data captured using non-invasive techniques (e.g., via a client device 104, as detailed above).

Example Flowcharts

FIGS. 22A-28 are example flowcharts of processing operations of methods that enable the various features and functionality of the system as described in detail above. The processing operations of each method presented below are intended to be illustrative and non-limiting. In some embodiments, for example, the methods may be accomplished with one or more additional operations not described, and/or without one or more of the operations discussed. Additionally, the order in which the processing operations of the methods are illustrated (and described below) is not intended to be limiting.

In some embodiments, the methods may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the methods.

Figure 22A:
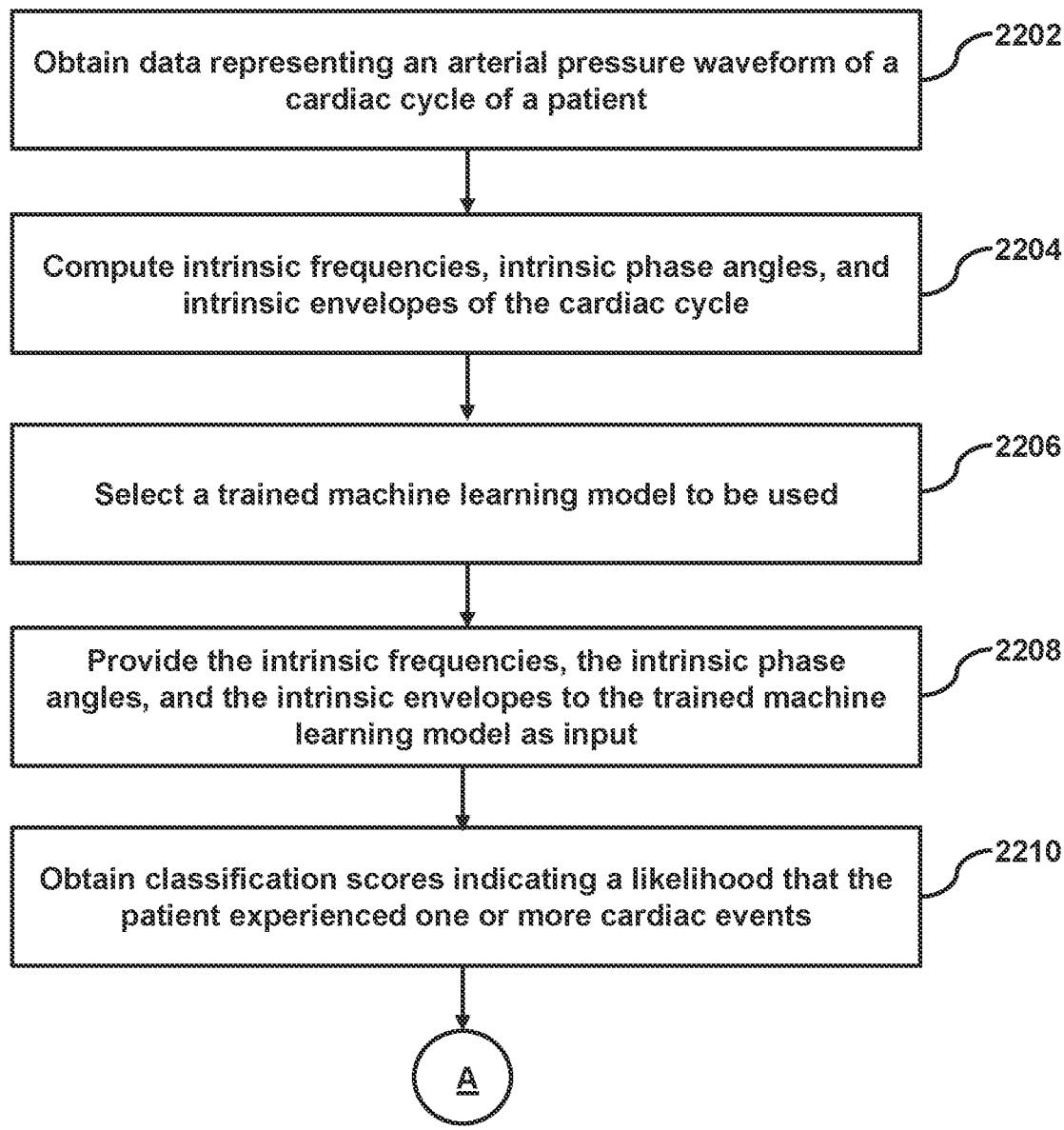
FIGS. 22A-22B illustrate an example process for using a machine learning model to determine whether a patient has experienced a cardiac event or a determining a size of a myocardial infarction experienced by a patient, in accordance with various embodiments.
Figure 22B:
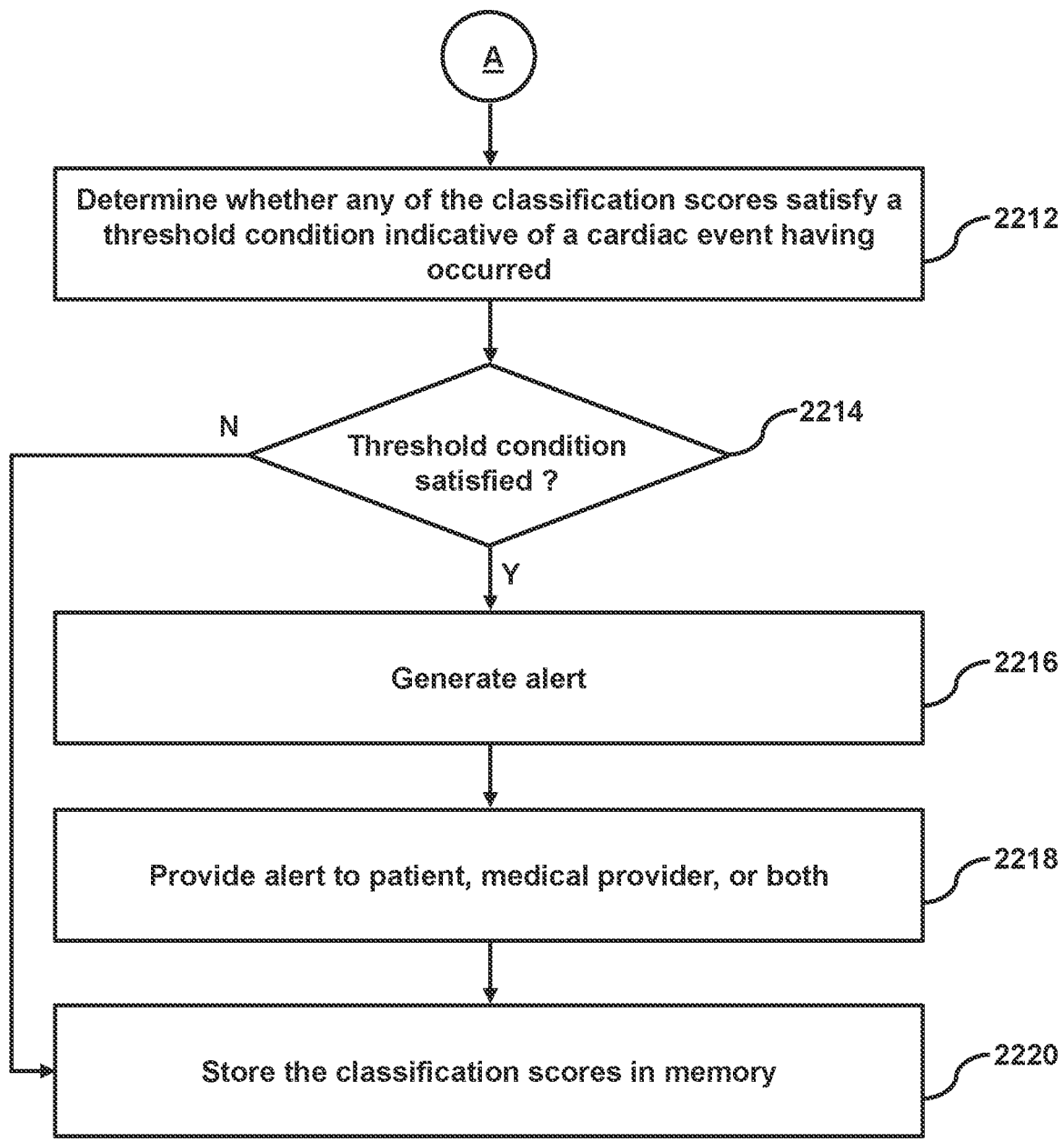

FIGS. 22A-22B illustrate an example process for using a machine learning model to determine whether a patient has experienced a cardiac event or a determining a size of a myocardial infarction experienced by a patient, in accordance with various embodiments. In some embodiments, process 2200 may begin at operation 2202. In operation 2202, data representing an arterial pressure waveform of a cardiac cycle of a patient may be obtained. The arterial pressure waveform may constructed based on measurements captured by client device 104 (e.g., a wearable device, via a smartphone's camera, etc.). The measurements may capture the patient's heart rate, PTT, blood pressure, or other physiological health metrics. In some embodiments, the data may include PPG signals/waveforms, ECG signals/waveforms, or other data. In some embodiments, operation 2202 may be performed by a subsystem that is the same or similar to cardiovascular parameter subsystem 112.

In operation 2204, intrinsic frequencies, intrinsic phase angles, intrinsic envelopes, and other features of the cardiac cycle of the patient may be computed. For example, based on a given pressure waveform, intrinsic frequencies $\omega_1$ and $\omega_2$, systolic intrinsic phase angles $\varphi_1$ and diastolic intrinsic phase angle $\varphi_2$, intrinsic envelopes $r_d$ and $r_s$, envelope ratio (ER), and a relative height of the dicrotic notch (RHDN), or other cardiac features may be computed. In some embodiments, the IF method described above, with reference to "Noninvasive iPhone Measurement of Left Ventricular Ejection Fraction Using Intrinsic Frequency Methodology," Pahlevan et al., Critical Care Medicine, 2017; 45:1115-1120, the contents of which is hereby incorporated by reference in its entirety, may be used to determine the aforementioned cardiac features. The cardiac features computed may be based on a type of analysis to be performed by a given machine learning model. Therefore, some or all of the possible cardiac features may be computed. In some embodiments, operation 2204 may be performed by a subsystem that is the same or similar to cardiovascular parameter subsystem 112.

In operation 2206, a trained machine learning model to be used to perform a particular analysis may be selected. For instance, model database 132 may store a plurality of trained machine learning models (as well as untrained machine learning models), each capable of performing one or more specific prediction tasks. Depending on the type of analysis to be done, different machine learning models may be selected. Additionally, depending on the specific cardiac features that are available, different machine learning models may be selected. As an example, trained machine learning model 700 may be selected if the analysis is to be a determination, using noninvasive techniques (e.g., such as via the IF method) one or more cardiac events occurred based on an arterial pressure waveform of a cardiac cycle of a patient. As another example, training machine learning model 750 may be selected if the analysis to be performed, using noninvasive techniques (e.g., such as via the IF method), is determining a size of an infarction. In some embodiments, operation 2206 may be performed by a subsystem that is the same or similar to model execution subsystem 114.

In operation 2208, the intrinsic frequencies, intrinsic phase angles, and the intrinsic envelopes may be provided, as input, to the trained machine learning model that was selected. For example, a first IF $\omega_1$, a systolic intrinsic phase angles $\varphi_1$, and intrinsic envelope $r_d$ and/or $r_s$ may be provided to trained machine learning model 700 as input. In operation 2210, classification scores indicating a likelihood that the patient experienced one or more cardiac events may be obtained. Each classification score may indicate a likelihood that a corresponding cardiac event occurred. For example, a first classification score may indicate whether the patient experienced an acute MI. In some embodiments, operations 2208 and 2210 may be performed by a subsystem that is the same or similar to model execution subsystem 114.

At operation 2212, a determination may be made as to whether any of the classification scores satisfy a threshold condition indicative of a cardiac event having occurred based on the input cardiac features derived from the arterial pressure waveform of the patient. In some embodiments, the threshold condition may be satisfied when a classification score is greater than or equal to a threshold classification score. The threshold classification score may be specific to a particular cardiac event or may be generalized for some or all of the classification scores. In some embodiments, operation 2212 may be performed by a subsystem that is the same or similar to alert generation subsystem 116.

At operation 2214, it is determined whether the threshold condition was satisfied. If so, then process 2200 may proceed to operation 2216, where an alert is generated, or, if not, process 2200 may proceed to operation 2220, where the classification scores are stored in memory. In some embodiments, the alert may be a message, such as a text message, video message, image, or other message. In operation 2218, the generated alert may be provided to the patient, the patient's medical provider, or both, depending on the preferences of the patient and health privacy rules. In some embodiments, operations 2214-2220 may be performed by a subsystem that is the same or similar to alert generation subsystem 116.

Figure 23A:
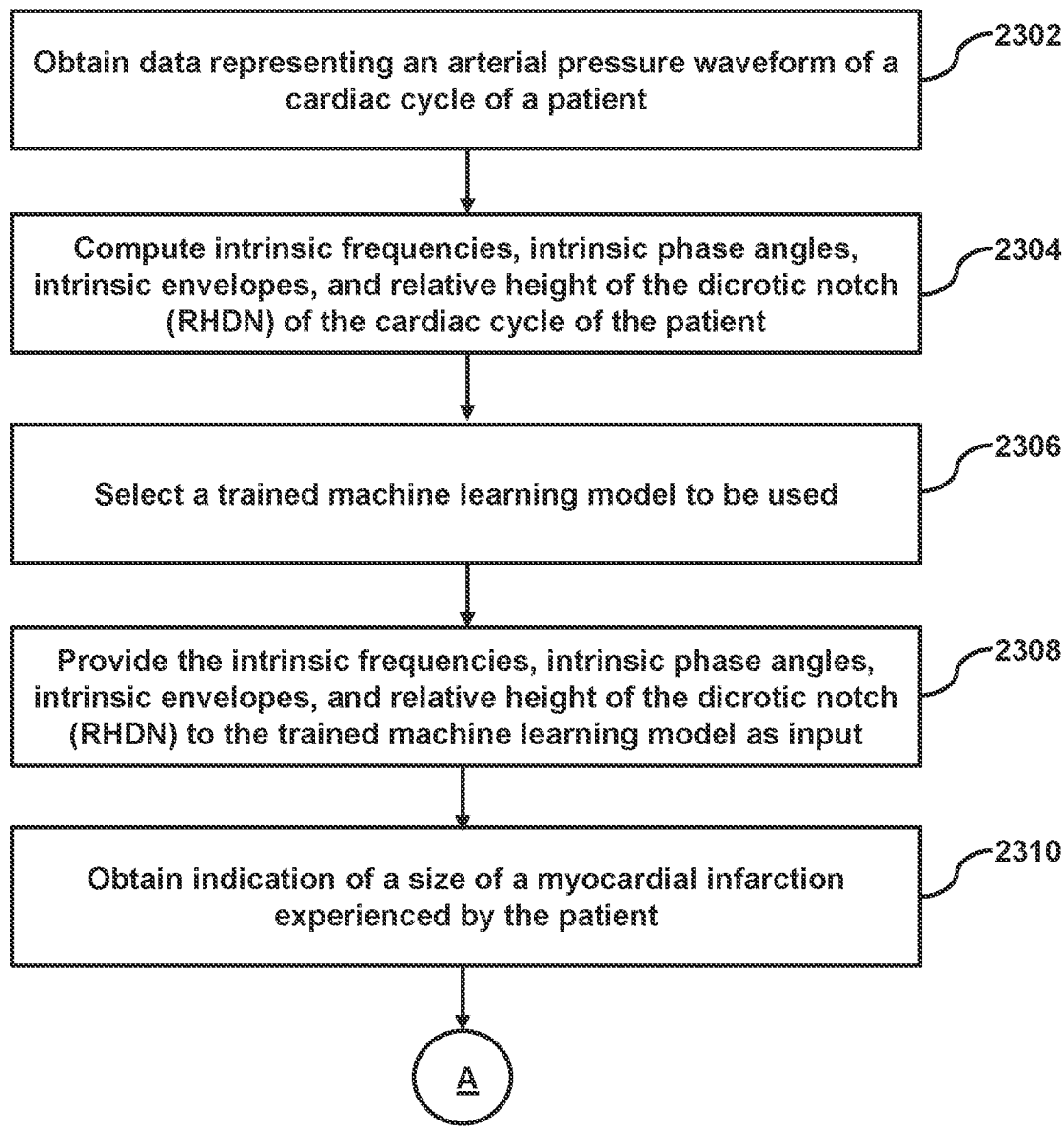
FIGS. 23A-23B illustrate an example process for using a machine learning model to determine a size of a myocardial infarction experienced by a patient, in accordance with various embodiments.
Figure 23B:
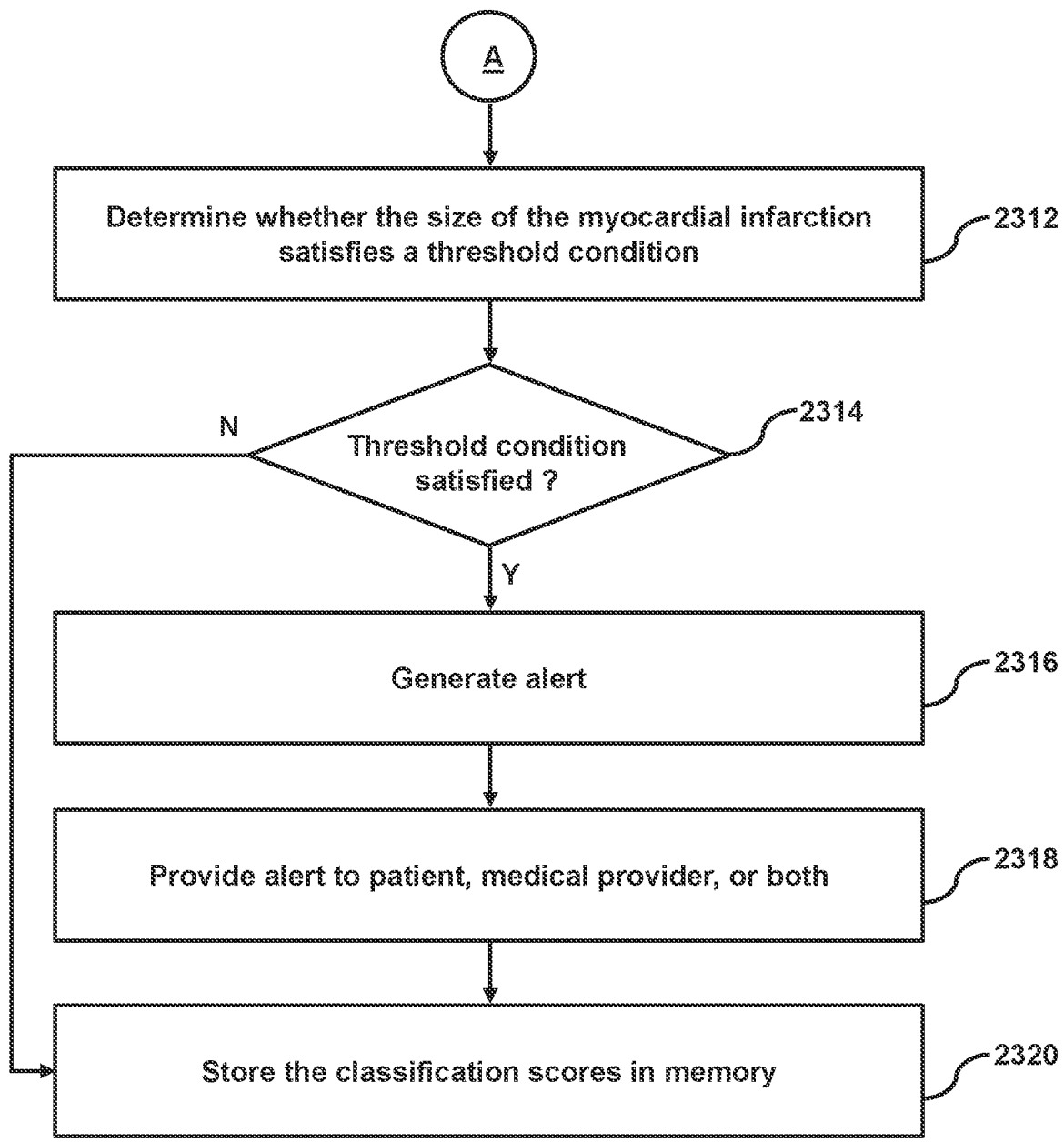

FIGS. 23A-23B illustrate an example process for using a machine learning model to determine a size of a myocardial infarction experienced by a patient, in accordance with various embodiments. In some embodiments, process 2300 may begin at operation 2302. In operation 2302, data representing an arterial pressure waveform of a cardiac cycle of a patient may be obtained. In some embodiments, the data obtained in operation 2302 may be substantially similar to the data obtained at operation 2202, with the exception that the cardiac cycles of the patient associated with the data captured in operation 2302 may be for patients who have recently experienced a particular cardiac event, such as an acute MI. In operation 2304, intrinsic frequencies, intrinsic phase angles, intrinsic envelopes, relative height of the dicrotic notch, envelope ratio, or other cardiac features, may be computed from the data. Operation 2304 may be substantially similar to operation 2304, and the previous description may apply.

In operation 2306, a trained machine learning model may be selected. For instance, model database 132 may store a plurality of trained machine learning models (as well as untrained machine learning models), each capable of performing one or more specific prediction tasks. Depending on the type of analysis to be done, different machine learning models may be selected. Additionally, depending on the specific cardiac features that are available, different machine learning models may be selected. As an example, trained machine learning model 700 may be selected if the analysis is to be a determination, using noninvasive techniques (e.g., such as via the IF method) one or more cardiac events occurred based on an arterial pressure waveform of a cardiac cycle of a patient. As another example, training machine learning model 750 may be selected if the analysis to be performed, using noninvasive techniques (e.g., such as via the IF method), is determining a size of an infarction. In some embodiments, operation 2306 may be performed by a subsystem that is the same or similar to model execution subsystem 114.

In operation 2308, the intrinsic frequencies, intrinsic phase angles, intrinsic envelopes, RHDN, ER, or other cardiac features may be provided, as input, to the trained machine learning model that was selected. In operation 2310, an indication of a size of an MI experienced by the patient, based on the cardiac features computed from the arterial pressure waveform, may be obtained. The indication may be for a percentage or, more generally, amount, of necrotic carotid tissue present due to the MI. Alternatively, or additionally, the mass of necrosis over total LV mass may be provided by the indication. In some embodiments, operations 2308 and 2310 may be performed by a subsystem that is the same or similar to model execution subsystem 114.

In operation 2312, a determination may be made as to whether the size of the MI satisfies a threshold condition. In some embodiments, the threshold condition may be satisfied when the size of the MI estimated by the trained machine learning model (e.g., trained machine learning model 750) is greater than or equal to a threshold size. For example, the threshold size may be 1% or more, 5% or more, 20% or more, 50% or more, or other amounts. Each threshold size refers to an amount of necrotic tissue as compared to a total amount of carotid tissue. In some cases, the threshold size may be a threshold mass, representing a mass of necrotic tissue. In some embodiments, operation 2312 may be performed by a subsystem that is the same or similar to alert generation subsystem 116.

At operation 2314, it is determined whether the threshold condition was satisfied. If so, then process 2300 may proceed to operation 2316, where an alert is generated, or, if not, process 2300 may proceed to operation 2320, where the estimated infarct size is stored in memory. In some embodiments, the alert may be a message, such as a text message, video message, image, or other message. In operation 2318, the generated alert may be provided to the patient, the patient's medical provider, or both, depending on the preferences of the patient and health privacy rules. In some embodiments, operations 2314-2320 may be performed by a subsystem that is the same or similar to alert generation subsystem 116.

Figure 24:
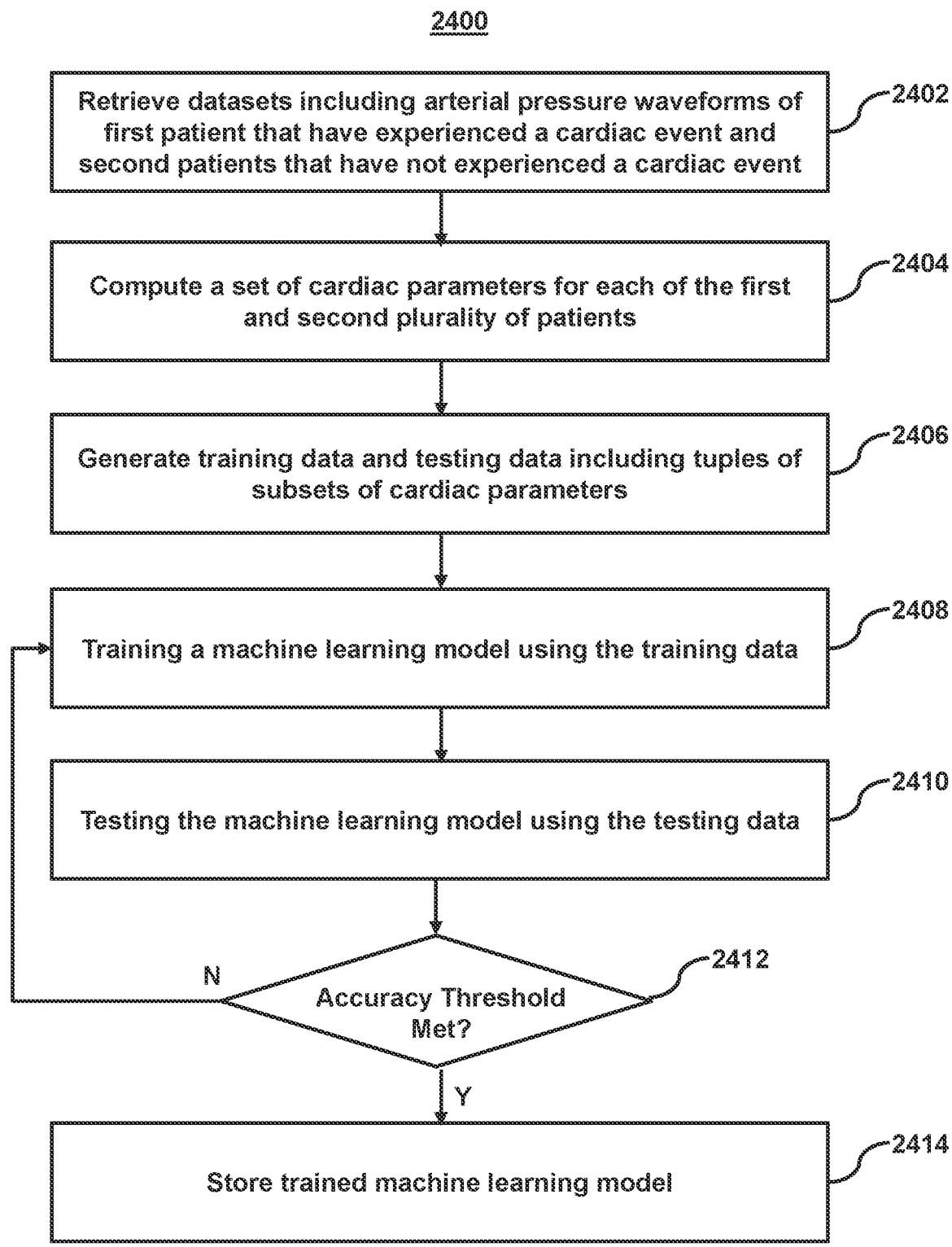
FIG. 24 illustrates an example process for training a machine learning model to determine whether a patient has experienced a cardiac event, in accordance with various embodiments.

FIG. 24 illustrates an example process for training a machine learning model to determine whether a patient has experienced a cardiac event, in accordance with various embodiments. In some embodiments, process 2400 may begin at operation 2402. In operation 2402, datasets including arterial pressure waveforms of first patients that have experienced a cardiac event and second that have not experienced a cardiac event may be retrieved. For instance, pressure/ECG database 138 may store waveforms for a plurality of patients, each including metadata indicating whether a respective patient experienced a cardiac event and, if so, a type of cardiac event experienced. In some embodiments, operation 2402 may be performed by a subsystem that is the same or similar to model training subsystem 118.

In operation 2404, a set of cardiac features for each of the first and second patients may be computed. In some embodiments, based on a given arterial pressure waveform, one or more cardiac features may be computed using the IF method. For example, intrinsic frequencies, intrinsic phase angles, intrinsic envelopes, or other cardiac information, may be computed from a given arterial pressure waveform of the patient. In some embodiments, operation 2404 may be performed by a subsystem that is the same or similar to model training subsystem 118.

In operation 2406, training data and testing data may be generated from the set of cardiac features. The training data and the testing data may include sets of tuples, each including some or all of the computed cardiac features. As an example, the training dating, testing data, or both, may include tuples, each including a first intrinsic frequency, $\omega_1$, a systolic intrinsic phase angle $\varphi_1$, an intrinsic envelope of systole $r_s$ and diastole $r_d$. In some embodiments, the tuples may be segmented into training data and testing data such that some of the tuples of the cardiac features are used for training the machine learning model, and some of the tuples of the cardiac features are using for validating an accuracy of the model. The training data and the testing data may be stored in training data database 134. In some embodiments, operation 2406 may be performed by a subsystem that is the same or similar to model training subsystem 118.

In operation 2408, a machine learning model (e.g., an artificial neural network (ANN)) may be trained using the training data, and in operation 2410, the machine learning model, after training, may be tested. In operation 2412, a determination may be made as to whether the accuracy of the model has been met. For example, an accuracy of the model, determined from the testing at operation 2410, may be compared to a threshold accuracy score. If the accuracy score of the model is greater than or equal to an accuracy score threshold (e.g., an 80% or greater accuracy, a 90% or greater accuracy, a 95% or greater accuracy, etc.), then process 2400 may proceed to operation 2414, where the trained machine learning may be stored. The trained machine learning model may be configured to determine whether a given set of cardiac features, computed from an arterial pressure waveform, indicate that a patient experienced one or more types of cardiac events (e.g., acute MI, myocardial ischemia). If not, process 2400 may return to operation 2408, where the model is trained again, having its weights, biases, and other hyperparameters adjusted based on results of an optimization function. In some embodiments, operations 2408-2414 may be performed by a subsystem that is the same or similar to model training subsystem 118.

Figure 25:
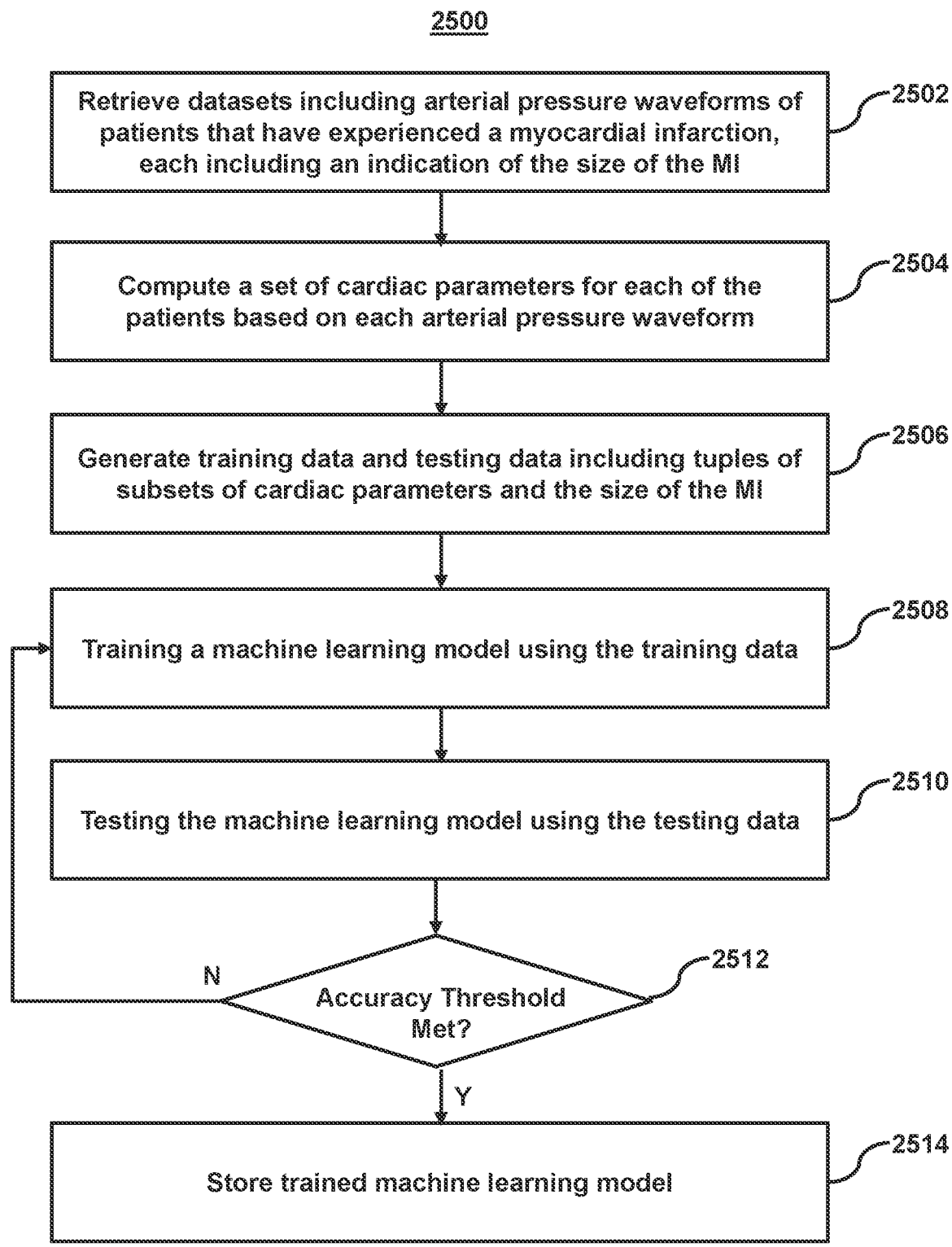
FIG. 25 illustrates an example for process for training a machine learning model to determine a size of myocardial infarction experienced by a patient, in accordance with various embodiments.

FIG. 25 illustrates an example for process for training a machine learning model to determine a size of myocardial infarction experienced by a patient, in accordance with various embodiments. In some embodiments, process 2500 may begin at operation 2502. In operation 2502, datasets including arterial pressure waveforms of patients that have experienced a cardiac event, such as an acute MI, may be obtained. In particular, the datasets may include an indication of a size of the MI, which may be represented by an amount of necrotic cardiac tissue (e.g., the mass of necrosis over total LV mass). For instance, pressure/ECG database 138 may store waveforms for a plurality of patients, each including metadata indicating a size of an acute MI experienced by a respective patient. In some embodiments, operation 2502 may be performed by a subsystem that is the same or similar to model training subsystem 118.

In operation 2504, a set of cardiac features for each of the patients may be computed. In some embodiments, based on a given arterial pressure waveform, one or more cardiac features may be computed using the IF method. For example, intrinsic frequencies, intrinsic phase angles, intrinsic envelopes, or other cardiac information, may be computed from a given arterial pressure waveform of the patient. In some embodiments, operation 2504 may be performed by a subsystem that is the same or similar to model training subsystem 118.

In operation 2506, training data and testing data may be generated from the set of cardiac features. The training data and the testing data may include sets of tuples, each including some or all of the computed cardiac features. As an example, the training dating, testing data, or both, may include tuples, each including a first intrinsic frequency, $\omega_1$, a systolic intrinsic phase angle $\varphi_1$, an intrinsic envelope of systole $r_s$ and diastole $r_d$. Furthermore, the tuples may include an indication of the size of the MI. In some embodiments, the tuples may be segmented into training data and testing data such that some of the tuples of the cardiac features are used for training the machine learning model, and some of the tuples of the cardiac features are using for validating an accuracy of the model. The training data and the testing data may be stored in training data database 134. In some embodiments, operation 2506 may be performed by a subsystem that is the same or similar to model training subsystem 118.

In operation 2508, a machine learning model (e.g., an artificial neural network (ANN)) may be trained using the training data, and in operation 2510, the machine learning model, after training, may be tested. In operation 2512, a determination may be made as to whether the accuracy of the model has been met. For example, an accuracy of the model, determined from the testing at operation 2510, may be compared to a threshold accuracy score. If the accuracy score of the model is greater than or equal to an accuracy score threshold (e.g., an 80% or greater accuracy, a 90% or greater accuracy, a 95% or greater accuracy, etc.), then process 2500 may proceed to operation 2514, where the trained machine learning may be stored. The trained machine learning model may be configured to determine whether a given set of cardiac features, computed from an arterial pressure waveform, indicate that a patient experienced one or more types of cardiac events (e.g., acute MI, myocardial ischemia). If not, process 2500 may return to operation 2508, where the model is trained again, having its weights, biases, and other hyperparameters adjusted based on results of an optimization function. In some embodiments, operations 2508-2514 may be performed by a subsystem that is the same or similar to model training subsystem 118.

Figure 26:
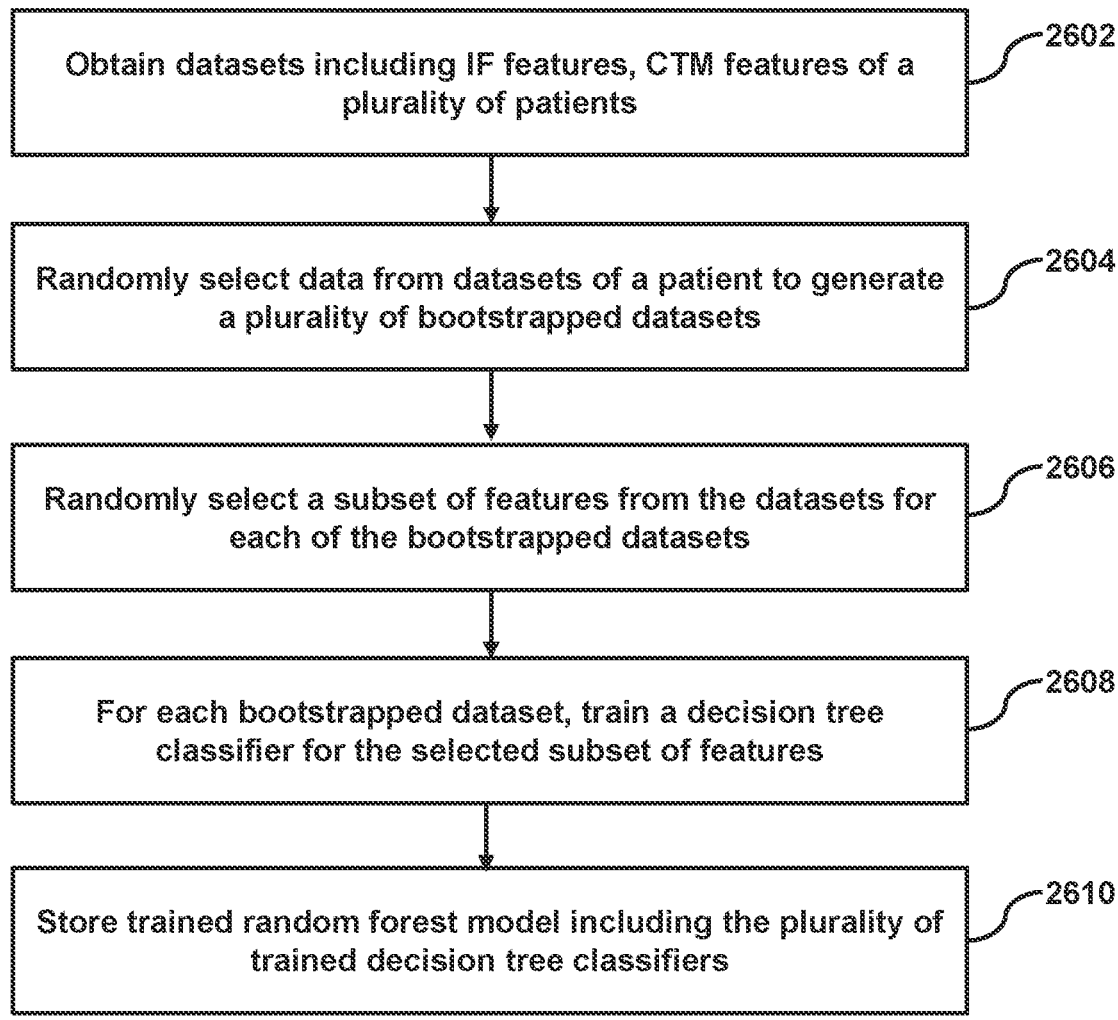
FIG. 26 illustrates an example process for training a machine learning model to determine whether a patient has an elevated or normal LVEDP, in accordance with various embodiments.

FIG. 26 illustrates an example process 2600 for training a machine learning model to determine whether a patient has an elevated or normal LVEDP, in accordance with various embodiments. In some embodiments, process 2600 may begin at operation 2602. In operation 2602, datasets including IF features, CTM features, or other features, of a plurality of patients may be obtained. The IF features and CTM features may include $\omega_1$, $\omega_2$, $\varphi_1$, $\varphi_2$, $R_s$, $R_d$, ER, QP$f$, RP$f$, and dp/dt$_{max}$. The IF features and CTM features may be determined from a BP waveform (e.g., a femoral blood pressure waveform) and an ECG of a patient. For example, using a smartwatch (e.g., client device 104), a BP and ECG of a patient may be captured. The plurality of patients may include patients that have experienced HF, as well as patients that have not experienced HF. For the patients that have experienced HF, a measured LVEDP, for instance obtained using traditional techniques (e.g., an implanted HF monitoring device) may also be stored with the IF features and CTM features of the respective patients. In some embodiments, operation 2602 may be performed by a subsystem that is the same or similar to training subsystem 124.

In operation 2604, data may be randomly selected from the obtained datasets to generate a plurality of bootstrapped datasets. The process of randomly (or pseudo-randomly) selected the data is referred to as bootstrapping. In some embodiments, the bootstrapped datasets may include a same number of rows as the originally obtained datasets. Rows may be randomly selected from the original N rows, where rows may be returned after selection such that multiple instances of a same row may be included in a given dataset. In some embodiments, operation 2604 may be performed by a subsystem that is the same or similar to training subsystem 124.

In operation 2606, a subset of features may be randomly selected from the datasets for each of the bootstrapped datasets. For example, a subset of features may be selected from the total set of features (e.g., $\omega_1$, $\omega_2$, $\varphi_1$, $\varphi_2$, $R_s$, $R_d$, ER, QP$f$, RP$f$, and dp/dt$_{max}$) included by training data 2100. For example, a first subset of features, including $\omega_1$, $\omega_2$, ER, QP$f$, RP$f$, dp/dt$_{max}$, may be selected for training a first decision tree using a first bootstrapped dataset, a second subset of features, including $\omega_1$, $\omega_2$, $\varphi_1$, QP$f$, RP$f$, dp/dt$_{max}$, may be selected for training a second decision tree using a second bootstrapped dataset, a third subset of features, $\omega_1$, $\varphi_1$, ER, QP$f$, RP$f$, and dp/dt$_{max}$, may be selected for training a third decision tree using a third bootstrapped dataset, and so on. In some embodiments, operation 2606 may be performed by a subsystem that is the same or similar to training subsystem 124.

In operation 2608, for each bootstrapped dataset, a corresponding decision tree classifier may be trained for the selected subset of features. For example, the first decision tree may be trained using the first bootstrapped dataset for the first subset of features; the second decision tree may be trained using the second bootstrapped dataset for the first subset of features; the third decision tree may be trained using the third bootstrapped dataset for the third subset of features, and so on. In some embodiments, operation 2608 may be performed by a subsystem that is the same or similar to training subsystem 124.

In operation 2610, the trained decision tree classifiers may be stored as a trained RF model, where the trained RF model includes the plurality of trained decision tree classifiers. When a new dataset is obtained, the dataset may be input to each of the trained decision tree classifiers, and an output result of each may be generated. Based on the output result of each of the trained decision tree classifiers, a determination may be made as to whether a given patient (with whom the new dataset was derived for) is experiencing HF. In some embodiments, operation 2610 may be performed by a subsystem that is the same or similar to training subsystem 124.

Figure 27:
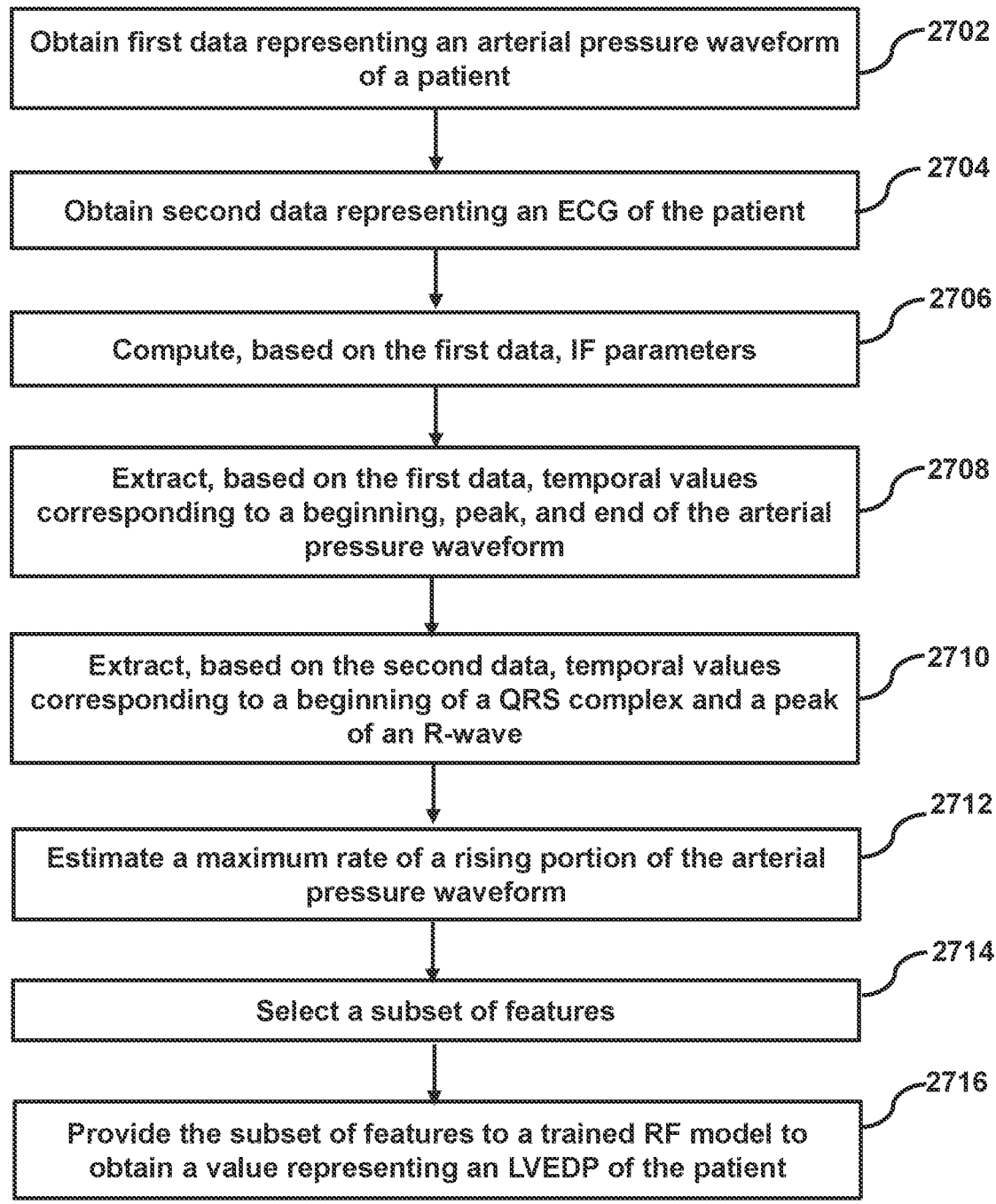
FIG. 27 illustrates an example process for determining features to be used by a trained machine learning model to determine whether a patient has an elevated or normal LVEDP, in accordance with various embodiments.

FIG. 27 illustrates an example process 2700 for determining features to be used by a trained machine learning model to determine whether a patient has an elevated or normal LVEDP, in accordance with various embodiments. In some embodiments, process 2700 may begin in operation 2702. In operation 2702, first data representing an arterial pressure waveform of a patient may be obtained. The arterial pressure waveform may be captured using client device 104. In some embodiments, data used to generate an arterial pressure waveform may be obtained, such as pulse data, arterial wall displacements, or other data. The arterial pressure waveform may be captured at different locations about the patient. For example, the arterial pressure waveform may be a femoral blood pressure waveform. In some embodiments, operation 2702 may be performed by a subsystem that is the same or similar to IF subsystem 112.

In operation 2704, second data representing an ECG of the patient may be obtained. The ECG data may be captured using an ECG device (e.g., client device 104$n$ of FIG. 2) including electrodes capable of measuring electrical activity of the patient's heart. In some embodiments, the ECG data may be captured contemporaneously with the arterial pressure data (e.g., of operation 2702). In some embodiments, operation 2704 may be performed by a subsystem that is the same or similar to CTM subsystem 120.

In operation 2706, IF parameters may be computed based on the first data. The computed IF parameters may include intrinsic frequencies $\omega_1$, $\omega_2$, intrinsic phase angles $\varphi_1$, $\varphi_2$, intrinsic envelopes $R_s$, $R_d$, envelope ratio ER, a relative height of the dicrotic notch (RHDN), a maximum slope of the rising portion of the arterial pressure waveform dp/dt$_{max}$, or other parameters. In operation 2708, temporal values corresponding to a beginning, peak, and end of the arterial pressure waveform may be extracted based on the first data. For example, an amount of time between the start of systolic phase of the arterial pressure waveform and the dicrotic notch, an amount of time between the start of the systolic phase and the end of the diastolic phase, or other parameters, may be extracted from the arterial pressure waveform of the cardiac cycle of the patient. In some embodiments, operations 2706 and 2708 may be performed by a subsystem that is the same or similar to IF subsystem 112.

In operation 2710, temporal values corresponding to a beginning of a QRS complex and a peak of an R-wave may be extracted from the ECG of the patient, based on the second data. For example, the QP$f$ and the RP$f$ may be extracted from the ECG of the patient. The QP$f$ represents an amount of time between the femoral pressure wave's onset (e.g., beginning 1622 of waveform 1620) and Q-wave's onset (e.g., point 1622). The RP$f$ represents the femoral pressure wave's onset (e.g., beginning 1622 of waveform 1620) and the R-wave's apex (e.g., point 1614). In some embodiments, operation 2710 may be performed by a subsystem that is the same or similar to CTM subsystem 120.

In operation 2712, a maximum rate of a rising portion of the arterial pressure waveform may be estimated. For example, maximum slope 1628 of the arterial pressure wave during a rising portion of the femoral pressure wave may be calculated. An example of the maximum slope of the rising portion of an arterial pressure waveform may be seen by waveform 1700 of FIG. 17A. In some embodiments, a slope (e.g., dp/dt) along each point of the rising portion of the arterial pressure wave may be computed, and a maximum slope may be identified. In some cases, a Lagrange polynomial approximation using a high-order (e.g., 19-point) stencil may be used to calculate the maximum slope (e.g., Max (dp/dt)). In some embodiments, operation 2712 may be performed by a subsystem that is the same or similar to IF subsystem 112, CTM subsystem 120, or operation 2712 may be performed by both IF subsystem 112 and CTM subsystem 120.

In operation 2714, a subset of the features may be selected. In some embodiments, the IF features and the CTM features may be computed by operations 2706-2712. From the calculated features, a subset of the features may be selected for use as input to a machine learning model for computing an estimate LVEDP of the patient. In some embodiments, the subset of features may be selected based on the training performed to the model. For example, depending on the subset of features selected for training of the machine learning model those features may be selected. For example, the selected subset of features may include a first intrinsic frequency $\omega_1$ associated with a systolic phase of a cardiac cycle, a systolic intrinsic phase angle $\varphi_1$, a minimum pressure (e.g., $P_{diastolic}$), a maximum pressure (e.g., $P_{systolic}$), a maximum rate of change of the rising portion of the pressure wave $dp/dt_{max}$, a PEP, or other features. In some embodiments, operation 2714 may be performed by a subsystem that is the same or similar to model subsystem 122.

In operation 2716, the selected subset of features may be provided to a trained machine learning model. The trained machine learning model may be configured to estimate a value of the LVEDP of the cardiac cycle of the patient based on the input subset of features. As an example, the trained machine learning model may be a trained random forest model. Furthermore, although some embodiments provide the subset of features to the trained RF model to obtain an estimated value of the LVEDP, some embodiments may alternatively or additionally determine whether the estimated LVEDP value satisfies a threshold condition indicative of HF. In some embodiments, operation 2716 may be performed by a subsystem that is the same or similar to model subsystem 122.

Figure 28:
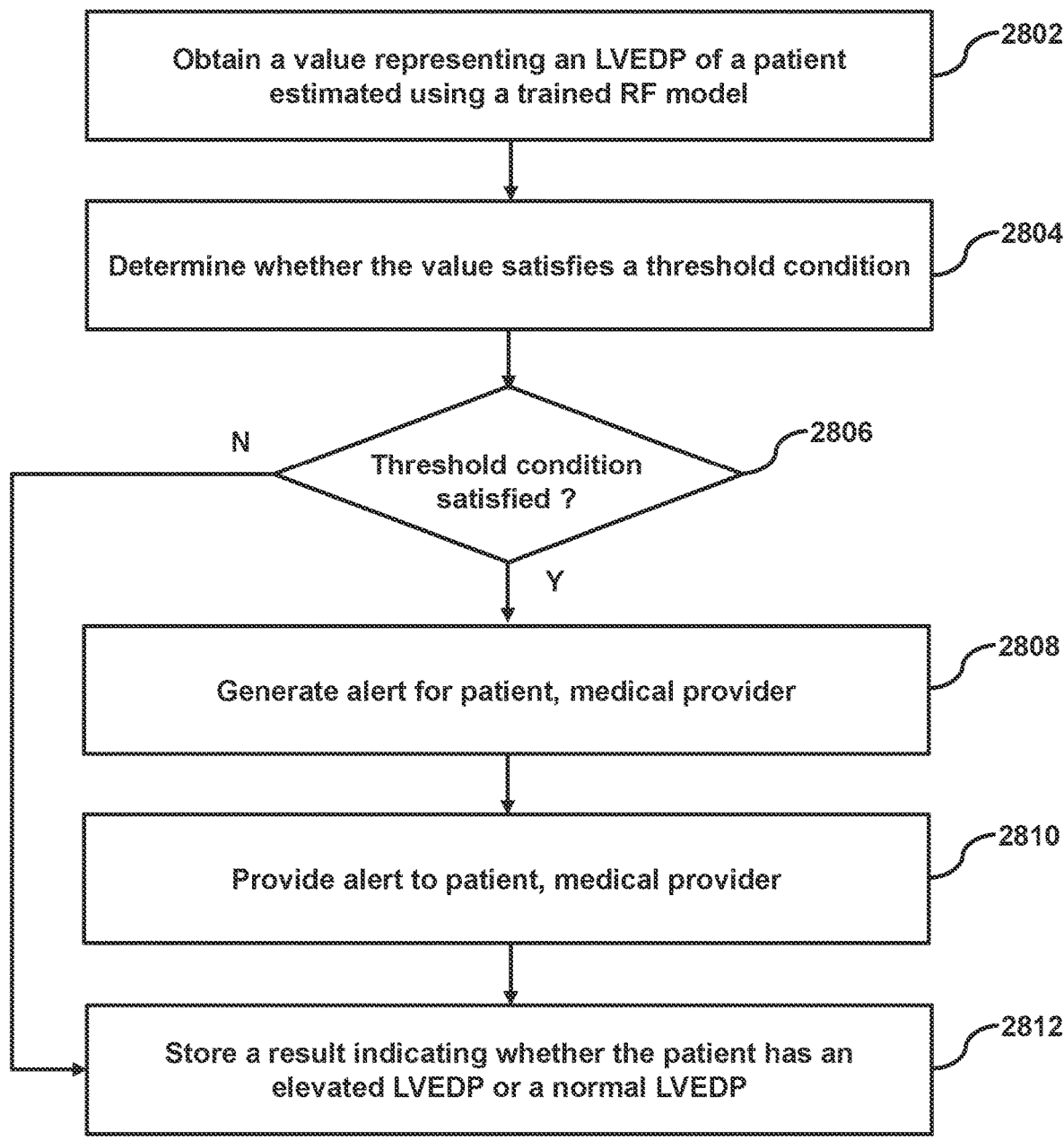
FIG. 28 illustrates an example process for determining whether an estimated LVEDP of a patient satisfies a threshold condition, in accordance with various embodiments.

FIG. 28 illustrates an example process 2800 for determining whether an estimated LVEDP of a patient satisfies a threshold condition, in accordance with various embodiments. In some embodiments, process 2800 may begin at operation 2802. In operation 2802, a value representing an LVEDP of a patient may be obtained. The value representing the LVEDP may be estimated using a trained RF model, such as the trained RF model described above with respect to FIG. 26. In some embodiments, operation 2802 may be performed by a subsystem that is the same or similar to model subsystem 122.

In operation 2804, a determination may be made as to whether the value representing the estimated LVEDP of the patient satisfies a threshold condition. In some embodiments, the threshold condition may be satisfied if an estimate LVEDP value is greater than or equal to a threshold LVEDP value. For example, the threshold LVEDP value may be 18 mmHg. If the value of the LVEDP estimated by the trained RF model is greater than 18 mmHg, then the threshold condition may be satisfied. In some embodiments, operation 2804 may be performed by a subsystem that is the same or similar to model subsystem 122.

In operation 2806, a decision is made as to whether the threshold condition was satisfied at operation 2804. If, at operation 2806, it is determined that the threshold condition is not satisfied (e.g., based on the estimated LVEDP value being less than the threshold LVEDP value), then process 2800 may proceed to operation 2812. In operation 2812, a result indicating whether the patient has an elevated LVEDP (e.g., the estimated LVEDP value is greater than or equal to the threshold LVEDP value) or a normal LVEDP (e.g., the estimated LVEDP is less than the threshold LVEDP value). Therefore, if the threshold condition is not satisfied, then the result stored may indicate that the patient has a normal (or non-elevated) LVEDP. If, at operation 2806, it is determined that the threshold condition is satisfied (e.g., based on the estimated LVEDP value being greater than or equal to the threshold LVEDP value), process 2800 may proceed to operation 2808. In operation 2808, an alert for the patient, a medical provider of the patient (e.g., doctor, hospital, nurse, home health assistant, etc.), family of the patient, friends of the patient, or other entities, or combinations thereof may be generated. In operation 2810, the generated alert may be provided to the patient, the patient's medical provider, or any of the entities mentioned in operation 2808. In some embodiments, the alert may be a message including text that the patient has an elevated LVEDP, an audible sound, a haptic feedback, or other types of messages. Furthermore, some embodiments include the message including medication or therapies to be provided to the patient. In operation 2812, a result indicating that the patient has elevated LVEDP may be stored in memory. The result may be a binary bit having a value of 0—indicating that the estimated LVEDP value is normal—or a 1—indicating that the estimated LVEDP value is elevated. In some embodiments, the result, the estimated LVEDP, the IF features, the CTM features, or other information, may be added to the training data to obtain updated training data. In this way, as more and more patients are analyzed for non-invasive elevated LVEDP, the training data used to train, re-train, or reset and retrain, may be updated, thereby improving the accuracy and analysis capacity of the trained machine learning model. In some embodiments, operations 2808-2812 may be performed by a subsystem that is the same or similar to model subsystem 122.

Figure 29:
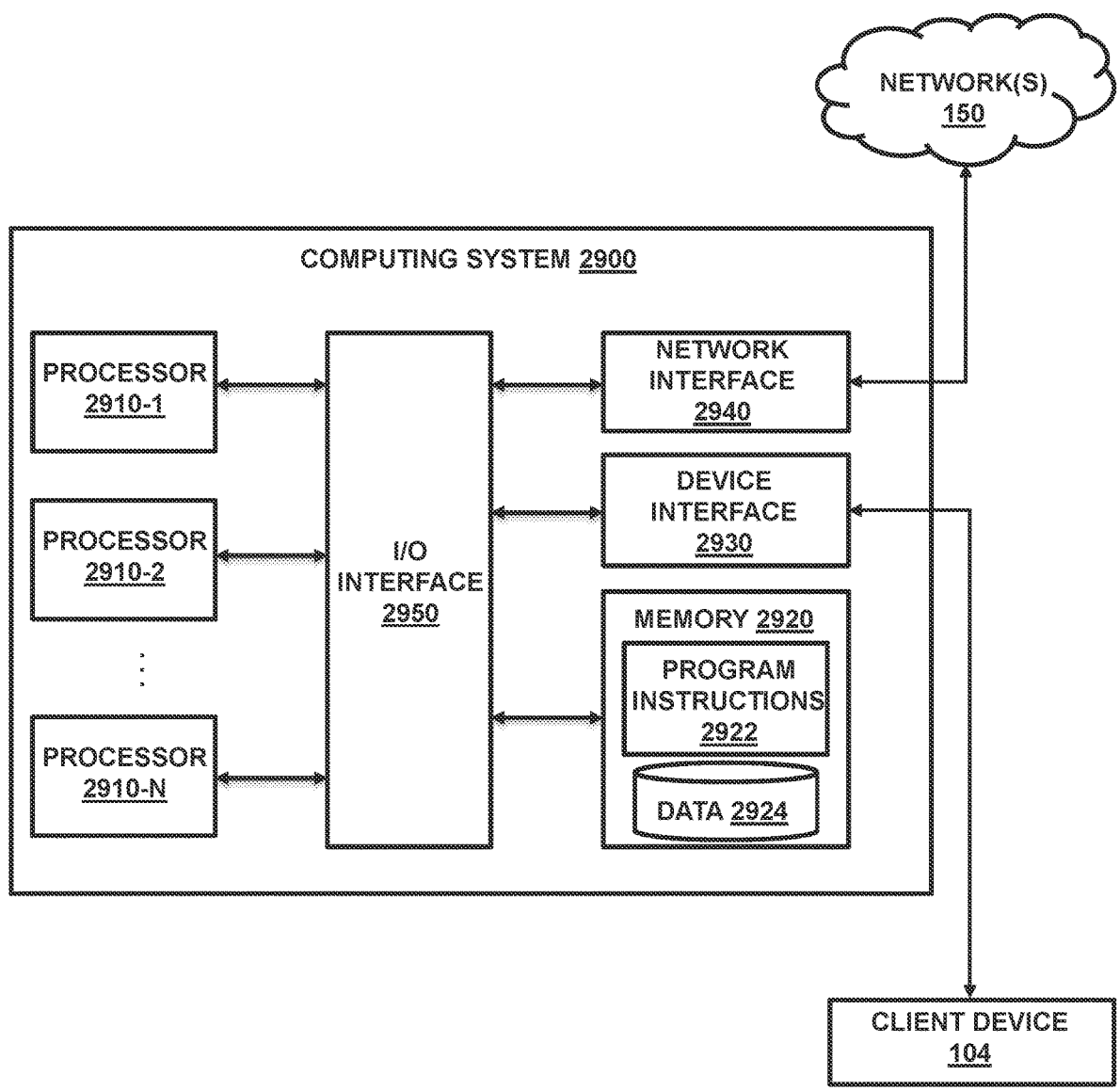
FIG. 29 is an example block diagram of a computing system upon which described program code may be executed, in accordance with various embodiments.

FIG. 29 is an example block diagram of a computing system upon which described program code may be executed, in accordance with various embodiments. Various portions of systems and methods described herein, may include or be executed on one or more computer systems similar to computing system 2900. Further, processes and modules described herein may be executed by one or more processing systems similar to that of computing system 2900.

Computing system 2900 may include one or more processors (e.g., processors 2910-1 to 2910-N) coupled to system memory 2920, an input/output I/O device interface 2930, and a network interface 2940 via an input/output (I/O) interface 2950. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 2900. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 2920). Computing system 2900 may be a uni-processor system including one processor (e.g., processor 2910-1), or a multi-processor system including any number of suitable processors (e.g., 2910-1 to 2910-N). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 2900 may include a plurality of computing devices (e.g., distributed computer systems) to implement various processing functions.

I/O device interface 2930 may provide an interface for connection of one or more I/O devices 2960 to computing system 2900. I/O devices may include devices that receive input (e.g., from a user) or output information (e.g., to a user). I/O devices 2960 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 2960 may be connected to computing system 2900 through a wired or wireless connection. I/O devices 2960 may be connected to computing system 2900 from a remote location. I/O devices 2960 located on remote computer system, for example, may be connected to computing system 2900 via a network and network interface 2940. The device interface in some embodiments can be wire connected to the client device as depicted in FIG. 29. In some other embodiments the device interface may be connected to the client device wirelessly. In some wireless embodiments, the computing system is implemented in the cloud.

Network interface 2940 may include a network adapter that provides for connection of computing system 2900 to a network. Network interface 2940 may facilitate data exchange between computing system 2900 and other devices connected to the network. Network interface 2940 may support wired or wireless communication. The network may include an electronic communication network, such as the Internet, a local area network (LAN), a wide area network (WAN), a cellular communications network, or the like.

System memory 2920 may be configured to store program instructions 2922 or data 2924. Program instructions 2922 may be executable by a processor (e.g., one or more of processors 2910-1 to 2910-N) to implement one or more embodiments of the present techniques. Instructions 2922 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 2920 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 2920 may include a non-transitory computer readable storage medium that may have program instructions stored thereon that are executable by a computer processor (e.g., one or more of processors 2910-1-2910-N) to cause the subject matter and the functional operations described herein. A memory (e.g., system memory 2920) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 2950 may be configured to coordinate I/O traffic between processors 2910-1 to 2910-N, system memory 2920, network interface 2940, I/O devices 2960, and/or other peripheral devices. I/O interface 2950 may perform protocol, timing, or other data transformations to convert data signals from one component (e.g., system memory 2920) into a format suitable for use by another component (e.g., processors 2910-1 to 2910-N). I/O interface 2950 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computing system 2900 or multiple computing systems 2900 configured to host different portions or instances of embodiments. Multiple computing systems 2900 may provide for parallel or sequential processing/execution of one or more portions of the techniques described herein.

Those skilled in the art will appreciate that computing system 2900 is merely illustrative and is not intended to limit the scope of the techniques described herein. Computing system 2900 may include any combination of devices or software that may perform or otherwise provide for the performance of the techniques described herein. For example, computing system 2900 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computing system 2900 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computing system 2900 may be transmitted to computing system 2900 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Similarly, reference to "a computer system" performing step A and "the computer system" performing step B can include the same computing device within the computer system performing both steps or different computing devices within the computer system performing steps A and B. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively. Computer implemented instructions, commands, and the like are not limited to executable code and can be implemented in the form of data that causes functionality to be invoked, e.g., in the form of arguments of a function or API call. To the extent bespoke noun phrases (and other coined terms) are used in the claims and lack a self-evident construction, the definition of such phrases may be recited in the claim itself, in which case, the use of such bespoke noun phrases should not be taken as invitation to impart additional limitations by looking to the specification or extrinsic evidence.

In this patent, to the extent any U.S. patents, U.S. patent applications, or other materials (e.g., articles) have been incorporated by reference, the text of such materials is only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The present techniques will be better understood with reference to the following enumerated embodiments:

A1. A method, comprising: obtaining data representing measurements of a cardiac cycle of a patient; determining, based the data, a first intrinsic frequency the cardiac cycle and a first intrinsic phase angle of the cardiac cycle; providing the first intrinsic frequency and the first intrinsic phase angle to a trained machine learning model; obtaining, from the trained machine learning model, a set of values each representing a likelihood that the patient has experienced a cardiovascular event; determining whether one or more values from the set of values satisfy a threshold condition; and storing a result of the determination of whether one or more values from the set of values satisfy the threshold condition in memory.

A2. The method of embodiment A1, wherein the method further comprises: determining a second intrinsic frequency of the cardiac cycle and a second intrinsic frequency of the cardiac cycle.

A3. The method of any one of embodiments A1-A2, wherein the method further comprises: determining an intrinsic envelope of a systolic portion of the cardiac cycle and determining an intrinsic envelope of a diastolic portion of the cardiac cycle.

A4. The method of any one of embodiments A1-A3, wherein the method further comprises: determining at least one of an envelope ratio or a relative height of the dicrotic notch.

A5. The method of any one of embodiments A1-A4, wherein the trained machine learning model is a trained artificial neural network configured to determine whether the patient experienced at least one of a plurality of cardiovascular events.

A6. The method of embodiment A5, wherein the plurality of cardiac events include an acute myocardial infarction MI and myocardial ischemia.

A7. The method of embodiment A5, wherein the plurality of cardiovascular events includes the cardiovascular event.

A8. The method of any one of embodiments A1-A7, wherein the data representing the measurements of the cardiac cycle of the first patient are obtained from a client device of the first patient.

A9. The method of embodiment A8, wherein the client device is operatively coupled to at least one sensor configured to capture the measurements of the cardiac cycle of the patient, generate the data representing the measurements of the cardiac cycle of the patient, and at least one of output or store, in memory, the data representing the measurements of the cardiac cycle of the patient.

A10. The method of any one of embodiments A8-A9, wherein the client device is a wearable device further configured to generate one or more waveforms representing the cardiac cycle of the patient based on the data representing the measurements of the cardiac cycle of the patient, wherein the first intrinsic frequency and the first intrinsic phase angle are determined based on the one or more waveforms.

A11. The method of any one of embodiments A1-A10, wherein the first intrinsic frequency and the first intrinsic phase angle are determined using steps for performing an intrinsic frequency analysis to an arterial pressure waveform.

A12. The method of any one of embodiments A1-A11, further comprising: steps for training a machine learning model to obtain the trained machine learning model.

A13. The method of any one embodiments A1-A12, further comprising: retrieving, from a database, a plurality of datasets comprising waveforms representing (i) cardiac cycles of a first plurality of patients that have experienced one or more of a plurality of cardiovascular events and (ii) cardiac cycles of a second plurality of patients that have not experienced any of the plurality of cardiovascular events; determining, for each of the first plurality of patients and the second plurality of patients, based on the waveforms representing the cardiac cycles of the first plurality of patients that have experienced the one or more of the plurality of cardiovascular events and the waveforms of the second plurality of patients that have not experienced any of the plurality of cardiovascular events, a first intrinsic frequency associated with a systolic phase of a cardiac cycle of a respective patient and a first intrinsic phase angle of the systolic phase of the cardiac cycle to obtain a plurality of first intrinsic frequencies and a plurality of systolic intrinsic phase angles respectively corresponding to the plurality of first intrinsic frequencies; generating and storing training data comprising a plurality of tuples respectively corresponding to each of the first plurality of patients and the second plurality of patients, wherein each tuple includes one of the plurality of first intrinsic frequencies and one of the plurality of systolic intrinsic phase angles, wherein each tuple of the plurality of tuples corresponds to one of the first plurality of patients or the second plurality of patients; and training and testing a neural network based on the training data to obtain the trained neural network.

A14. The method of embodiment A13, further comprising: determining a second intrinsic frequency associated with a diastolic phase of the cardiac cycle and a diastolic intrinsic phase angle associated with the diastolic phase of the cardiac cycle to obtain a plurality of second intrinsic frequencies and a plurality of diastolic intrinsic phase angles respectively corresponding to the plurality of second intrinsic frequencies.

A15. The method of embodiment A14, wherein the plurality of tuples from the training data further comprises: the plurality of second intrinsic frequencies and the plurality of diastolic intrinsic phase angles.

A16. The method of any one embodiments A13-A15, further comprising: computing at least one of an intrinsic envelope of systole, an intrinsic envelope of diastole, an envelope ratio, or a relative height of the dicrotic notch (RHDN), wherein the tuples further include the at least one of the intrinsic envelope of systole, the intrinsic envelope of diastole, the envelope ratio, or the RHDN.

A17. The method of any one of embodiments A13-A16, wherein each tuple includes a label indicating whether a waveform of a corresponding patient refers to one of the first plurality of patients that have experienced one or more of the plurality of cardiovascular events or to one of the second plurality of patients that have not experienced any of the plurality of cardiovascular events.

A18. The method of any one of embodiments A1-A17, wherein the trained machine learning model comprises at least an input layer, one or more hidden layers, and an output layer.

A19. The method of embodiment A18, wherein nodes of the one or more hidden layers are fully connected to nodes of the input layer, the one or more hidden layers being configured to generate a classification vector comprising the set of values, each of the set of values being a classification score representing a likelihood that the first patient has experienced one of the plurality of cardiovascular events.

A20. The method of embodiment A19, wherein a last hidden layer or the output layer include a Softmax layer where a Softmax function is applied to the classification vector to determine whether the one or more values from the set of values satisfy the threshold condition.

A21. The method of any one of embodiments A1-A20, wherein the threshold condition being satisfied comprises a given value from the set of values being greater than or equal to a threshold value.

A22. The method of any one of embodiments A1-A21, further comprising: responsive to determining that the one or more values from the set of values satisfy the threshold condition, generating an alert indicating that the patient has experienced a cardiac event; and providing the alert to one or more client devices of the patient, a medical provider of the patient, or the patient and the medical provider of the patient.

A23. The method of any one of embodiments A1-A22, wherein the data representing the measurements of the cardiac cycle of the patient are captured using cardiovascular measurement means.

A24. The method of any one of embodiments A1-A23, wherein the method is performed locally on a client device of the patient.

A25. The method of any one of embodiments A1-A24, wherein the cardiovascular event occurred within a predetermined amount of time of the measurements being captured by a client device of the patient.

B1. A method, comprising: obtaining first data representing a hemodynamic waveform of a patient that experienced a myocardial infarction (MI); determining, based on the first data, a set of cardiovascular parameters of the patient, the set of cardiovascular parameters comprising a first intrinsic frequency of a cardiac cycle of the patient, a first intrinsic phase angle of the cardiac cycle, a relative height of a dicrotic notch (RHDN) of the cardiac cycle, and an envelope ratio (ER) of the cardiac cycle; providing the set of cardiovascular parameters to a trained machine learning model configured to determine a size of a myocardial infarction experienced by the patient; obtaining, from the trained machine learning model, the size of the myocardial infarction experienced by the patient; and providing second data comprising the size of the myocardial infarction experienced by the patient to one or more client devices of the patient, a medical provider of the patient, or the patient and the medical provider of the patient.

B2. The method of embodiment B1, wherein the set of cardiovascular parameters further comprises a second intrinsic frequency of the cardiac cycle, and a second intrinsic phase angle of the cardiac cycle.

B3. The method of any one of embodiments B1-B2, wherein the set of cardiovascular parameters further comprise an intrinsic envelope of a systolic portion of the cardiac cycle and an intrinsic envelope of a diastolic portion of the cardiac cycle.

B4. The method of any one of embodiments B1-B3, wherein the set of cardiovascular parameters are computed by performing steps for applying the intrinsic frequency method to an arterial pressure waveform.

B5. The method of any one of embodiments B2-B4, wherein: the first intrinsic frequency describes a systolic phase of the cardiac cycle of the patient; the second intrinsic frequency describes a diastolic phase of the cardiac cycle of the patient; the first intrinsic phase angle comprises a systolic intrinsic phase angle describing the systolic phase of the cardiac cycle of the patient; and the second intrinsic phase angle comprises a diastolic intrinsic phase angle describing the diastolic phase of the cardiac cycle of the patient.

B6. The method of any one of embodiments B1-B5, wherein the hemodynamic waveform of the patient comprises at least one of an arterial pressure waveform or a vessel wall displacement waveform.

B7. The method of any one of embodiments B1-B6, wherein the trained machine learning model is a trained artificial neural network configured to determine a size of a myocardial infarction experienced by the patient.

B8. The method of any one of embodiments B1-B7, wherein the data representing the measurements of the cardiac cycle of the first patient are obtained from a client device of the first patient.

B9. The method of embodiment B8, wherein the client device is operatively coupled to at least one sensor configured to capture the measurements of the cardiac cycle of the patient, generate the data representing the measurements of the cardiac cycle of the patient, and at least one of output or store, in memory, the data representing the measurements of the cardiac cycle of the patient.

B10. The method of any one of embodiments B8-B9, wherein the client device is a wearable device further configured to generate one or more waveforms representing the cardiac cycle of the patient based on the data representing the measurements of the cardiac cycle of the patient, wherein the first intrinsic frequency and the first intrinsic phase angle are determined based on the one or more waveforms.

B11. The method of any one of embodiments B1-B10, wherein the first intrinsic frequency and the first intrinsic phase angle are determined using steps for performing an intrinsic frequency analysis to an arterial pressure waveform.

B12. The method of any one of embodiments B1-B11, further comprising: steps for training a machine learning model to obtain the trained machine learning model.

B13. The method of any one of embodiments B1-B12, further comprising: retrieving a plurality of hemodynamic waveforms, each of the plurality of hemodynamic waveforms respectively corresponding to one of a plurality of patients, each of whom have experienced an acute myocardial infarction; determining, for each of the plurality of hemodynamic waveforms, a set of cardiovascular parameters of a cardiac cycle of a respective one of the plurality of patients to obtain a plurality of sets of cardiovascular parameters, wherein each set of cardiovascular parameters of the plurality of sets of cardiovascular parameters comprises: (i) one or more intrinsic frequencies of the cardiac cycle of the respective one of the plurality of patients, (ii) one or more intrinsic phase angles of the cardiac cycle of the respective one of the plurality of patients, (iii) a relative height of a dicrotic notch (RHDN) of the cardiac cycle of the respective one of the plurality of patients, and (iv) an envelope ratio (ER) of the cardiac cycle of the respective one of the plurality of patients; generating and storing training data comprising tuples of the one or more intrinsic frequencies, the one or more intrinsic phase angles, the RHDN, and the ER for each of the plurality of patients, wherein each tuple includes an indication of a size of a myocardial infarction experienced by the respective one of the plurality of patients; and training and testing a neural network based on the training data to obtain the trained neural network.

B14. The method of embodiment B13, wherein the set of cardiac features further includes at least one of an intrinsic envelope of systole or an intrinsic envelope of diastole.

B15. The method of any one of embodiments B13-B14, wherein the plurality of tuples from the training data further each include comprises: at least one of a first intrinsic frequency of a systolic portion of the cardiac cycle or a second intrinsic frequency of a diastolic portion of the cardiac cycle, at least one of a systolic intrinsic phase angle of the systolic portion of the cardiac cycle or a diastolic phase angle of the diastolic portion of the cardiac cycle, at least one of an intrinsic envelope of the systolic portion of the cardiac cycle or an intrinsic envelope of the diastolic portion of the cardiac cycle, the ER for the cardiac cycle, and the RHDN of the cardiac cycle.

B16. The method of any one of embodiments B13-B15, wherein each tuple includes a label indicating a size of an infarction that a corresponding patient experienced.

B17. The method of any one of embodiments B1-B16, wherein the first data representing the hemodynamic waveform of a patient are obtained from a client device of the patient.

B18. The method of embodiment B17, wherein the client device is operatively coupled to at least one sensor configured to capture hemodynamic measurements of the cardiac cycle of the patient, generate the first data representing the hemodynamic waveform of the cardiac cycle of the patient, and at least one of output or store, in memory, the first data representing the hemodynamic waveform of the cardiac cycle of the patient.

B19. The method of embodiment B18, wherein the client device is a wearable device.

B20. The method of any one of embodiments B1-B19, wherein the trained machine learning model comprises at least an input layer, one or more hidden layers, and an output layer.

B21. The method of embodiment B20, wherein nodes of the one or more hidden layers are fully connected to nodes of the input layer, the one or more hidden layers being configured to generate a value indicating an estimated size of a myocardial infarction experienced by a patient.

B22. The method of any one of embodiments B1-B21, further comprising: updating training data used to train the trained machine learning model based on the set of cardiovascular parameters and the size of myocardial infarction of the patient to obtain updated training data, wherein the updated training data comprises a tuple including the set of cardiovascular parameters and the size of the myocardial infarction of the patient.

B23. The method of any one of embodiments B1-B22, further comprising: steps for training a trained neural network to obtain the trained neural network.

B24. The method of any one of embodiments B1-B23, wherein the first data representing the hemodynamic waveform of the patient are captured using cardiovascular measurement means.

B25. The method of any one of embodiments B1-B24, further comprising: responsive to determining that the size of the myocardial infarction satisfies a threshold condition, generating an alert indicating that the patient has experienced an acute MI and the size of the acute MI; and providing the alert to one or more client devices of the patient, a medical provider of the patient, or the patient and the medical provider of the patient.

B26. The method of any one of embodiments B1-B25, wherein the first data representing the measurements of the cardiac cycle of the patient are captured using cardiovascular measurement means.

B27. The method of any one of embodiments B1-B26, wherein the method is performed locally on a client device of the patient.

B28. The method of any one of embodiments B1-B27, wherein the myocardial infarction experienced by the patient occurred within a predetermined amount of time of the measurements being captured by a client device of the patient.

C1. A method comprising: obtaining first data representing a blood pressure waveform of a patient; obtaining second data representing an electrocardiogram (ECG) of the patient; extracting, based on the first data, a first set of features comprising: a first temporal value corresponding to a beginning of the femoral blood pressure waveform, a second temporal value corresponding to a dicrotic notch of the femoral blood pressure waveform, and a third temporal value corresponding to an end of the femoral blood pressure waveform; extracting, based on the second data, a second set of features comprising: a fourth temporal value corresponding to a beginning of a QRS complex and a fifth temporal value corresponding to a peak of an R-wave of the ECG of the patient; estimating, based on a first amount of time between the first temporal value and the fourth temporal value or a second amount of time between the first temporal value and the fifth temporal value, a maximum rate of a rising portion of the femoral blood pressure waveform; selecting a subset of features from the first set of features, the second set of features, the first amount of time between the first temporal value and the fourth temporal value, the second amount of time between the first temporal value and the fifth temporal value, and the maximum rate of the rising portion of the femoral blood pressure waveform; providing the subset of features to a trained machine learning model to obtain a first value representing a left ventricular end-diastolic pressure (LVEDP) of the patient; determining whether the first value representing the LVEDP of the patient satisfies a threshold condition; and storing, in memory, based on the first value, a result indicating whether the patient has an elevated LVEDP or a normal LVEDP.

C2. The method of embodiment C1, further comprising: computing, based on the first data, a set of intrinsic features of a cardiac cycle of the patient.

C3. The method of embodiment C2, wherein the first set of features are extracted based on the set of intrinsic features.

C4. The method of any one of embodiments C2-C3, wherein the set of intrinsic features comprises at least one of: a first intrinsic frequency of a systolic phase of the cardiac cycle of the patient, a second intrinsic frequency of a diastolic phase of the cardiac cycle of the patient, a systolic intrinsic phase angle describing the systolic phase of the cardiac cycle of the patient, a diastolic intrinsic phase angle describing the diastolic phase of the cardiac cycle of the patient, a systolic intrinsic envelope of the systolic phase of the cardiac cycle of the patient, a diastolic intrinsic envelope of the diastolic phase of the cardiac cycle of the patient, and an envelope ratio (ER) based on the systolic intrinsic envelope and the diastolic intrinsic envelope, a maximum blood pressure, or a minimum blood pressure.

C5. The method of embodiment C4, wherein the subset of features comprises at least one of: the first intrinsic frequency, the second intrinsic frequency, the envelope ratio ER, the first amount of time, the second amount of time, and the maximum rate; the first intrinsic frequency, the first intrinsic phase angle, the second intrinsic frequency, the first amount of time, the second amount of time, and the maximum rate; or the first intrinsic frequency, the first intrinsic phase angle, the envelope ratio ER, the first amount of time, the second amount of time, and the maximum rate.

C6. The method of any one of embodiments C1-C5, wherein the trained machine learning model is a trained random forest model.

C7. The method of embodiment C6, wherein the trained random forest model is trained to estimate an LVEDP based on instances of the first set of features and the second set of features extracted from training data, wherein the training data comprises femoral blood pressure waveforms and ECGs of patients that have experienced heart failure and patients that have not experienced heart failure, wherein the threshold condition being satisfied comprising the first value being greater than or equal to a threshold LVEDP value.

C8. The method of embodiment C7, wherein the threshold LVEDP value is 18 mmHg.

C9. The method of any one of embodiments C1-C8, wherein blood pressure measurements are captured using at least one sensor.

C10. The method of embodiment C9, wherein the at least one sensor is configured to generate a pressure waveform representing the femoral blood pressure measurements, C11. The method of anyone of embodiments C1-C10, wherein the ECG is captured using an electrocardiograph (ECG) device.

C12. The method of any one of embodiments C1-C11, wherein the blood pressure measurements are captured using at least one sensor and the ECG is captured using an ECG device, the blood pressure measurements and the ECG are captured concurrently.

C13. The method of embodiment C12, wherein a wearable device worn by the patient includes the at least one sensor and the ECG device; and a client device of the patient comprises the computing system.

C14. The method of any one of embodiments 1-13, further comprising: generating training data used to train a machine learning model to obtain the trained machine learning model.

C15. The method of embodiment C14, wherein for each of a plurality of patients, the method further comprises: obtaining a measured LVEDP value of a respective patient; obtaining third data representing femoral blood pressure waveforms of a cardiac cycle of the respective patient and fourth data representing ECGs of the cardiac cycle of the respective patient, wherein the femoral blood pressure waveforms of a given patient are generated based on femoral blood pressure measurements of the given patient, and wherein the femoral blood pressure measurements and the ECGs of the given patient are captured contemporaneously; computing, from the third data, computing, a first intrinsic frequency of a systolic phase of a cardiac cycle of a respective patient of the plurality of patients, a second intrinsic frequency of a diastolic phase of the cardiac cycle of the respective patient, a systolic intrinsic phase angle describing the systolic phase of the cardiac cycle of the respective patient, a diastolic intrinsic phase angle describing the diastolic phase of the cardiac cycle of the respective patient, a systolic intrinsic envelope of the systolic phase of the cardiac cycle of the respective patient, a diastolic intrinsic envelope of the diastolic phase of the cardiac cycle of the respective patient, and an envelope ratio (ER) based on the systolic intrinsic envelope and the diastolic intrinsic envelope; extracting, based on the third data, a third set of features comprising: a first temporal value corresponding to a beginning of the femoral blood pressure waveform, a second temporal value corresponding to a dicrotic notch of the femoral blood pressure waveform, and a third temporal value corresponding to an end of the femoral blood pressure waveform; extracting, based on the fourth data, a fourth set of features comprising: a fourth temporal value corresponding to a beginning of a QRS complex of the ECG of a respective patient and a fifth temporal value corresponding to a peak of an R-wave of the ECG of the respective patient; and estimating, based on a first amount of time between the first temporal value and the fourth temporal value of the respective patient or a second amount of time between the first temporal value and the fifth temporal value, a maximum rate of a rising portion of the femoral blood pressure waveform of the respective patient.

C16. The method of embodiment C15, wherein the training data comprises: for each patient of the plurality of patients, (i) a subset of features from the third set of features and the fourth set of features, and (ii) the LVEDP value; and.

C17. The method of embodiment C16, further comprising: causing a machine learning model to be trained based on the training data to obtain the trained random forest model, the trained random forest model being trained to estimate an LVEDP based on an input set of features.

C18. The method of any one of embodiments C1-C17, wherein the result comprises a binary value representing whether the first value indicates that the patient has an elevated LVEDP or a normal LVEDP.

C19. The method of embodiment C18, further comprising: responsive to determining that the first value indicates that the patient has an elevated LVEDP, generating and providing an alert to the patient, a medical professional of the patient, or the patient and the medical professional of the patient.

C20. The method of any one of embodiments C1-C19, further comprising: steps for training a machine learning model to obtain the trained machine learning model.

D1. A system comprising: memory storing computer program instructions; and one or more processors configured to execute the computer program instructions such that, when executed, the one or more processors effectuate operations comprising the method of any one of embodiments A1-A25, B1-B28, or C1-C20.

D2. A non-transitory computer-readable medium storing computer program instructions that, when executed by one or more processors of a computing system, effectuate operations comprising the method of any one of embodiments A1-A25, B1-B28, or C1-C20.

What is claimed is:

1. A system for non-invasively determining whether a patient has experienced heart failure based on an evaluation of a left ventricular end-diastolic pressure (LVEDP) of the patient, the system comprising:
at least one sensor configured to capture femoral blood pressure measurements of a patient and generate a femoral blood pressure waveform representing the femoral blood pressure measurements;
an electrocardiogramavice configured to capture an ECG of the patient, wherein the ECG and the femoral blood pressure measurements are captured concurrently;
a computing system comprising one or more processors executing computer program instructions to effectuate operations comprising:
obtaining, from the at least one sensor, first data representing the femoral blood pressure waveform of the patient;
obtaining, from the ECG device, second data representing the ECG of the patient;
computing, based on the first data, a first intrinsic frequency of a systolic phase of a cardiac cycle of the patient, a second intrinsic frequency of a diastolic phase of the cardiac cycle of the patient, a systolic intrinsic phase angle describing the systolic phase of the cardiac cycle of the patient, a diastolic intrinsic phase angle describing the diastolic phase of the cardiac cycle of the patient, a systolic intrinsic envelope of the systolic phase of the cardiac cycle of the patient, a diastolic intrinsic envelope of the diastolic phase of the cardiac cycle of the patient, and an envelope ratio based on the systolic intrinsic envelope and the diastolic intrinsic envelope;
extracting, based on the first data, a first set of features comprising: a first temporal value corresponding to a beginning of the femoral blood pressure waveform, a second temporal value corresponding to a dicrotic notch of the femoral blood pressure waveform, and a third temporal value corresponding to an end of the femoral blood pressure waveform;
extracting, based on the second data, a second set of features comprising: a fourth temporal value corresponding to a beginning of a QRS complex and a fifth temporal value corresponding to a peak of an R-wave of the ECG of the patient;
estimating, based on a first amount of time between the first temporal value and the fourth temporal value or a second amount of time between the first temporal value and the fifth temporal value, a maximum rate of a rising portion of the femoral blood pressure waveform;
selecting a subset of features from the first set of features, the second set of features, the first amount of time between the first temporal value and the fourth temporal value, the second amount of time between the first temporal value and the fifth temporal value, and the maximum rate of the rising portion of the femoral blood pressure waveform;

generating training data based on one or more of intrinsic frequencies, intrinsic phase angles, and/or intrinsic envelopes computed based on femoral blood pressure waveforms and ECGs of a plurality of patients that have experienced heart failure and patients that have not experienced heart failure;

providing the selected subset of features to a trained random forest model to obtain a first value representing a left ventricular end-diastolic pressure (LVEDP) of the patient;

training the trained random forest model to estimate the LVEDP of the patient based on instances of the first set of features and the second set of features extracted from the generated training data;

determining whether the first value representing the LVEDP of the patient satisfies a threshold condition, wherein the threshold condition being satisfied comprising the first value being greater than or equal to a threshold LVEDP value; and storing, in memory, based on the first value, a result indicating whether the patient has an elevated LVEDP or a normal LVEDP.

2. The system of claim 1, wherein the subset of features comprises at least one of:

the first intrinsic frequency, the second intrinsic frequency, the envelope ratio, the first amount of time, the second amount of time, and the maximum rate;

the first intrinsic frequency, the systolic intrinsic phase angle, the second intrinsic frequency, the first amount of time, the second amount of time, and the maximum rate; or the first intrinsic frequency, the systolic intrinsic phase angle, the envelope ratio, the first amount of time, the second amount of time, and the maximum rate.

3. The system of claim 1, wherein:

a wearable device worn by the patient includes the at least one sensor and the ECG device; and a client device of the patient comprises the computing system.

4. The system of claim 1, wherein the operations further comprise:

for each of the plurality of patients:

obtaining a measured LVEDP value of a respective patient;

obtaining third data representing the femoral blood pressure waveforms of a cardiac cycle of the respective patient and fourth data representing the ECGs of the cardiac cycle of the respective patient, wherein the femoral blood pressure waveforms of a given patient are generated based on femoral blood pressure measurements of the given patient, and wherein the femoral blood pressure measurements and the ECGs of the given patient are captured contemporaneously;

computing, from the third data, computing, a first intrinsic frequency of a systolic phase of a cardiac cycle of a respective patient of the plurality of patients, a second intrinsic frequency of a diastolic phase of the cardiac cycle of the respective patient, a systolic intrinsic phase angle describing the systolic phase of the cardiac cycle of the respective patient, a diastolic intrinsic phase angle describing the diastolic phase of the cardiac cycle of the respective patient, a systolic intrinsic envelope of the systolic phase of the cardiac cycle of the respective patient, a diastolic intrinsic envelope of the diastolic phase of the cardiac cycle of the respective patient, and an envelope ratio (ER) based on the systolic intrinsic envelope and the diastolic intrinsic envelope;

extracting, based on the third data, a third set of features comprising: a first temporal value corresponding to a beginning of the femoral blood pressure waveform, a second temporal value corresponding to a dicrotic notch of the femoral blood pressure waveform, and a third temporal value corresponding to an end of the femoral blood pressure waveform;

extracting, based on the fourth data, a fourth set of features comprising: a fourth temporal value corresponding to a beginning of a QRS complex of the ECG of a respective patient and a fifth temporal value corresponding to a peak of an R-wave of the ECG of the respective patient; and estimating, based on a first amount of time between the first temporal value and the fourth temporal value of the respective patient or a second amount of time between the first temporal value and the fifth temporal value, a maximum rate of a rising portion of the femoral blood pressure waveform of the respective patient;

generating additional training data comprising, for each patient of the plurality of patients, (i) a subset of features from the third set of features and the fourth set of features, and (ii) the LVEDP value; and causing the trained random forest model to be further trained based on the additional training data to obtain the trained random forest model, the trained random forest model being trained to estimate the LVEDP of the patient based on an input set of features.

5. A non-transitory computer-readable medium storing computer program instructions that, when executed by one or more processors of a computing system, effectuate operations comprising:

obtaining first data representing a blood pressure waveform of a patient;

obtaining second data representing an ECG of the patient;

computing, based on the first data, cardiac parameters of a cardiac cycle of the patient, the cardiac parameters comprising intrinsic frequencies, intrinsic phase angles, and an envelope ratio (ER);

extracting, based on the first data, a first set of features of the cardiac cycle, the first set of features comprising temporal values associated with a beginning, dicrotic notch, and end of the blood pressure waveform;

extracting, based on the second data, a second set of features of the cardiac cycle, the second set of features comprising temporal values associated with a beginning of a QRS complex and a peak of an R-wave of the ECG;

determining, from the first set of features and the second set of features, a third set of features comprising at least one of: an amount of time between the beginning of the blood pressure waveform and the beginning of the QRS complex, an amount of time between the beginning of the blood pressure waveform and the peak of the R-wave, and a rate of change of the blood pressure waveform;

selecting a subset of features from the first set of features, the second set of features, and the third set of features;

generating training data based on one or more of intrinsic frequencies, intrinsic phase angles, and/or intrinsic envelopes computed based on femoral blood pressure waveforms and ECGs of a plurality of patients that have experienced heart failure and patients that have not experienced heart failure;

providing the selected subset of features to a trained machine learning model to obtain a first value representing a left ventricular end-diastolic pressure (LVEDP) of the patient;

training the machine learning model to estimate the LVEDP of the patient based on instances of the first set of features and the second set of features extracted from the generated training data;

determining whether the first value satisfies a threshold condition; and storing, in memory, based on the first value, a result indicating whether the patient has an elevated LVEDP or a normal LVEDP.

6. The non-transitory computer-readable medium of claim 5, wherein:
the blood pressure waveform is generated based on blood pressure measurements of the patient; and
the blood pressure measurements and the ECG are performed contemporaneously.

7. The non-transitory computer-readable medium of claim 5, wherein the first set of features comprises:
a first intrinsic frequency of a systolic phase of a cardiac cycle of the patient;
a second intrinsic frequency of a diastolic phase of the cardiac cycle;
a first intrinsic phase angle describing the systolic phase of the cardiac cycle;
a second intrinsic phase angle describing the diastolic phase of the cardiac cycle;
a first intrinsic envelope of the systolic phase of the cardiac cycle;
a second intrinsic envelope of the diastolic phase of the cardiac cycle; and
an envelope ratio (ER).

8. The non-transitory computer-readable medium of claim 5, wherein the computing system comprises at least one sensor configured to capture blood pressure measurements and an electrocardiogramaevice.

9. The non-transitory computer-readable medium of claim 5, wherein the computing system is operatively coupled to a client device comprising at least one sensor configured to capture blood pressure measurements and an electrocardiogramh (ECG) device.

10. The non-transitory computer-readable medium of claim 5, wherein the trained machine learning model comprises a trained random forest model configured to determine an LVEDP based on an input set of features computed from a blood pressure waveform and an ECG of a given patient.

11. The non-transitory computer-readable medium of claim 5, wherein the operations further comprise:
steps for training a machine learning model to obtain the trained machine learning model.

12. The non-transitory computer-readable medium of claim 5, wherein the trained machine learning model is trained using training data, wherein the training data comprises:
a plurality of sets of features, wherein each set of features comprises: a measured LVEDP value of a given patient of a plurality of patients, intrinsic frequencies a cardiac cycle of the given patient, intrinsic phase angles of the cardiac cycle of the given patient, an envelope ratio (ER) of the cardiac cycle of the given patient, temporal values associated with a beginning, dicrotic notch, and end of a blood pressure waveform of the given patient, and temporal values associated with a beginning of a QRS complex of an ECG of the given patient and a peak of an R-wave of the ECG of the given patient.

13. The non-transitory computer-readable medium of claim 5, wherein the threshold condition being satisfied comprises the first value being greater than or equal to a threshold LVEDP value.

14. The non-transitory computer-readable medium of claim 5, wherein the result comprises a binary value representing whether the first value indicates that the patient has an elevated LVEDP or a normal LVEDP, wherein the operations further comprise:
responsive to determining that the first value indicates that the patient has an elevated LVEDP, generating and providing an alert to the patient, a medical professional of the patient, or the patient and the medical professional of the patient.

15. The non-transitory computer-readable medium of claim 5, wherein the trained machine learning model is a trained random forest model.

16. A method implemented by a computing system configured to execute computer program instructions, the method comprising:
obtaining, with the computing system, first data representing a blood pressure waveform of a patient;
obtaining, with the computing system, second data representing an ECG of the patient;
computing, with the computing system, based on the first data, cardiac parameters of a cardiac cycle of the patient, the cardiac parameters comprising intrinsic frequencies, intrinsic phase angles, and an envelope ratio (ER);
extracting, with the computing system, based on the first data, a first set of features of the cardiac cycle, the first set of features comprising temporal values associated with a beginning, dicrotic notch, and end of the blood pressure waveform;
extracting, with the computing system, based on the second data, a second set of features of the cardiac cycle, the second set of features comprising temporal values associated with a beginning of a QRS complex and a peak of an R-wave of the ECG;
determining, with the computing system, from the first set of features and the second set of features, a third set of features comprising at least one of: an amount of time between the beginning of the blood pressure waveform and the beginning of the QRS complex, an amount of time between the beginning of the blood pressure waveform and the peak of the R-wave, and a rate of change of the blood pressure waveform;
selecting, with the computing system, a subset of features from the first set of features, the second set of features, and the third set of features;
generating training data based on one or more of intrinsic frequencies, intrinsic phase angles, and/or intrinsic envelopes computed based on femoral blood pressure waveforms and ECGs of a plurality of patients that have experienced heart failure and patients that have not experienced heart failure;
providing, with the computing system, the selected subset of features to a trained machine learning model to obtain a first value representing a left ventricular end-diastolic pressure (LVEDP) of the patient;

training the trained machine learning model to estimate the LVEDP based on instances of at least the first set of features and the second set of features extracted from the generated training data;

determining, with the computing system, whether the first value satisfies a threshold condition; and storing, with the computing system, in memory, based on the first value, a result indicating whether the patient has an elevated LVEDP or a normal LVEDP.

17. The method of claim 16, wherein the trained machine learning model is a trained random forest model.

* * * * *